United States Patent [19]

Sano et al.

[11] Patent Number: 5,377,023
[45] Date of Patent: Dec. 27, 1994

[54] PICTORIAL IMAGE PROCESSING SYSTEM
[75] Inventors: Shigehiro Sano; Kazuya Tsunashima; Akio Yanase, all of Tokyo, Japan
[73] Assignee: Dai Nippon Insatsu Kabushiki Kaisha, Japan
[21] Appl. No.: 582,198
[22] PCT Filed: Jan. 30, 1990
[86] PCT No.: PCT/JP90/00110
§ 371 Date: Oct. 2, 1990
§ 102(e) Date: Oct. 2, 1990
[87] PCT Pub. No.: WO90/09018
PCT Pub. Date: Aug. 9, 1990

[30] Foreign Application Priority Data

| Feb. 2, 1989 | [JP] | Japan | 1-24238 |
| Feb. 2, 1989 | [JP] | Japan | 1-24239 |
| Feb. 17, 1989 | [JP] | Japan | 1-37500 |
| Feb. 21, 1989 | [JP] | Japan | 1-40657 |
| Jul. 20, 1989 | [JP] | Japan | 1-188560 |
| Sep. 20, 1989 | [JP] | Japan | 1-244840 |

[51] Int. Cl.$^5$ .................. H04N 1/46; H04N 1/393; H04N 1/419
[52] U.S. Cl. .................. 358/500; 358/448; 358/451; 358/261.1; 358/524
[58] Field of Search .......... 358/75, 77, 78, 80, 358/400, 401, 261.1, 443, 448, 451, 452, 453, 500, 518, 523, 524

[56] References Cited

U.S. PATENT DOCUMENTS

| 4,780,709 | 10/1988 | Randall . | |
| 4,847,689 | 7/1989 | Yamamoto et al. | 358/75 |
| 5,075,779 | 12/1991 | Lefebvre et al. | 358/261.1 |

FOREIGN PATENT DOCUMENTS

| 55-28666 | 2/1980 | Japan . |
| 58-56575 | 4/1983 | Japan . |
| 63-94372 | 4/1988 | Japan . |
| 63-104085 | 5/1988 | Japan . |
| 63-177277 | 7/1988 | Japan . |

OTHER PUBLICATIONS

"A Computer Coloring Technique for Simple Figures Using Run-Length Coding", Denshi Tsushin Gakkai Ronbushi vol. J63-D, Oct., 1980.
Patent Abstracts of Japan, vol. 7, No. 144 (E-183) 23rd Jun. 1983 & JP-A-58056 575 Apr. 4, 1983.
Systems, Computers, Controls, vol. 13, No. 1, Jan./Feb. 1982, pp. 82–89.

*Primary Examiner*—Edward L. Coles, Sr.
*Assistant Examiner*—Thomas D. Lee
*Attorney, Agent, or Firm*—Wegner, Cantor, Mueller & Player

[57] ABSTRACT

There is provided a main memory (110) for storing a pictorial image constituted by pixels arranged on an XY plane, wherein a train of pixels arranged in an X-direction is defined by a runlength data (c, a) expressed by a color value c that a pixel has and a value a which can indicate the termination of an arrangement of pixels having the same color value. There are also provided a disk unit (200) for retaining data given to said main memory in the form of runlength data as they are, data form conversion unit (130) for converting runlength data in the main memory to raster data, a frame memory (120) for retaining the raster data converted at the data form conversion unit in order to display pictorial images on a visual display (400), and a pictorial image processing unit (140) for implementing a pictorial image processing operation to runlength data in the main memory. The pictorial image processing unit (140) includes a coloring processing section (141) and a draw processing section (142). Coloring processing and draw processing by these sections are implemented to runlength data in the main memory. Further, the pictorial image processing unit includes a polygon input section (143). Thus, a polygon inputting work can be made with a good operability. A portion of a pictorial image in the main memory is displayed on the visual display. A desired picture display is conducted in various forms corresponding to wishes of an operator. This system is suitable for being assembled into an apparatus for preparing a screen tint film.

7 Claims, 31 Drawing Sheets

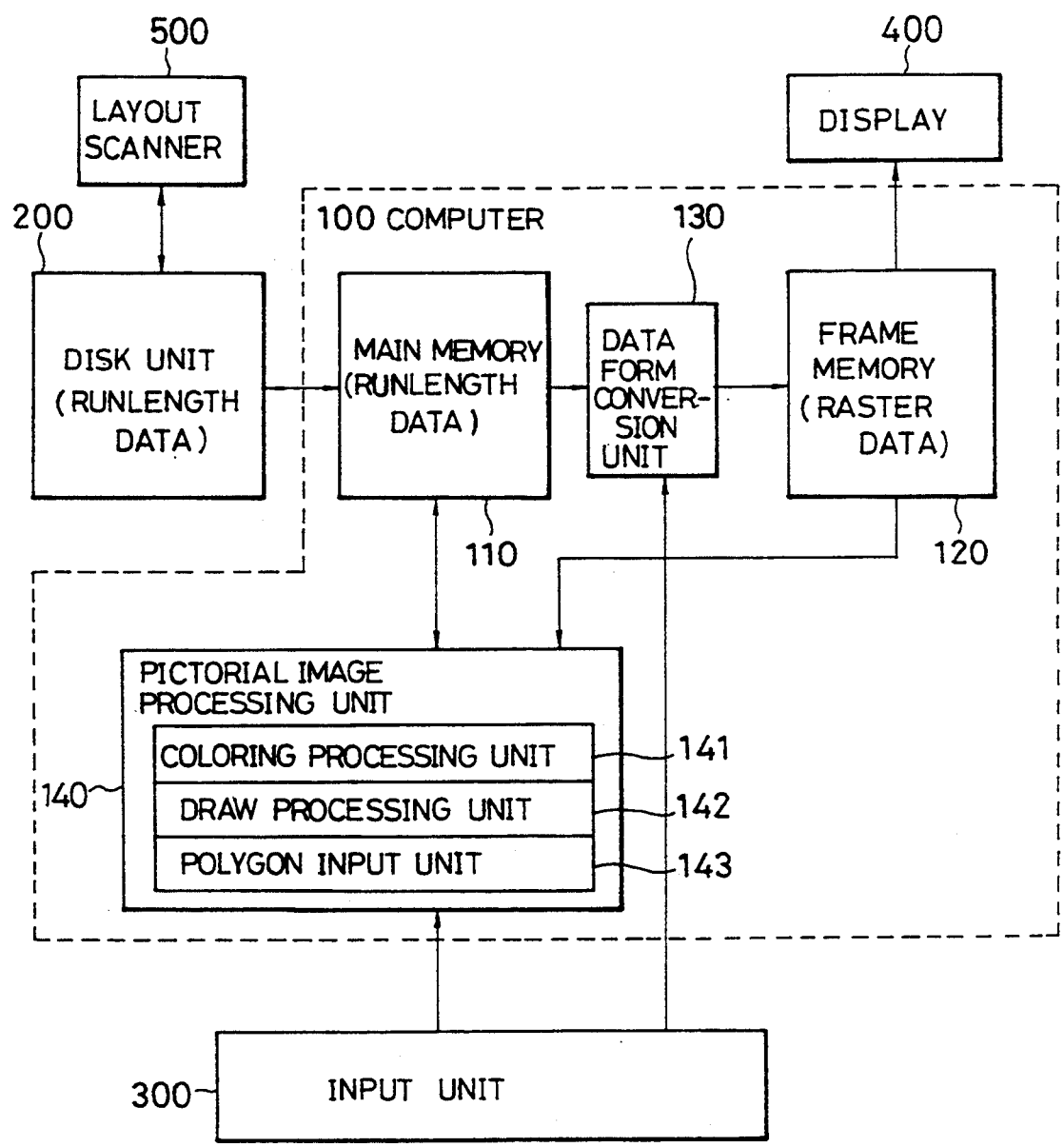
F I G. 1

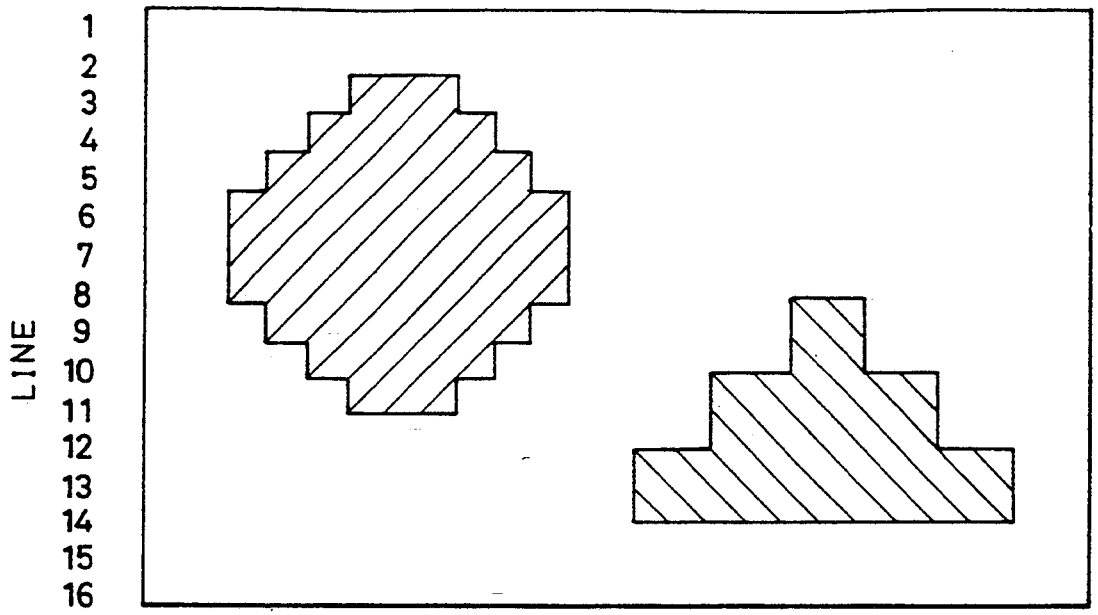
FIG. 2a
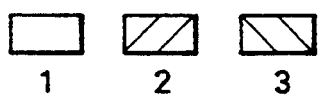
FIG. 2b
| | | | | |
|---|---|---|---|---|
| 1 | (1,25) | | | |
| 2 | (1,25) | | | |
| 3 | (1,5) | (2,8) | (1,25) | |
| 4 | (1,4) | (2,9) | (1,25) | |
| 5 | (1,3) | (2,10) | (1,25) | |
| 6 | (1,2) | (2,11) | (1,25) | |
| 7 | (1,2) | (2,11) | (1,25) | |
| 8 | (1,2) | (2,11) | (1,25) | |
| 9 | (1,3) | (2,10) | (1,17) | (3,19) | (1,25) |
| 10 | (1,4) | (2,9) | (1,17) | (3,19) | (1,25) |
| 11 | (1,5) | (2,8) | (1,15) | (3,21) | (1,25) |
| 12 | (1,15) | (3,21) | (1,25) | |
| 13 | (1,13) | (3,23) | (1,25) | |
| 14 | (1,13) | (3,23) | (1,25) | |
| 15 | (1,25) | | | |
| 16 | (1,25) | | | |
FIG. 3

| TYPE | DISK UNIT | MAIN MEMORY | FRAME MEMORY |
|---|---|---|---|
| A | RASTER DATA | (NOT USED) | RASTER DATA |
| B | | RASTER DATA | |
| C | | RUNLENGTH DATA | |
| D | RUNLENGTH DATA | (NOT USED) | |
| E | | RASTER DATA | |
| F | | RUNLENGTH DATA | |

FIG. 4

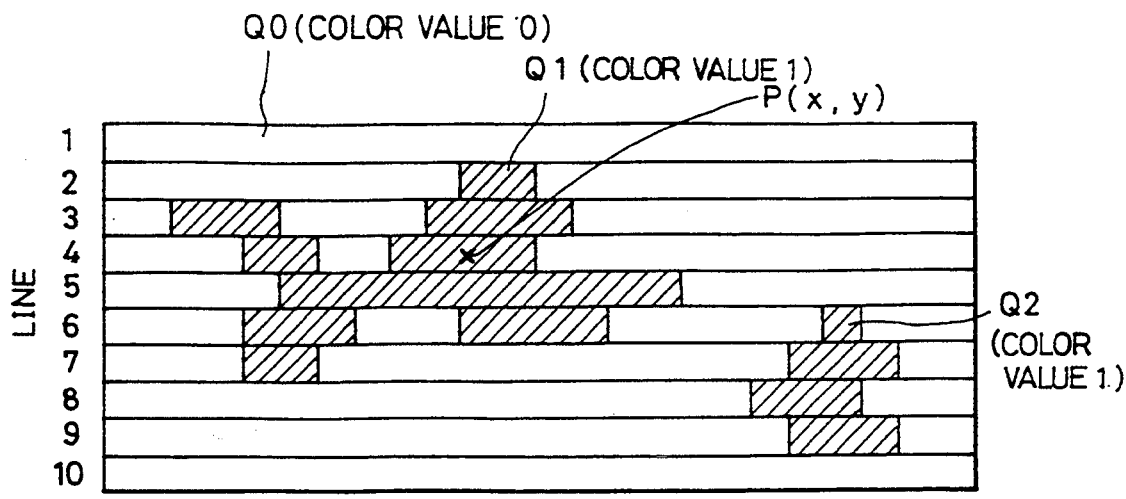
FIG.10
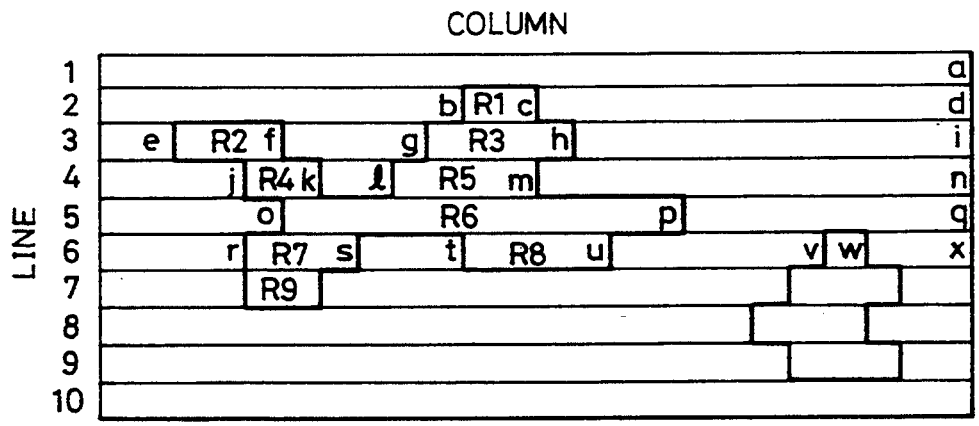
FIG.11
| LINE | | | | | | |
|---|---|---|---|---|---|---|
| 1 | (0,a) | | | | | |
| 2 | (0,b) | (1,c) | (0,d) | | | |
| 3 | (0,e) | (1,f) | (0,g) | (1,h) | (0,i) | |
| 4 | (0,j) | (1,k) | (0,*l*) | (1,m) | (0,n) | |
| 5 | (0,o) | (1,p) | (0,q) | | | |
| 6 | (0,r) | (1,s) | (0,t) | (1,u) | (0,v) | |
| | (1,w) | (0,x) | | | | |
FIG.12

FIG.15a PATTERN 1
$a > \alpha$ AND $b < \beta$

FIG.15b PATTERN 2
$a \leqq \alpha$ AND $b \geqq \beta$

FIG.15c PATTERN 3
$a > \alpha$, $b \geqq \beta$ AND $a < \beta$

FIG.15d PATTERN 4
$a \leqq \alpha$, $b < \beta$ AND $b > \alpha$

FIG.18
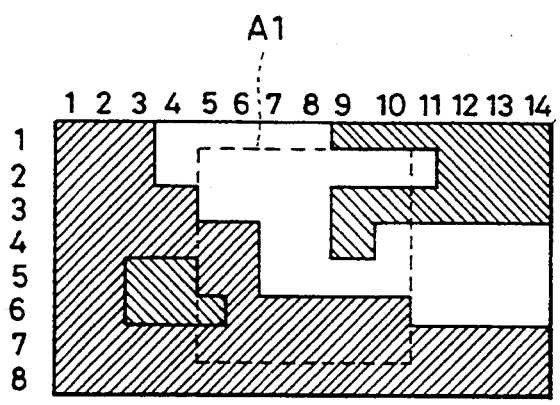
FIG.19a   FIG.19b
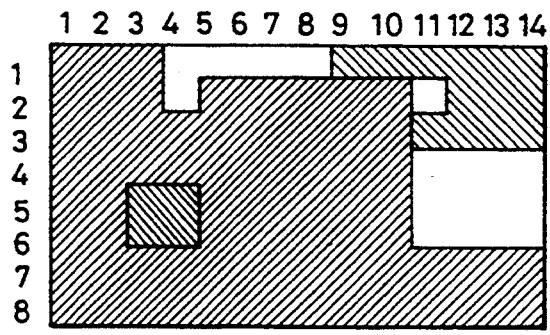
FIG.19c   FIG.19d

PATTERN 1

IN CASE OF $P_{n-1} < P_s$ AND $P_n \leq P_s$
OUTPUT $(C_n, P_n)$ AS IT IS

PATTERN 2

IN CASE OF $P_{n-1} \leq P_s$, $P_n > P_s$ AND $P_n \leq P_e$
IF $C_n \neq C$, OUTPUT $(C_n, P_s)$

PATTERN 3

IN CASE OF $P_{n-1} \leq P_s$ AND $P_n > P_e$
  1 IF $C_n \neq C$, OUTPUT $(C_n, P_s), (C, P_e)$
  2 OUTPUT $(C_n, P_n)$

PATTERN 4

IN CASE OF $P_{n-1} > P_s$ AND $P_n \leq P_e$
NO OUTPUT IS PROVIDED

PATTERN 5

IN CASE OF $P_{n-1} > P_s$, $P_{n-1} \leq P_e$ AND $P_n > P_e$
1  IF $C_n \neq C$, OUTPUT $(C, P_e)$
2  OUTPUT $(C_n, P_n)$

PATTERN 6

IN CASE OF $P_{n-1} > P_e$ AND $P_n > P_e$
OUTPUT $(C_n, P_n)$ AS IT IS

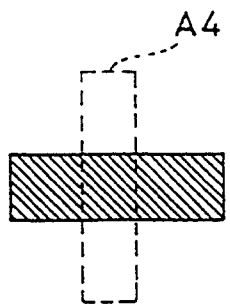
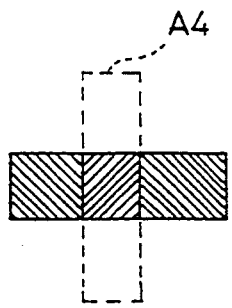
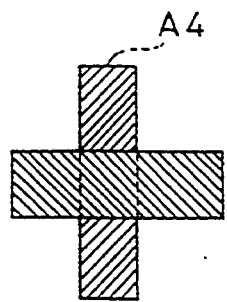
FIG.25a    FIG.25b    FIG.25c
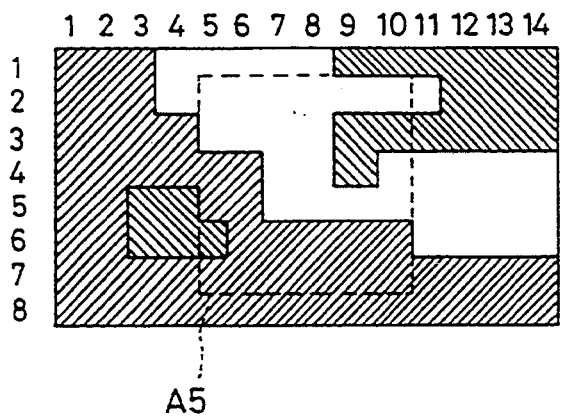
FIG.26a
(1,3)  (3,8)   (2,14)
(1,3)  (3,11)  (2,14)
(1,4)  (3,8)   (2,14)
(1,6)  (3,8)   (2,9)   (3,14)
(1,2)  (2,4)   (1,6)   (3,14)
(1,2)  (2,5)   (1,10)  (3,14)
(1,14)
(1,14)
FIG.26b
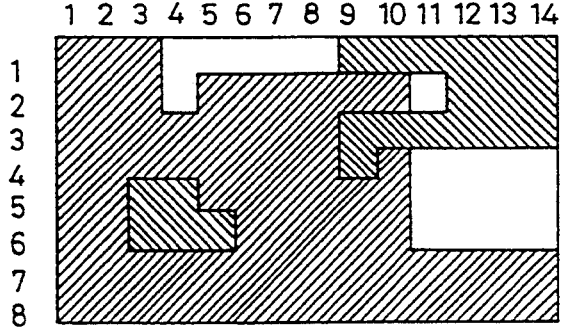
FIG.26c
(1,3)  (3,8)   (2,14)
(1,3)  (3,4)   (1,10)  (3,11)  (2,14)
(1,8)  (2,14)
(1,8)  (2,14)  (1,10)  (3,14)
(1,2)  (2,4)   (1,10)  (3,14)
(1,2)  (2,5)   (1,10)  (3,14)
(1,14)
(1,14)
FIG.26d

PATTERN 1

IN CASE OF $P_{n-1} < P_s$ AND $P_n \leq P_s$

OUTPUT $(C_n, P_n)$ AS IT IS

PATTERN 2

IN CASE OF $P_{n-1} \leq P_s$, $P_n > P_s$ AND $P_n \leq P_e$ $\begin{cases} \text{IF } C_n = C_o, \text{ OUTPUT } (C_n, P_s), (C, P_n) \\ \text{IF } C_n \neq C_o, \text{ OUTPUT } (C_n, P_n) \end{cases}$

PATTERN 3

IN CASE OF $P_{n-1} \leq P_s$ AND $P_n > P_e$

1  IF $C_n = C_o$, OUTPUT $(C_n, P_s), (C, P_e)$
2  OUTPUT $(C_n, P_n)$

PATTERN 4

(C_{n-1}, P_{n-1})   (C_n, P_n)

IN CASE OF $P_{n-1} > P_s$ AND $P_n \leq P_e$ $$\begin{cases} \text{IF } C_n = C_o, \text{ OUTPUT } (C, P_n) \\ \text{IF } C_n \neq C_o, \text{ OUTPUT } (C_n, P_n) \end{cases}$$

PATTERN 5

(C_{n-1}, P_{n-1})   (C_n, P_n)

IN CASE OF $P_{n-1} > P_s$, $P_{n-1} \leq P_e$ AND $P_n > P_e$

1  IF $C_n = C_o$, OUTPUT $(C, P_e)$
2  OUTPUT $(C_n, P_n)$

PATTERN 6

(C_{n-1}, P_{n-1})   (C_n, P_n)

IN CASE OF $P_{n-1} > P_e$ AND $P_n > P_e$
OUTPUT $(C_n, P_n)$

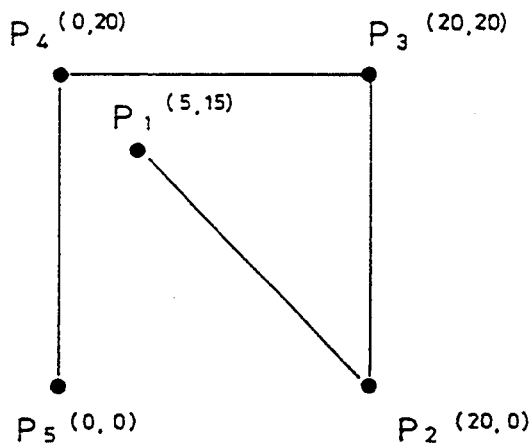
FIG.35a
| $P_1$ | (5, 15) |
| $P_2$ | (20, 0) |
| $P_3$ | (20, 20) |
| $P_4$ | (0, 20) |
| $P_5$ | (0, 0) |
FIG.35b
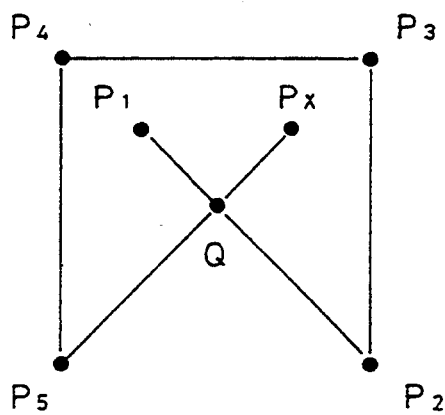
FIG.36a
| $P_1$ | (5, 15) |
| $P_2$ | (20, 0) |
| $P_3$ | (20, 20) |
| $P_4$ | (0 20) |
| $P_5$ | (0, 0) |
| $P_x$ | (15, 15) |
FIG.36b
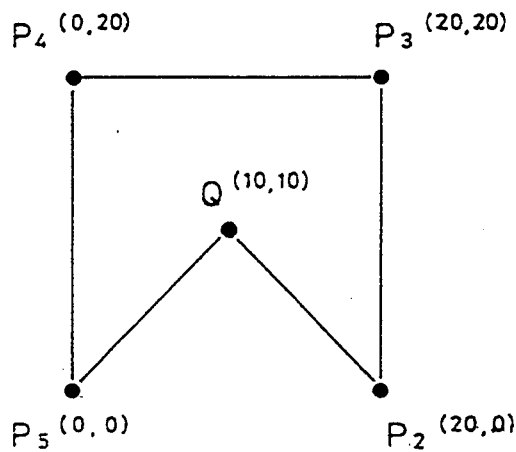
FIG.37a
| $P_2$ | (20, 0) |
| $P_3$ | (20, 20) |
| $P_4$ | (0, 20) |
| $P_5$ | (0, 0) |
| Q | (10, 10) |
FIG.37b

| LINE NO | PAIR OF AREAS | LINE NO | PAIR OF AREAS | |
|---|---|---|---|---|
| 20 | (0, 20) | 9 | (0, 9) | (11, 20) |
| 19 | (0, 20) | 8 | (0, 8) | (12, 20) |
| 18 | (0, 20) | 7 | (0, 7) | (13, 20) |
| 17 | (0, 20) | 6 | (0, 6) | (14, 20) |
| 16 | (0, 20) | 5 | (0, 5) | (15, 20) |
| 15 | (0, 20) | 4 | (0, 4) | (16, 20) |
| 14 | (0, 20) | 3 | (0, 3) | (17, 20) |
| 13 | (0, 20) | 2 | (0, 2) | (18, 20) |
| 12 | (0, 20) | 1 | (0, 1) | (19, 20) |
| 11 | (0, 20) | | | |
| 10 | (0, 20) | | | |

PICTORIAL IMAGE PROCESSING SYSTEM

TECHNICAL FIELD

This invention relates to a pictorial image processing system utilizing a computer, and more particularly to a technology for processing pictorial image data on a memory and handling the processed data. Especially, this invention is concerned with a pictorial image processing system suitable for processing pictorial image in a screen tint portion of a printed matter.

BACKGROUND ART

Large of portions having a fixed color tone, so called screen tint portions, exist in color printed matters. The pre-press process of such screen tint portions are carried out by a special process different from the pre-press process of general color portions. Colors represented by a mixture of four colors of yellow (Y), magenta (M), cyan (C) and black (K) are given to respective screen tint portions. Such mixed colors are determined by numeric values expressed by dot percent rates (hereinafter called dot percent) in color separation used for respective colors at the time of printing. In the prior art, several kinds of masks for extracting the same dot percent regions and transparent films (screen tints) in which dots are provided at a desired dot percent rate are prepared to repeatedly expose light onto an exposure film to thereby carry out work for preparing a screen tint film.

In recent years, there have proposed technologies for preparing such a screen tint film by making use of a computer. For example, apparatus for preparing a screen tint film using a computer are disclosed in the specification of the Japanese Patent Application No. 213259/85, the specification of the Japanese Patent Application No. 270501/85, and the specification of the Japanese Patent Application No. 231365/87. In these apparatus, a contour line pictorial image described or depicted on a block copy is read by a scanner, etc. to carry out coloring process by a computer on the basis of the pictorial image data thus read to directly prepare screen tint films for respective colors.

The above-described apparatus for preparing a screen tint film using a computer typically include a disk unit as an external storage unit to retain pictorial image data in the disk unit. In the case of carrying out a pictorial image processing, such as coloring, pictorial image data in the disk unit is read out into the main memory in the computer to implement a pictorial image processing, such as coloring, to the pictorial image data in the main memory. During implementation of such pictorial image processing, it is necessary to display a pictorial image subject to processing on a visual display. For affecting such display, a frame memory is provided to transfer pictorial image data required for display from the main memory to the frame memory to thereby display a necessary pictorial image.

Ordinarily, the pictorial image data include raster data comprising color values of respective pixels arranged in order of arrangement of the pixels, and runlength data indicating arrangement of pixels having the same color value. In the conventional apparatus, the main memory and the frame memory store pictorial image data in the form of raster data, and the disk unit stores pictorial image data in the form of runlength data. This is because since the frame memory is directly connected to the visual display, it is necessary to retain data in the form of raster data, whereas it is convenient to retain data in the disk unit for storing several pictorial images in the form of runlength data permitting the whole capacity of data to be less. In the main memory for transferring data to the frame memory, an approach is used to retain data in the form of raster data in the same manner as in the case of the frame memory. Accordingly, in the conventional apparatus, pictorial image data in the form of runlength data in the disk unit is converted to raster data and is then read out onto the main memory. The raster data on the main memory is transferred to the frame memory in the form of raster data as it is, thus displaying pictorial images.

However, such apparatus have the problem that an extremely large capacity main memory is required. As previously described, since raster data requires the same number of data as the number of all pixels, a memory for storing massive data content is required in the case of a pictorial image having high resolution. Since the main memory of a computer generally is very expensive per bit compared to a disk, etc., there is the problem that if a main memory having a large capacity is required, the cost of the apparatus is greatly increased.

Another problem with the conventional apparatus is that, in the case of displaying a pictorial image in an expanded or contracted manner, or in the case of implementing coloring processing to pictorial image, the computational or operational efficiency is very poor, resulting in a prolonged computational or operational time. The expansion/contraction processing or the coloring processing is implemented to pictorial image data in the main memory. As previously described, since the main memory retains pictorial image data in the form of raster data in the conventional apparatus, various computational processing are implemented on the raster data. Implementation of computational processing on such a massive volume of raster data is a very inefficient and requires much processing time. In addition, the same problem arises also with respect to the computation in the case of draw processing in order to modify a pictorial image.

A first object of this invention is to provide a pictorial image processing system capable of reducing cost by lowering the capacity of the main memory, and capable of performing highly efficient computational processing.

Generally, in the apparatus for preparing a screen tint film, an operator carries out coloring processing on the basis of a color instruction while displaying a pictorial image on a visual display screen. For this reason, a work for designating an area or region subject to processing is required. In the conventional apparatus, an approach is employed to designate a rectangle on a display screen or designate a closed area encompassed by a predetermined contour line thereon to represent the area subject to processing.

However, an area designation method in the above-described apparatus for preparing a screen tint film has not necessarily good operability for an operator. For example, in the case of carrying out an area designation with respect to a very complicated pattern, designation of a rectangular area cannot result in a sufficient area designation. Further, in the case of designating a closed area encompassed by a contour line, if there is a break in the contour line, designation as a closed area cannot be made.

A second object of this invention is to provide a method of inputting a polygon, which is capable of improving operability of such an area designation.

Further, the conventional apparatus for preparing a screen tint film has the problem that the working efficiency at the time of modification and coloring works is low. In conventionally proposed apparatus, a desired pattern can be displayed on a visual display screen with a desired magnification. However, since the entire display of the display unit is switched to that of a new picture every time expanding display and/or contracting display are carried out, only one pattern having a predetermined magnification can be displayed within one screen. Accordingly, an operator cannot grasp the entire image of that pattern when an expanding display is conducted, and cannot observe a line drawing of a fine portion when a contracting display is conducted.

A third object of this invention is to provide a pictorial processing system capable of displaying, in the form of a multi-window, several patterns with desired magnifications within one screen, respectively.

DISCLOSURE OF THE INVENTION (1) The first feature of this invention resides in a pictorial image processing system comprising;

a main memory for storing a pictorial image constituted by pixels arranged on an XY plane, the main memory being adapted to define trains of pixels arranged in an X-direction by a series of runlength data (c, a) expressed by a color value c that a pixel has and a value a which can indicate the termination of an arrangement of pixels having the same color value, thus to store those runlength data (c, a), a disk unit for retaining data given to said main memory in the form of runlength data as they are, data form conversion unit for converting runlength data in said main memory to raster data, a frame memory for retaining the raster data converted at the data form conversion unit in order to display pictorial images on a visual display, and a pictorial image processing unit for implementing a pictorial image processing operation to the runlength data in the main memory.

In the pictorial image processing system featured as described above, the disk unit and the main memory are both caused to retain pictorial image data in the form of runlength data. When data is transferred from the main memory to the frame memory, the data form is converted to raster data form. Accordingly, cost can be reduced by lowering the capacity of the main memory. In addition, since various computational processing is implemented on runlength data in the main memory, more efficient computational processing can be carried out as compared to the conventional devices which have implemented computational processing to raster data.

(2) The second feature of this invention resides in a pictorial image processing system comprising;

a main memory for storing a basic pictorial image constituted by pixels arranged on an XY plane, the main memory being adapted to define trains of pixels arranged in an X-direction by a series of runlength data (c, a) expressed by a color value c that a pixel has and a value a which can indicate the termination of an arrangement of pixels having the same color value, thus to store those runlength data (c, a), a display object information input unit for inputting display object information for specifying a display object area to be actually displayed within the basic pictorial image, a magnification input unit for inputting a magnification k for displaying the display object area, a runlength data extraction unit for extracting, from the main memory, runlength data (c, a) taking part in the display object area, on the basis of display object information, a magnification conversion unit for converting a coordinate value a of the extracted runlength data (c, a) to a coordinate value A on the basis of the magnification k to provide runlength data (c, A), a raster data generation unit for generating raster data comprised of pixels having the color value c successive up to the X-coordinate value A on the basis of the runlength data (c, A), a frame memory for storing the generated raster data, and a visual display for displaying a pictorial image on the basis of raster data stored in the frame memory.

In the pictorial image processing system featured as described above, pictorial image data is stored into the main memory in the form of runlength data. Accordingly, the capacity of the main memory can be reduced to an even greater degree as compared to the conventional device for storing image data in the form of raster data, resulting in reduced costs. Further, in the case of transferring pictorial image data from the main memory to the frame memory, there occurs a need to convert the data form from the runlength data to the raster data. Such a conversion is conducted as follows. Initially, an operator inputs display object information for specifying a display object area and a display magnification. The runlength data extraction unit extracts necessary runlength data from the main memory on the basis of the inputted display object information. A conversion of magnification is implemented to the runlength data at the magnification conversion unit. Further, raster data is generated at the raster data generation unit. The raster data thus generated will be transferred to the frame memory. In this way, image expanding/contracting computation is carried out in the middle of converting runlength data to raster data. Namely, since an actual operation is implemented on runlength data, there is no necessity for implementing an operation on all the pixel as in the conventional devices. For this reason, the computational efficiency is extremely improved.

(3) The third feature of this invention resides in a pictorial image processing system comprising;

a main memory for storing a pictorial image constituted by pixels arranged on an XY plane, the main memory being adapted to define trains of pixels arranged in an X-direction by a series of runlength data (c, a) expressed by a color value c that a pixel has and a value a which can indicate the termination of an arrangement of pixels having the same color value, thus to store those runlength data (c, a), a data form conversion unit for converting the runlength data in the main memory to raster data, a frame memory for retaining raster data converted at the data form conversion unit in order to display a pictorial image on a visual display, an input unit for designating a first color and a second color with respect to a pictorial image in the main memory, a sequential data extraction unit for sequentially extracting runlength data (c, a) in the main memory, and a color conversion unit changing the color value c in the extracted data (c, a) to a color value c' corresponding to the second color and replacing original data (c, a) in the main memory by the changed data (c', a), when the color value c in the extracted data (c, a) corresponds to the first color.

In the pictorial image processing system featured as described above, pictorial image data is stored into the main memory in the form of runlength data. Accordingly, the capacity of the main memory can be reduced to an even greater degree as compared to the conventional devices for storing image data in the form of raster data, resulting in realization of a reduced cost. Further, since coloring processing for pictorial images is implemented on runlength data in the main memory, the computational efficiency is further improved as compared to the conventional method for implementing coloring processing to raster data, resulting in an improved processing speed. With respect to the coloring processing for runlength data, coloring instruction is given in the form of "Allow a portion of the first color in a pictorial image to be colored into the second color". Then, runlength data are sequentially read out from the main memory. The processing for changing the color value so that it has a color value of the second color is implemented to data of which color values indicate the first color.

(4) The fourth feature of this invention resides in a pictorial image processing system comprising;

a main memory for storing a pictorial image constituted by pixels arranged on an XY plane, the main memory being adapted to define trains of pixels arranged in an X-direction by a series of runlength data (c, a) expressed by a color value c that a pixel has and a value a which can indicate the termination of an arrangement of pixels having the same color value, thus to store those runlength data (c, a), a data form conversion unit for converting the runlength data in the main memory to raster data, a frame memory for retaining raster data converted at the data form conversion unit in order to display a pictorial image on a visual display, an input unit for designating a point P within a pictorial image and a new color value c' with respect to the pictorial image in the main memory, an initial color value conversion unit for extracting runlength data ($c_o$, $a_o$) including a position of the point P to change color value $c_o$ of this data to a color value c' to replace original data in the main memory by the changed data (c', $a_o$), a stack unit for accumulating or storing index data constituted by three data (S, E, Y) of a first X-coordinate value S, a second X-coordinate value E, and data Y indicating a position in a Y-direction, an index data generation unit for determining data s regarding an initial point of pixel trains defined by the given runlength data (c, a), data e regarding a terminating point thereof, and data y indicating a position in the Y-direction thereof, the unit generating index data (s, e, y+1) for pixel trains adjacent in a lower direction indicated by a position in the Y-direction (y+1) and index data (s, e, y−1) for pixel trains adjacent in an upper direction indicated by a position in the Y-direction (y−1), respectively, an initial data storage unit for giving runlength data ($c_o$, $a_o$) to the index data generation unit, thus to accumulate or store the generated index data into the stack unit, a runlength data extraction unit for reading out one index data (S, E, Y) from the stack unit to extract runlength data which satisfies three conditions, i.e., those data are located at the position Y in the Y-direction indicated by this index data, those data have the color value $c_o$, and pixel trains defined overlap with a section SE, a sequential color value conversion unit for changing the color value $c_o$ of data extracted by the runlength data extraction unit to the color value c' to replace original data in the main memory by the changed data, and a sequential data storage unit for giving data extracted by the runlength data extraction unit to the index data generation unit to accumulate or store the generated index data into the stack unit.

In the pictorial image processing system featured as described above, a coloring instruction is given in the form of "Allow a closed area including a point P within a pictorial image to be colored into a predetermined color". Initially, runlength data ($c_o$, $a_o$) inclusive of this point P is extracted from the main memory, and the color value of this data is changed to that of a predetermined color. Subsequently, index data is prepared on the basis of this runlength data and is then accumulated or stored into the stack unit. The index data is data in the form of (S, E, Y) wherein Y denotes a column to be retrieved and S and E denotes sections to be retrieved within that column, respectively. At the beginning, two index data are prepared. One is for the upper column of the extracted runlength data and the other is for the lower column thereof. The index data (S, E, Y) thus accumulated or stored are read out one by one. On the basis of these data, a retrieval operation is made as to whether or not there is runlength data having a color value $c_o$ within the section SE to be retrieved of the Y-th column. If there is the runlength data concerned, that data is extracted to conduct the processing for changing the color value. New index data is generated on the basis of the extracted runlength data, and is then stored or accumulated into the stack unit. By repeatedly executing the above-described operation, coloring processing is implemented to runlength data.

(5) The fifth feature of this invention resides in a pictorial image processing system comprising;

a main memory for storing a pictorial image constituted by pixels arranged on an XY plane, the main memory being adapted to define trains of pixels arranged in an X-direction by a series of runlength data (c, a) expressed by a color value c that a pixel has and a value a which can indicate the termination of an arrangement of pixels having the same color value, thus to store those runlength date (c, a), a data form conversion unit for converting the runlength data in the main memory to raster data, a frame memory for retaining raster data converted at the data form conversion unit in order to display a pictorial image on a visual display, an input unit for designating a point P within a pictorial image and a new color value c' with respect to the pictorial image in the main memory, an initial color value conversion unit for extracting runlength data ($c_o$, $a_o$) including a position of the point P to change color value $c_o$ of this data to a color value $c'$ to replace original data in the main memory by the changed data ($c'$, $a_o$), a stack unit for accumulating or storing index data constituted by four data (S, E, Y, F) of a first X-coordinate value S, a second X-coordinate value E, data Y indicating a position in a Y-direction, and a flag F indicating a direction, an index data generation unit for determining a start point s and an end point e of a retrieval object section to be next retrieved and a position y and a direction f in a Y-direction of this section, thus to generate index data (s, e, y, f), an initial data storage unit for giving runlength data ($c_o$, $a_o$) to the index data generation unit, thus to accumulate or store the generated index data into the stack unit, a runlength data extraction unit for reading out one index data (S, E, Y, F) from the stack unit to extract runlength data which satisfies three conditions, i.e., those data are located at the position Y in the Y-direction indicated by this index data, those data have the color value $c_o$, and pixel trains defined overlap with a section SE, a sequential color value conversion unit for changing the color value $c_o$ of data extracted by the runlength data extraction unit to the color value $c'$ to replace original data in the main memory by the changed data, and a sequential data storage unit for giving runlength data (c, a) extracted by the runlength data extraction unit and the index data (S, E, Y, F) used in extracting this runlength data to the index data generation unit to accumulate or store the generated index data into the stack unit.

In the pictorial image processing system featured as described above, a flag F indicating a retrieval direction is added as a fourth element in addition to the three elements of the index data. By this flag F, a section with respect to runlength data which has been already retrieved can be excluded from the retrieval object section. Thus, a more effective processing can be carried out.

(6) The sixth feature of this invention resides in a pictorial image processing system comprising;

a main memory for storing a pictorial image constituted by pixels arranged on an XY plane, the main memory being adapted to define trains of pixels arranged in an X-direction by a series of runlength data (c, a) expressed by a color value c that a pixel has and a value a which can indicate the termination of an arrangement of pixels having the same color value, thus to store those runlength data (c, a), a data form conversion unit for converting the runlength data in the main memory to raster data, a frame memory for retaining raster data converted at the data form conversion unit in order to display a pictorial image on a visual display, a drawing area input unit for designating a drawing area with respect to a pictorial image in the main memory, a color input unit for designating a drawing color with respect to the drawing area, a line data readout unit for reading out data of a line related to the drawing area of runlength data (c, a) in the main memory, a data updating unit having a function to sequentially examine, one by one, runlength data corresponding to one line read out at the line data readout unit, whereby when that data is data which is not related to the drawing area, the data updating unit outputs it as it is, while when that data is data related to the drawing area, the data updating unit applies a modification to data by making reference to the drawing color to output the data thus modified, and a line data writing unit for rewriting the main memory by data given from the data updating unit.

In the pictorial image processing system featured as described above, pictorial image data is stored into the main memory in the form of runlength data. Accordingly, the capacity of the main memory can be reduced to an even greater degree as compared to the conventional devices for storing pictorial image data in the form of raster data, resulting in reduced costs. Further, since the processing for drawing a picture is implemented on runlength data in the main memory, the computational efficiency is more improved as compared to the conventional method of implementing such a draw processing on raster data, resulting in an improved processing speed.

The draw processing for runlength data may be carried out every line as follows. Initially, an operator inputs a drawing area and a drawing color. The line data readout unit reads out, from the main memory, data of a line related to the drawing area to deliver it to the data updating unit. The data updating unit sequentially examines the data to judge whether or not the data is one related to the drawing area. If the data is not related to the drawing area, the data updating unit outputs it as it is without making a modification or correction. In contrast, if the data is related to the drawing area, the data updating unit modifies the data so that the drawing area is painted by a drawing color and outputs the modified data. The outputted data is written into the main memory for the second time by the line data writing unit. In this way, draw processing is implemented on runlength data in the main memory.

(7) The seventh feature of this invention resides in a method of inputting information of a polygon defined by a two-dimensional coordinate system, comprising:

a step of inputting n number of vertices (P1, P2, ..., Pn), a step of displaying the n number of vertices and a plurality of line segments connecting these vertices on a visual display, a step of inputting auxiliary points Px by making use of a picture on the visual display, a step of determining an intersecting point Q of a line segment Pn Px and a line segment Pi Pi+1 which is one of the plurality of line segments displayed on the display unit, and a step of defining an (n−i+1) side polygon having a plurality of points (Q, Pi+1, Pi+2, ... Pn) as the vertices.

In accordance with the method of inputting a polygon featured as described above, the final vertex determining a polygon is given as an intersecting point of two line segments. One of these two line segments is one of a plurality of line segments already displayed on a visual display, and the other is a line segment connecting a vertex finally designated and an auxiliary point which will be designated from now. Since a polygon is already substantially completed on the visual display at the time of inputting an auxiliary point, an operator can easily make a final determination of a desired polygon while looking at the visual display. Thus, area designation having an extremely good operability can be made.

(8) The eighth feature of this invention resides in a pictorial image processing system for implementing a modification of a line drawing and coloring processing in a closed area encompassed by a line drawing to pictorial image data of a pattern constituted by line drawings so as to provide pictorial image data for preparing a screen tint film, comprising;

a pictorial image memory for storing respective pictorial image data of a plurality of patterns,
a display unit for displaying the patterns,
a memory for display, for retaining image data corresponding to a display picture on the display unit,
display control means for preparing pictorial image data in the memory for display on the basis of pictorial image data stored in the pictorial image memory,
modification instructing means for inputting an instruction of modification of a line drawing from an operator by a method of designating a position on a display picture on the display unit,
coloring instructing means for inputting an instruction of coloring in a closed area encompassed by a line drawing from the operator by the method of designating a position on a display picture on the display unit,
modifying/coloring means for recognizing image data subject to modification or coloring in the image memory by making reference to the memory for display on the bases of an instruction of modification inputted from the modification instructing means or an instruction of coloring inputted from the coloring instruction means, thus to implement modification or coloring processing to the pictorial image data,
pattern disignation means for designating a pattern to be displayed on the display unit on the basis of an instruction from the operator,
display frame designation means for designating a display frame in a display screen of the display unit on the basis of an instruction from the operator,
display magnification designation means for designating a display magnification of a pattern to be displayed on the display unit on the basis of an instruction from the operator, and
display portion designation means for designating a display portion within a pattern designated by the pattern designation means on the basis of an instruction from the operator,
wherein a function to update data in an area corresponding to a designated display frame in the memory for display is given to the display control means so that a designated display portion in a designated pattern is displayed within a designated frame with a designated magnification on the basis of designations of respective designation means.

In accordance with the pictorial image processing system featured as described above, data within a predetermined frame in the memory for display is updated by the display control means. Since data outside the display frame remain as they are, a multi-window display to conduct a display with a succeeding display frame overlapping with a preceding display frame can be carried out. An operator can arbitrarily designate the position and size of the display frame, a display object displayed within the display frame, and a display magnification. Further, when an operator designates a specific position of a pattern on the display unit, the modification/coloring means can recognize which data in the pictorial image data is caused to correspond to the position designated by the operator. According, when the operator gives a modification or coloring instruction to the designated position, the modification/coloring means can implement modification or coloring processing on data in the image memory. Thus, since the operator can designate an arbitrary position of an arbitrary pattern subjected to multi-window displaying on a display unit to give an instruction of modification or coloring, the operability is excellent.

BRIEF DESCRIPTION OF THE DRAWINGS

FIG. 1 is a block diagram showing the entire configuration of an embodiment in which this invention is applied to an apparatus for preparing a screen tint film.

FIG. 2a is a view showing an example of a pictorial image subject to processing of the apparatus shown in FIG. 1, and FIG. 2b is a view showing color values given to respective pixels of the pictorial image shown in FIG. 2a.

FIG. 3 is a view showing the state where the pictorial image shown in FIG. 2a is expressed by runlength data.

FIG. 4 is a table in which the pictorial image processing system is classified into six type (types A to F) in dependency upon the forms of data caused to be retained into a disk unit, a main memory, and a frame memory, respectively.

FIG. 10 is a view showing a pictorial image subject to processing by the coloring processing unit shown in FIG. 9.

FIG. 11 is a view for explaining a coloring processing of the pictorial image shown in FIG. 10.

FIG. 12 is a view showing the state where the pictorial image shown in FIG. 10 is expressed by runlength data.

FIGS. 15a to 15e and FIGS. 16a to 16e are views showing patterns utilized at the procedure shown in FIG. 14, respectively.

FIG. 18 is a view defining color values with respect to pictorial images shown in succeeding drawings.

FIGS. 19a and 19b are views showing a pictorial image subject to processing by the draw processing unit shown in FIG. 17 and runlength data thereof, respectively.

FIGS. 19c and 19d are views showing a pictorial image processed by the draw processing unit shown in FIG. 17 and runlength data thereof, respectively.

FIGS. 25a to 25c are views for explaining an original color designated draw processing by the draw processing unit shown in FIG. 17, respectively.

FIGS. 26a and 26b are views showing a pictorial image subject to the original color designated draw processing unit shown in FIG. 17 and runlength data thereof, respectively.

FIGS. 26c and 26d are views showing a pictorial image to which the original color designated draw processing is implemented by the draw processing unit shown in FIG. 17 and runlength data thereof, respectively.

FIGS. 35a and 35b are views showing a picture display at the time point when five vertices are inputted and coordinates in the memory in the method shown in FIG. 28, respectively.

FIGS. 36a and 36b are views showing the state where auxiliary points are inputted from the state of FIGS. 35a and 35b.

FIGS. 37a and 37b are views showing the state where a pentagon is determined by inputting of auxiliary points shown in FIGS. 36a and 37b.

BEST MODE FOR CARRYING OUT THE INVENTION

Figure 5:
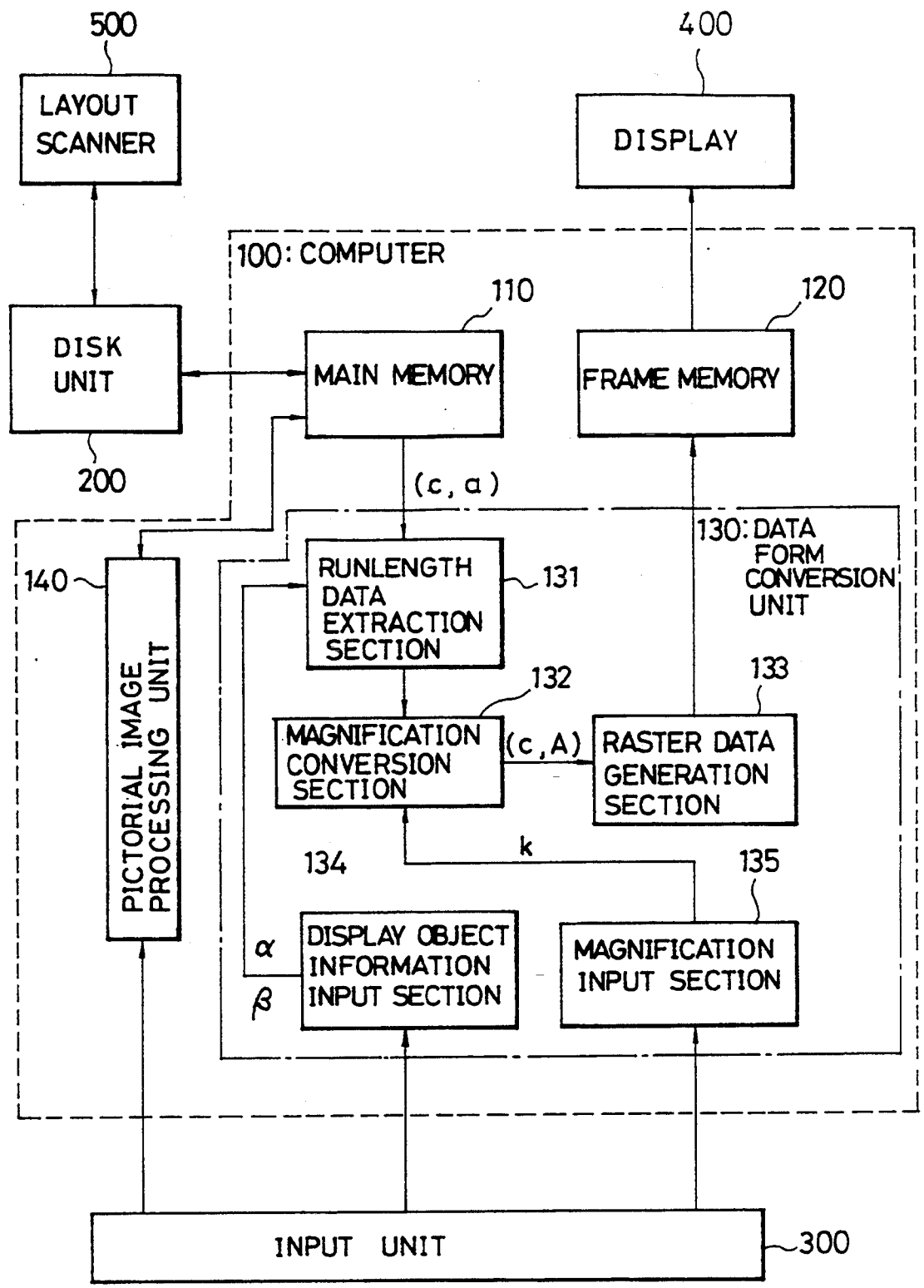
FIG. 5 is a block diagram showing, in more detail, the internal configuration of the data form conversion unit 130 in the apparatus shown in FIG. 1.

§1 Entire Configuration 1.1 Configuration of the Apparatus in a Block Form

This invention will now be described in accordance with embodiments shown. FIG. 1 is a block diagram showing the configuration of a pictorial image processing system according to an embodiment of this invention. In this system, the invention is applied to an apparatus for preparing a screen tint film. The system of FIG. 1 constitutes, in an actual sense, an apparatus for preparing a screen tint film. The body of this apparatus is a computer 100. A disk unit 200, an input unit 300, and a visual display 400 are connected to the computer 100. As the input unit 300, typical input devices such as keyboard, mouse, and the like may be used. Further, a layout scanner 500 is connected to the disk unit 200. Data of monochromatic picture constituted by contour lines is taken into by the layout scanner 500 and is once retained into the disk unit 200. This pictorial image data is taken into the computer 100. At the computer 100, a pictorial image processing, such as a coloring, etc., is implemented and is then returned into the disk unit 200 for the second time. The layout scanner 500 takes thereinto processed pictorial image data from the disk unit 200. Thus, a screen tint film is prepared on the basis of the pictorial image data.

The internal configuration of the computer 100 will now be described. The internal configuration of the computer 100 is actually constructed by an organic combination of hardware such as CPU, memory and the like, and software for operating the hardware. The components can be considered to be classified into function blocks. Pictorial image data read out from the disk unit 200 is stored into the main memory 110. The pictorial image data in the main memory 110 is transferred into the frame memory 120. As described later, that data is passed through a data form conversion unit 130. Thus, the form of data is converted. On the basis of the pictorial image data in the frame memory 120, a picture display is conducted on the visual display 400. An operator carries out a pictorial image processing, such as a coloring, etc., while looking at this picture display. An instruction of the pictorial image processing from the operator is given to a pictorial image processing unit 140 through the input unit 300.

1.2 Form of Pictorial Image Data

The key point of this invention is that a scheme is adopted to retain pictorial image data in the main memory 110 in the form of runlength data. In the apparatus of FIG. 1, the disk unit 200, the main memory 110, and the frame memory 120 are used to store pictorial image data. Among these elements, the disk unit 200 and the main memory 110 retain pictorial image data in the form of runlength data, whereas the frame memory 120 retains pictorial image data in the form of raster data. Accordingly, the data form conversion unit 130 converts runlength data in the main memory 110 raster data, thus to transfer ring it to the frame memory 120.

Here, the data structure of raster data and runlength data will be briefly described with reference to FIGS. 2 and 3. For example, consider a pictorial image comprised of 25 pixels in a column direction and 16 pixels in a line direction, i.e., 400 pixels in total as shown in FIG. 2a. It is now assumed that color values of pixels are defined by 1, 2 and 3 as shown in FIG. 2b, respectively. To express such a pictorial image by raster data, a matrix of 25 columns × 16 rows is prepared to arrange respective color values in the matrix. If a color value of one pixel is expressed by data of, e.g., 4 bytes, data volume up to $4 \times 400 = 1600$ bytes is required. On the contrary, when this pictorial image is expressed by runlength data, it is expressed as shown in FIG. 3. One unit of data takes the form of (c, a) wherein c represents a color value that a pixel has and a represents a column value showing the termination of an arrangement of pixels having the same color value. For example, data of (1, 25) is described on the line 1. This indicates that pixels having color value 1 are arranged in succession up to the 25th column. Further, data of (1, 5), (2, 8) and (1, 25) are described on the line 3. This indicates that pixels having color value 1 are first arranged up to the 5th column, pixels having color value 2 are arranged from the 6th column to the 8th column, and pixels having color value 1 are further arranged from the 9th column to the 25th column. In the case where pictorial image data is expressed in the form of such runlength data, even if one unit data is constituted by 4 bytes, the entire pictorial image can be expressed as the data volume of 184 bytes in total. As compared to the fact that 1600 bytes are required in the case of expression in the form of raster data, the memory capacity can be greatly reduced. Especially, in the case of a pattern of a screen tint film, there is a considerable difference between data volumes of the both forms. Accordingly, it is preferable to retain data in the form of runlength data in an apparatus for preparing a screen tint film.

It is to be noted that while a of one (c, a) of data is a column value showing a termination of an arrangement of pixels having the same color value in the above-described embodiment, the number of pixels having the same color value may be used as the column value. For example, in place of line 3 of FIG. 3, that line may be described by data of (1, 5), (2, 3) and (1, 17). In short, a value capable of indicating the termination of pixels having the same color value in any form may be used.

1.3 Function of Data Form Conversion Unit

As previously described, the data form conversion unit 130 has a function to convert runlength data in the main memory 110 to raster data to deliver it to the frame memory 120. The logic for converting runlength data to raster data is very simple. For example, runlength data of (1, 5), (2, 8), (1, 25) on the line 3 is converted to raster data (11111222211 . . . 111). Such a conversion produces raster data having the same magnification as the runlength data. In the case of expanding or contracting display, a coefficient is multiplied with the runlength data as it is to perform an operation corresponding to expansion/contraction thereafter to convert that runlength data to raster data, resulting in good efficiency. In principle, assuming that a magnification is k, an approach is employed to first convert runlength data (c, a) to runlength data (c, ka) thereafter to convert it to raster data. For example, in the case of conducting an expanding display with a magnification of 2 (k=2), data on the above-described line 3 is converted to runlength data of (1, 10), (2, 6), (1, 50), and is then converted to raster data. The detailed operation of the data form conversion unit 130 will be described later in §2.

1.4 Function of the Pictorial Image Processing Unit

The pictorial image processing unit 140 has a function to implement a processing such as a coloring or a drawing, on runlength data in the main memory 110. In principle, an approach is employed that the unit 140 retrieves runlength data subject to processing and modifies it, and then rewrites the content of the memory. In the case of coloring processing, an approach is employed that the coloring processing unit 141 retrieves data (c, a) subject to coloring to change a color value c of the data to a new color value c' and generates data (c', a) to rewrite old data by new data. In the case of the draw processing, an approach is employed that the draw processing unit 142 retrieves data (c, a) corresponding to a drawing area and generates one new data or a plurality of data on the basis of the data (c, a) to rewrite the old data. Further, this pictorial image processing unit includes a polygon input unit 143 having a unique polygon input function. The detailed operation of the coloring processing unit 141, the detailed operation of the draw processing unit 142, and the detailed operation of the polygon input unit 143 will be described at chapters §3, §4 and §5, respectively.

1.5 Comparison with Various Systems

FIG. 4 is a table in which the pictorial image processing system is classified into six types (types A to F) depending on the forms of data to be retained into the disk unit, the main memory, and the frame memory, respectively. Since the frame memory is connected to the visual display, it is common for all the types to retain data in the form of raster data. The type A is a system of reading raster data from the disk unit directly into the frame memory without using the main memory. In the case of this type, since read-in speed from the disk unit is slow, the operability is poor and is therefore not practical. The type B is a system in which a main memory is provided between the disk unit and the frame memory, thus allowing a speed for reading data into the frame memory to be improved. However, since the main memory retains data in the form of raster data, a large memory capacity is required, resulting in an increased cost. The type C is a system in which runlength data is employed as the data form of the main memory in order to reduce the capacity of the main memory. However, this system has a procedure to convert raster data to runlength data thereafter to convert it to raster data for the second time, resulting in poor efficiency.

The types D to F are such that the disk unit is in the form of runlength data. As compared to the types A to C, the occupied capacity of data in the disk unit can be reduced to a great extent. The type D is a system of reading data from the disk unit directly into the frame memory without using the main memory. However, the operability is poor, as it is with the type A. The type E is a system of effecting a conversion to raster data at the time of reading data from the disk unit into the main memory. Conventional devices adopt the system of this type. However, as previously described, there are problems since a large capacity of the main memory is required and the computational efficiency of the image processing is poor. This invention adopts the last-mentioned type F. Since the disk unit and the main memory both retain data in the form of runlength data, the memory efficiency is very good. Particularly, since the capacity of a high cost main memory is reduced, cost is reduced. Further, since a pictorial image processing, such as a coloring or drawing, etc., is implemented on runlength data in the main memory, the computational efficiency in the image processing is also improved. Especially, in the case of a picture like a tint screen film, if the pictorial image data is caused to be in the form of runlength data, data volume is extremely reduced as compared to the raster data. Accordingly, application of this invention to such a pictorial image is very advantageous.

1.6 Merits of Pictorial Image Data Form of the Invention

As described above, the pictorial image processing system of this invention adopts an approach to allow the disk unit and the main memory to both retain image data in the form of runlength data, and to convert the data form to raster data when data is transferred from the main memory to the frame memory. Accordingly, a memory capacity required for the main memory is lowered, resulting in a reduced cost. Since various computational processing is implemented on runlength data in the main memory, more efficient computational processing can be carried out as compared to conventional devices which have implemented various processing to raster data.

§2 Operation of the Data Form Conversion Unit

2.1 Entire Configuration

In this chapter, the operation of the data form conversion unit 130 is described for the apparatus for preparing a tint screen film which has been described in §1. FIG. 5 is a block diagram showing, in more detail, the internal configuration of the data form conversion unit 130. As previously described, the body of this apparatus is a computer 100. A disk unit 200, an input unit 300, and a visual display 400 are connected to the computer 100. As the input unit 300, as previously described, typical input devices, such as keyboard, mouse, and the like, may be used. Further, a layout scanner 500 is connected to the disk unit 200.

The internal configuration of the computer 100 will now be described. The internal configuration of the computer 100 is actually constructed by an organic combination of hardware such as CPU, memory and the like, and software for operating the hardware. The components can be considered to be classified into function blocks. Picture data read out from the disk unit 200 is stored into the main memory 110. The picture data in the main memory 110 is transferred into the frame memory 120 through a path which will be described later. On the basis of the picture data in the frame memory 120, a picture display is conducted on the visual display 400. An operator carries out an image processing, such as a coloring, etc., while looking at this picture display. An instruction of the pictorial image processing from the operator is given to a pictorial image processing unit 140 through the input unit 300. The pictorial image processing unit 140 updates pictorial image data in the main memory 110 on the basis of this instruction. This method will be described in detail at §3 and chapters succeeding thereto. The updated pictorial image data is transferred to the frame memory 120. Thus, an updated picture display is conducted on the visual display 400. Accordingly, after an operator gives an instruction of a pictorial image processing such as coloring, he can immediately confirm that processed result on the visual display 400.

2.2 Configuration of the Data Form Conversion Unit

As previously described, in the conventional apparatus, the main memory 110 retains pictorial image data in the form of raster data, but this apparatus is characterized in that the main memory 110 retains pictorial image data in the form of runlength data. However, the frame memory 120 requires the form of raster data in order to display a picture on the visual display 400. For this reason, conversion of the data form must be carried out in the process for transferring pictorial image data to the frame memory 120. In addition, in order to conduct an expanding display or a contracting display of a picture, it is also necessary to perform an expansion/contraction computation. The feature of this device resides in that such a processing can be made. This data transfer process will now be described in detail.

The components participating in the data transfer process will now be described with reference to FIG. 5. Initially, runlength data (c, a) in the main memory 110 is extracted by a runlength extraction section 131. A magnification conversion processing is implemented to the runlength data (c, a) at a magnification conversion section 132, resulting in runlength data (c, A). A raster data generation section 133 converts this runlength data to raster data to deliver it to the frame memory 120. In this way, pictorial image data in the main memory 110 is transferred to the frame memory 120. This transfer process is carried out on the basis of an instruction of an operator. Namely, the operator gives display object information and a magnification to a display object information input section 134 and a magnification input section 135, respectively. Here, the display object information is information indicating which portion of one pictorial image held in the main memory 110 is displayed, and the magnification is a value indicating by what expanding rate or contracting rate a pictorial image is displayed on the visual display. The runlength extraction section 131 extracts runlength data participating in the display object information from the main memory 110 on the basis of given display object information. Further, the magnification conversion section 132 performs a computation of conversion of magnification on the basis of a given magnification.

2.3 Data Transfer Process

Figure 6:
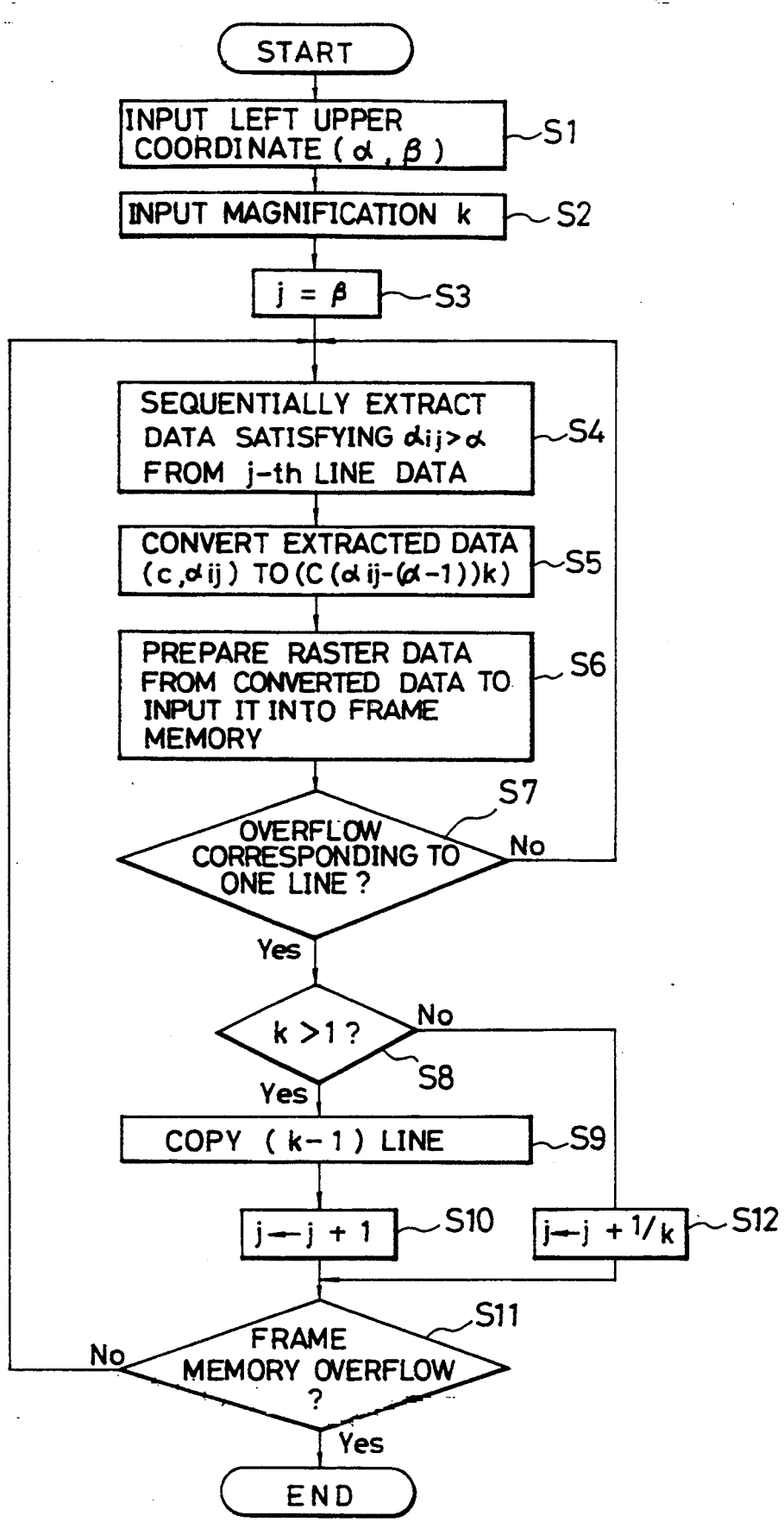
FIG. 6 is a flowchart showing the operation of the data form conversion unit 130 shown in FIG. 5.
Figure 7:
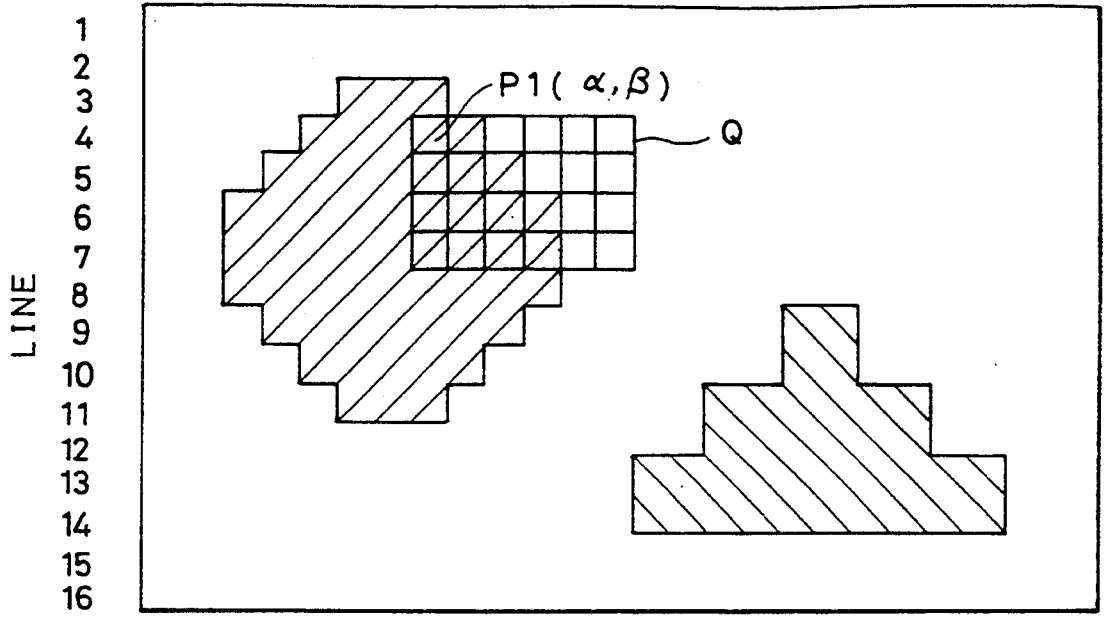
FIG. 7 is a view showing an example of a pictorial image for explaining the procedure shown in the flowchart of FIG. 6.
Figure 8A:
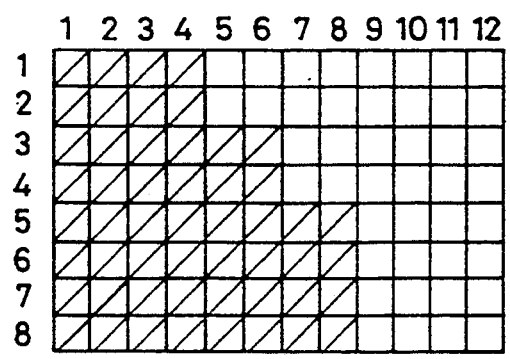
FIG. 8a is a view showing a display picture obtained by magnifying two times the pictorial image shown in FIG. 7.

The components participating in the data transfer process have been described as above. The data transfer process by these components will now be described with reference to an actual example. FIG. 6 is a flowchart of this process. It is now assumed that one pictorial image as shown in FIG. 2a is stored into the main memory 110. Of course, in an actual sense, data is held or retained in the form of runlength data as shown in FIG. 3. For example, suppose that an operator has a desire to take a partial pictorial image indicated by the area Q in FIG. 7 as the display object area to display a pictorial image obtained by magnifying that partial pictorial image two times on the visual display 400. The area Q is a partial pictorial image of 6×4 pixels. When that image is magnified two times, a pictorial image of 12×8 pixels is provided on the visual display 400 as shown in FIG. 8a. The processing procedure for providing such a magnified pictorial image will be described in accordance with the flowchart of FIG. 6. Initially, at step S1, a left upper coordinate ($\alpha$, $\beta$) is inputted wherein $\alpha$ and $\beta$ represent coordinate values of a pixel P1 at the left and upper part of the display object area Q as shown in FIG. 7. In this example, $\alpha=8$ and $\beta=4$. Subsequently, at step S2, a magnification k is inputted. In this example, an expanding display of k=2, i.e., with a magnification of 2 is conducted. The above-mentioned input operations are implemented on the display object information input section 134 and the magnification input section 135 through the input unit 300 (e.g., key board), respectively. It is to be noted that it is sufficient in the apparatus of this embodiment that only left and upper coordinate values ($\alpha$, $\beta$) are inputted as information indicative of the display object area. If there is no information indicative of a size of the area Q (e.g., the number of pixels in line and column directions of the area Q), the area Q cannot be specified, and the size of the area Q is indirectly determined by the size of the frame memory 120 and the magnification k in this apparatus. For example, if the size of the frame memory 120 is 12 pixels×8 pixels as shown in FIG. 8a and the magnification k is equal to 2, the area Q is automatically determined by specifying only the position of the pixel P1.

When an operator inputs ($\alpha$, $\beta$) and k, the computer 100 conducts the following processing on the basis of these inputs. Initially, at step S3, an initial value of a parameter j indicative of line is set to $\beta$. In the case of this example, since $\beta$ is equal to 4, the initial value of j is also equal to 4. This means that it is sufficient to start extraction of runlength data from the fourth line. Eventually, the runlength data extraction section 131 conducts an extraction from date on the fourth line of the runlength data shown in FIG. 3. Namely, at step S4, the extraction section 131 extracts, in order, data (c, aij) which satisfies aij>$\alpha$ from data on the j-th line where (c, aij) means the i-th data from the left on the j-th line of runlength data shown in FIG. 3. In this embodiment, since the initial value of j is equal to 4 and $\alpha$ is equal to 8, the second data (2, 9) from the left on the fourth line is first extracted as data which satisfies the above-described condition.

The data thus extracted is sent to the magnification conversion section 132. At step S5, an operation of magnification is implemented thereon. This magnification operation is an operation for providing (c, (aij-($\alpha$-1)) k) on the basis of the extracted date (c, aij). Assuming that A=(aij-($\alpha$-1)) k, the above-mentioned operation can be said to be an operation for converting data (c, aij) to data (c, A). In the case of this example, by substituting $\alpha=8$ and k=2 into the above-described operational formula, the extracted data is converted to data (2, 4). The data (2, 4) thus converted is delivered to the raster data generation section 133.

At step S6, the raster data generation section 133 generates raster data from the converted data (2, 4). Namely, raster data (2, 2, 2, 2) comprised of successive four pixels having color value 2 is generated. This raster data is stored in the first line in the frame memory 120 with data elements being closely arranged from the left. This corresponds to the first to the fourth columns on the first line in FIG. 8a.

Subsequently, at step S7, whether or not the frame memory 120 overflows by one line is judged. Namely, whether or not the first line being stored at present overflows is judged. In the case of this example, as shown in FIG. 8a, since the fifth column and columns succeeding thereto are empty, the first line does not overflow. The processing procedure returns to the step S4. At the step S4, the runlength extraction section 131 extracts the next data. Namely, the third data (1, 25) from the left of the fourth line is extracted. The magnification conversion section 132 converts that data to provide converted data (1, 36). The raster data generation section 133 generates raster data on the basis of that converted data. In the case of this example, since columns up to the fourth column are already filled in the first line, raster data (1, 1, 1, . . . , 1) comprised of successive 32 pixels having color value 1 are generated from the fifth column to the 36th column, respectively. These raster data are stored being closely arranged from the fifth column in the first line of the frame memory 120. However, since the first line of the frame memory has only 12 columns, color values 1 are filled until the 12th column, so the first line would overflow. Thus, color values from the 13th column to the 36th column are disregarded. At the subsequent step S7, since there was an overflow, the processing procedure proceeds to step S8. The data transfer process corresponding to one line has been described as above.

At the subsequent step S8, whether or not k is greater than 1, i.e., the display magnification indicates expansion (k>1) or contraction (k<1) is judged ( In this embodiment, in the equimultiple case of k=1, processing is carried out by the procedure of contraction). Since k>1 holds in this example, at step S9, copying corresponding to (k-1) lines is carried out. This copy processing is defined as a processing such that the raster data generation section 133 generates raster data corresponding to (k-1) lines, which are exactly the same as that of the preceding line, to memorize them into succeeding (k-1) lines of the frame memory. In the case of this example, since k is equal to 2, raster data corresponding to one line, which is exactly the same as that of the first line of FIG. 8a, is further generated. This raster data is copied into the second line as it is. In addition, if k is equal to 3, raster data of the first line is copied into the second and third lines.

When copying is completed, the value of j is updated at step S10. In the case of this example, updated j is equal to 5. Thus, at the next time, data will be extracted from the fifth line of FIG. 3. Thereafter, at step S11, whether or not the frame memory overflows is judged.

The overflow of the frame memory indicates the case where raster data have been stored into all the lines of the frame memory 120. In this embodiment, the above-mentioned overflow indicates the case where raster data are stored into all lines up to the eight line of FIG. 8a. In this example, since lines up to the second lines are only filled with raster data, the processing procedure returns to the step S4 for a second time.

Since j is already updated at the step S4, extraction of runlength data of the fifth line of the main memory 110 is carried out. At times subsequent thereto, similar processing will be repeatedly executed. At the time point when the value of j is updated into 8, the frame memory overflows. Thus, the entire procedures are completed. Finally, raster data as shown in FIG. 8a is provided in the frame memory 120. Thus, a picture display that an operator wants to obtain is provided on the visual display 400. As stated above, the expansion/contraction operation is implemented on runlength data. Accordingly, the efficiency is extremely improved as compared to the method of implementing such an operation to raster data as in the conventional apparatus.

Figure 8B:
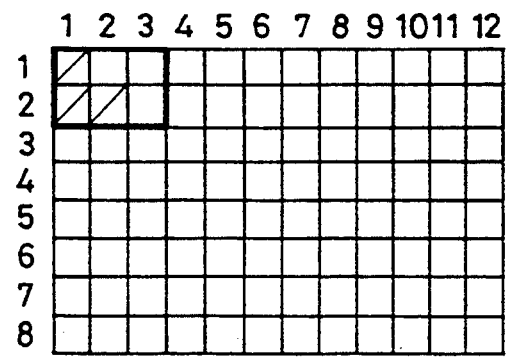
FIG. 8b is a view showing a display picture obtained by contracting one half the pictorial image shown in FIG. 7.

The processing procedure in the case of carrying out an expanding display has been described. The processing in the case of carrying out an contracting display is substantially the same processing as the above-described processing, but differs from the latter to some extent. For example, consider the case where a designation is made such that k is equal to $\frac{1}{2}$ to conduct a $\frac{1}{2}$ contracting display. For convenience, it is assumed that the area Q of FIG. 7 is a display object area and the frame memory has a size of $3 \times 2$ pixels encompassed by the thick line of FIG. 8b. In this case, at step S5 in the flowchart of FIG. 6, since k equals $\frac{1}{2}$, the second runlength data (2, 9) from the left of the fourth line is changed to runlength data (2, 1). Accordingly, as shown in FIG. 8b, the pixel having color value 2 on the first line exists only on the first column. It is to be noted that where any fraction occurs as the result of the fact that k is multiplied in the magnification conversion, processing such as raising to a unit or omission is implemented thereon. Further, at step S8, since $k < 1$ holds, the processing procedure proceeds to step S12. At step S10, j is increased by 1, whereas, at step S12, j is increased by 1/k. Namely, when k is equal to $\frac{1}{2}$, j is increased by 2. Thus, an updated value of j becomes equal to 6. As a result, runlength data of the sixth line of FIG. 3 will be extracted from the next time. In other words, the fifth line is thinned out. Eventually, raster data of the first line of FIG. 8b is generated on the basis of runlength data of the fourth line of FIG. 3, and raster data of the second line of FIG. 8b is generated on the basis of runlength data of the sixth line of FIG. 3. In a manner described above, a display picture of which size is reduced to one half as shown in FIG. 8b is provided.

While the data form conversion unit 130 has been described in accordance with the embodiment, this invention is not limited to such an embodiment, but may be modified in various forms. For example, an approach is employed in the above-described embodiment to implement magnification conversion to a unit data (c, a) each time to determine data (c, A) to convert it to raster data to store it into the frame memory. An approach may instead be employed to first conduct a magnification conversion corresponding to one line thereafter to correctively determine raster data corresponding to one line to correctively transfer raster data corresponding to one line to the frame memory. In addition, an approach may be employed to first conduct a magnification conversion corresponding to one display picture thereafter to sequentially convert it to raster data to transfer it to the frame memory.

2.4 Merits Resulting from the Provision of the Data Form Conversion Unit

As stated above, the pictorial image processing system according to this invention has a scheme to hold pictorial image data in the form of runlength data in the main memory to extract a necessary portion of this pictorial image data to implement magnification conversion thereon thereafter to convert it so as to take the form of raster data to transfer it to the frame memory. Thus, the capacity of the main memory can be lowered, resulting in a reduced cost, and highly efficient expansion/contraction computation can be performed.

§3 Operation of the Coloring Processing Unit

3.1 Entire Configuration

Figure 9:
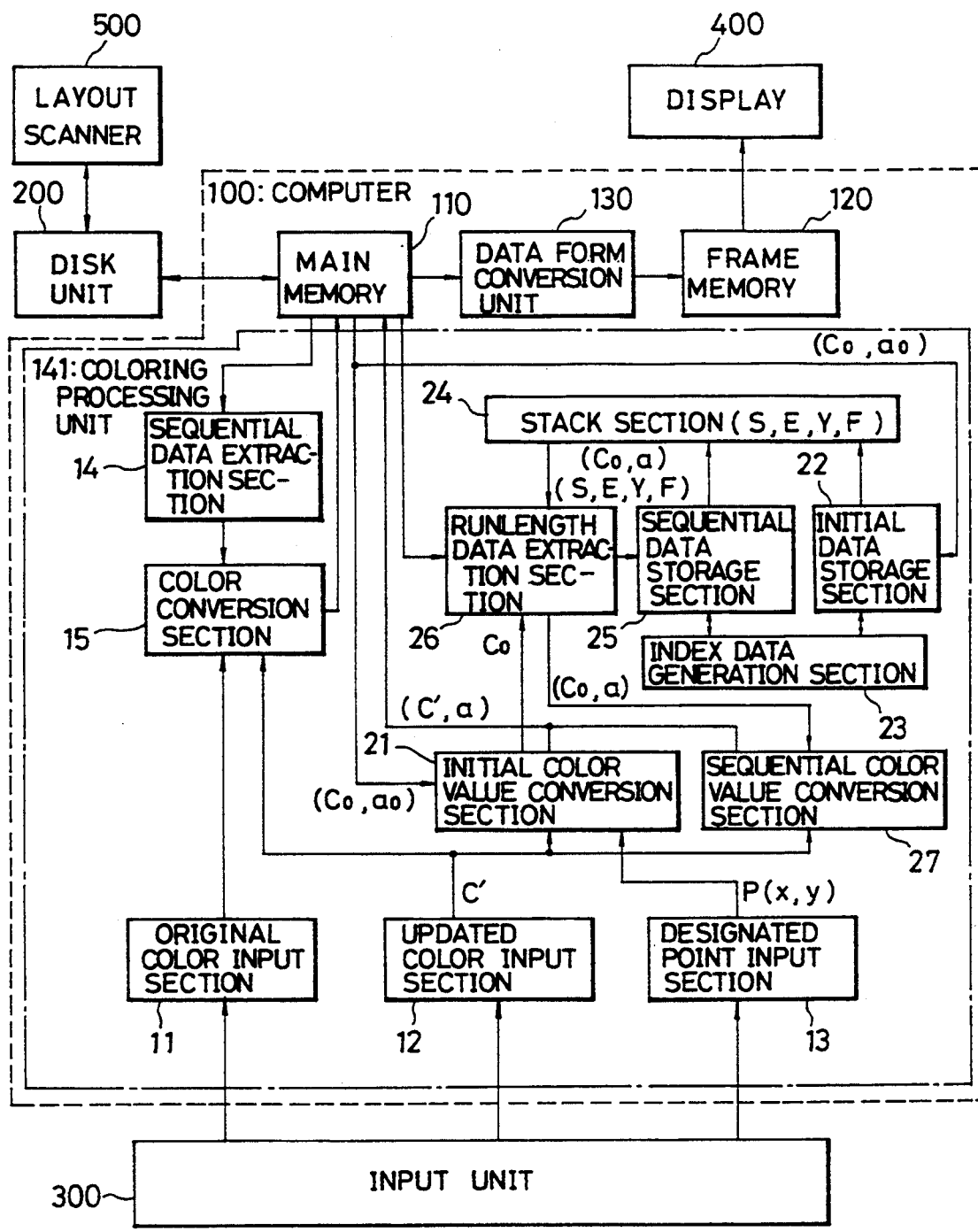
FIG. 9 is a block diagram showing, in more detail, the internal configuration of the coloring processing unit in the apparatus shown in FIG. 1.

At this chapter, the operation of the coloring processing unit 141 in the apparatus for preparing a screen tint film which has been described at §1 will be described in detail. FIG. 9 is a block diagram showing in more detail the internal configuration of the coloring processing unit 141 of the apparatus shown in FIG. 1. The internal configuration of the coloring processing unit 141 will be first described.

An instruction of a pictorial image processing from an operator is given to an original color input section 11, an updated color input section 12 and a designated point input section 13 through the input unit 300. For the coloring processing of this apparatus, two kinds of methods are prepared. The first method is an original color inputting method, and the second method is a designated point inputting method. In the case of the former method, a coloring instruction is given in the form of "Allow a portion of a first color (original color) in a pictorial image to be colored into a second color (updated color)". Namely, when an original color and an updated color are inputted to the original color input section 11 and the updated color input section 12, respectively, a portion of the original color in the pictorial image is colored by the updated color. This processing is carried out by a sequential data extraction section 14 and a color conversion section 15. On the other hand, in the case of the latter method, a coloring instruction is given in the form of "Allow a closed area including a point P in pictorial image to be colored into a predetermined color (updated color)". Namely, when coordinate values of the point P in the pictorial image P and an updated color are inputted to the designated point input section 13 and the updated color input section 12, respectively, a closed area including the point P in the pictorial image (contiguous portions having the same color) is colored by the updated color. This processing is carried out by respective sections designated by reference numerals 21 to 27.

3.2 Coloring Method by Inpputing of Original Color

The coloring method by inputing of original color will be first described. For convenience of explanation, it is assumed that a pictorial image as shown in FIG. 10 is stored in the main memory 110. This pictorial image is composed of three closed areas of an area Q0 serving as a background and areas Q1 and Q2 serving as a pattern (both areas are indicated by hatched lines). The area Q0 is comprised of a set of pixels having color value 0, and the areas Q1 and Q2 are each comprised of a set of pixels having color value 1. The area Q1 is divided into nine portions labeled R1 to R9 as shown in FIG. 11. When column values of the boundaries between respective portions are represented by a to x, runlength data of lines up to the sixth line are as shown in FIG. 12. It is to be noted that each element (c, a) of such runlength data will be called "run" hereinafter.

Figure 13:
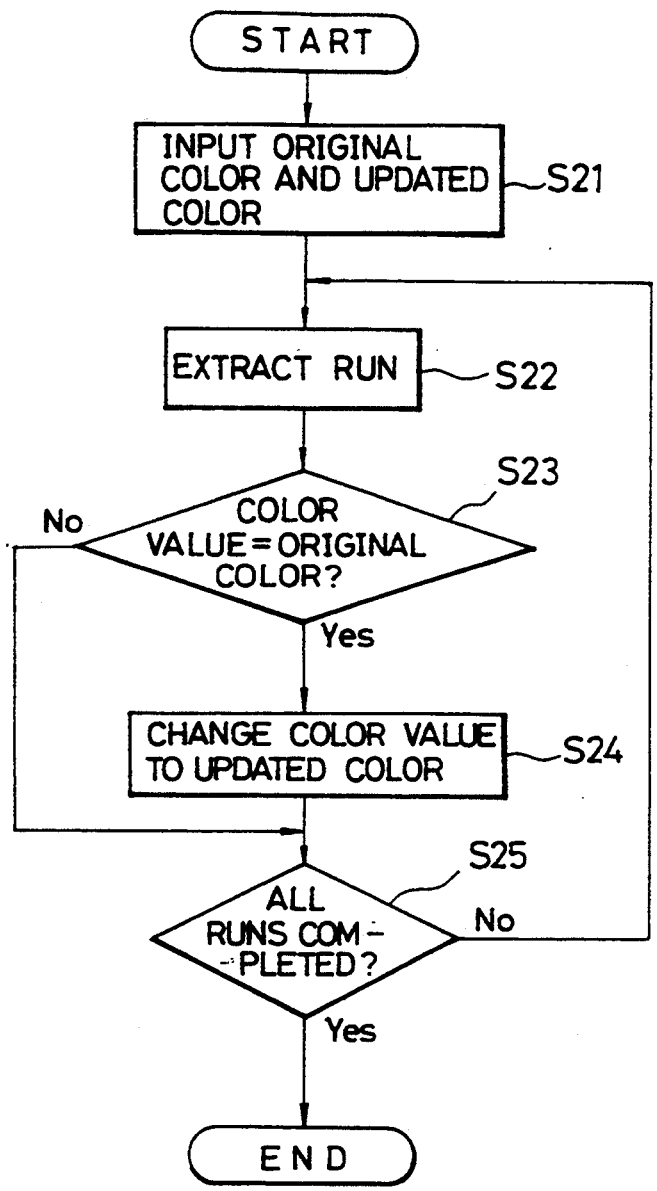
FIG. 13 is a flowchart showing the procedure of a coloring processing by a first method in the coloring processing unit shown in FIG. 9.

The operation in the case where an instruction of "Allow a portion of a color value 1 (original color) to be all colored into a color value 2 (updated color)" with respect to such a pictorial image is given will now be described in accordance with the flowchart of FIG. 13. Initially, at step S21, an operator inputs an original color and an updated color. Namely, by means of the input unit 300 such as a key board, color value 1 and 2 are inputted into the original color input section 11 and the update color input section 12, respectively.

As the subsequent step S22, extraction of runs is carried out. The sequential data extraction section 14 extracts runs one by one from runlength data in the main memory 110 to transfer them to the color conversion section 15. Extraction of runs may be carried out in a predetermined order. For example, there may be employed a method of extracting runs from upper lines and from the left within the same line in order. In the example of FIG. 12, runs are extracted in order of (0, a),(0, b), (1, c) . . . .

At step S23, whether or not color values of the extracted runs are equal to that of the original color is judged. In the above-described example, runs (0, a) and (0, b) both have a color value of 0 and are not equal to that of the original color, but run (1, c) has a color value of 1 which is equal to that of the original color. At step 24, a color value of runs equal to the original color is changed to that of an updated color. Accordingly, run (1, c) is newly changed to run (2, c). Such a processing is repeatedly implemented to all runs (step S25). Such a change of run is carried out at the color conversion section 15. The main memory 110 is rewritten by the changed run data. Eventually, all runs having color value 1 in FIG. 12 rewritten into runs having color value 2, and the areas Q1 and Q2 of FIG. 10 are colored by an updated color.

As stated above, in accordance with this method, by changing only a portion of a color value of runlength data as shown in FIG. 12, a desired coloring processing is completed. Accordingly, as compared to the conventional method of implementing processing to massive raster data, the computational efficiency is a improved, resulting in a shortened computational time.

3.3 Coloring Method I by Inputting Designated Points

The coloring method by inputting of designated points will now be described in accordance with the same example as in the previously described method.

In the case of the method by inputting of designated points, an instruction of "Allow a closed area to which a point P belongs to be colored by a color having color value 2 (updated color)" is given. For example, when a point P is designated as shown in FIG. 10, the area Q1 is colored by a color having color value 2. In this case, one feature of this method resides in that, although the area Q2 has the same color value 1, it is not colored. The operation in the case where such a coloring instruction is given will be described in accordance with the flowchart FIG. 14.

Initially, the basic principle of this coloring processing will be briefly described. The point P of FIG. 10 is included in the portion R5 of FIG. 11. Accordingly, it is sufficient to first color a run corresponding to the portion R5. Namely, a run (1, m) of the line 4 of FIG. 12 is changed to a run (2, m). Then, retrieval processing for searching portions adjacent to the upper or lower part of the portion R5 and having color value 1 is conducted. In the case of this example, portion R3 and R6 are found out. Then, runs corresponding to these portions R3 and R6 are extracted to carry out the processing for changing the color value so that it is equal to 2. Thereafter, a retrieval processing for searching portions adjacent to the upper or lower part of the portions R3 and R6 and having color value 1 is carried out. For the portion R3, the portion R1 is found out. For the portion R6, portions R4, R7 and R8 are found out. Then, runs corresponding to portions R1, R4, R7 and R8 are extracted to conduct a processing for changing the color value to 2. When such a processing is repeatedly executed, there will be no portion adjacent to the already extracted portion having a color value of 1. At this time, the work is complete. For retrieving portions adjacent to the upper or lower part, index data is used in this example. One index data is composed of four elements of (S, E, Y, F). In this expression, S and E represent coordinate values in a column direction in the figure. For example, values expressed as $S=l$ and $E=m$ are given in relation to the portion R5. Further, Y corresponds to the line No. in the figure. For example, in the case of indicating a line above the portion R5, $Y=3$ is given, and in the case of indicating a line below the portion R5, $Y=5$ is given. In addition, F is a flag indicating a retrieval direction wherein "up" indicating an upward direction and a "dn" indicating a downward direction are used. The detail of the retrieval processing using such index data will be described later.

The coloring processing based on the flowchart of FIG. 14 will be described in details. Initially, at step S26, a designated point P (x, y) is inputted. Namely, coordinate values (x, y) is given to the designated point input section 13 through the input unit 300. When a coordinate input device such as a mouse is used as the input unit 300, an operator can designate a desired position while looking at a picture displayed on the visual display 400. Subsequently, at step S27, a designated color is inputted. Namely, a color value c' (c'=2 in the case of this example) of an updated color is given to the updated color input section 12 through the input unit 300. The above-described steps are carried out by the operator. The steps subsequent thereto will be automatically carried out by the computer 100.

First, at step S28, a starting point run $(c_0, a_0)$ is extracted. This starting point run is a run inclusive of the position of an inputted point P. For example, when a point P of FIG. 10 is inputted, the portion R5 in FIG. 11 is a portion inclusive of the position of the point P, and a run corresponding thereto is the fourth run (1, m) of the line 4 in FIG. 12. Namely, in the case of this example, run (1, m) is extracted as the starting point run. Subsequently, at step S29, a color value of this starting point run is recognized as an original color. Namely, color value "1" is recognized as the original color. At times subsequent thereto, the work for coloring areas having color value 1 by updated color 2 will be conducted. Initially, at step S30, the color value of the starting point run is changed to that of the updated color. Namely, the starting point run (1, m) is changed to (2, m), and is then written into the main memory 110. Thus, the color of portion R5 of FIG. 11 is changed to the updated color. The above-mentioned steps S28 to S30 are executed at the initial color value conversion section 21. The operation of the initial color value conversion section 21 will be described in accordance with the block diagram of FIG. 9 as follow. Initially, a starting point run ($c_0$, $a_0$) is extracted from the main memory 110 on the basis of coordinate values (x, y) of a point P given from the designated point input section 13. This may be accomplished by determining a corresponding line from the y coordinate value and examining runs (c, a) on the corresponding line in order from the left side to extract such a first run to satisfy $a \geq x$ as a starting point run. In the example of FIG. 12, it is first determined that a corresponding line is line 4 from the y coordinate value. When runs on the line 4 are examined in order from the left side, because the condition expressed as j, k, $l < x$ holds, a first run which satisfies this condition is the forth run (l, m). Subsequently, the original color $c_0$ is recognized from the starting point run to memorize it. The starting point run is then changed to (c', $a_0$) by an updated color c' given from the updated color input section 12. The starting point run thus changed is written into the main memory 110.

At the subsequent step S31, index data is generated on the basis of the starting point run and is then accumulated into the stack. Namely, the initial data storage section 22 gives a starting point run ($c_0$, $a_0$) to the index data generation section 23 to accumulate the index data generated as that result into the stacked section 24. The index data generation section 23 generates two index data expressed below:

(s, e, y+1, dn)

and (s, e, y−1, up).

Where s is an X-coordinate value of a run preceding the starting point run by one, e is an X-coordinate value of the starting point run (i.e., $a_0$), and y is No. of a line where the starting point run is positioned. For facilitating understanding, an explanation will be made in conjunction with actual examples shown in FIGS. 10 to 12. Since the starting point run is the fourth run (l, m) of the line 4 (y=4) as previously describe, two index data generated on the basis of this run are as follows:

(l, m, 5, dn)

and (l, m, 3, up).

These two index data are accumulated or stored into the stack section 24 as initial data. The duty of the initial data storage section 22 is completed. The generation of index data at times subsequent thereto and the storage work are carried out by the sequential data storage section 25.

What is meant by the index data will be briefly described. Generally, the index data takes a form of (S, E, Y, F). This index data gives an instruction for carrying out a work for extracting a run which satisfies the following three conditions, and therefore it can be considered that the index data indicates a retrieval target area. Namely, the three conditions are as follows:

Condition 1: runs on the line Y
Condition 2: runs overlapping with sections S to E
Condition 3: color value of each run is equal to the color value $c_0$ of the starting point run.

Here, runs overlapping with sections S to E means runs indicating pixel trains such that a portion (or the whole) thereof is positioned on columns (S+1) to column E. Further, dn or up which is a flag indicating the direction is utilized for a pattern recognition (which will be described later) in the case of generating new index data on the basis of extracted runs. It is to be noted that the condition 3 is not a condition directly included in the index data, but a condition common to all index data. Accordingly, it can be considered that index data (l, m, 5, dn) of the above-described actual example gives an instruction for carrying out a work for retrieving runs which satisfy the following three conditions. Namely, the three conditions are as follows:

Condition 1: runs on the line 5
Condition 2: runs overlapping with section l to m
Condition 3: color value of each run is equal to the color value $c_0$ of the starting point run.

Eventually, in the example of FIG. 11, as a result of retrieval, it is found that a run with respect to the portion R6 satisfies the above-mentioned three conditions. Thus, this run will be extracted. Further, the index data (l, m, 3, up) means an instruction to extract similar runs from runs on the line 3. In the example of FIG. 11, it results that run with respect to the portion R3 will be extracted.

The procedure up to the steps S31 which has been described above is called a procedure for carrying out the initialization. By this processing, two index data will be accumulated into the stack section 24. The repetitive works from the step S32 up to the step S37 are works for repeating processing to read out one index data from the stack, to retrieve a corresponding run on the basis of the instruction of this index data, on implement coloring processing to the corresponding run, to further generate new index data on the basis of the corresponding run, and to accumulate generated index data into the stack. When such a repetition is continued until the stack is empty, a desired coloring work is completed. This repetitive work will now be described.

Initially, at step S32, whether or not the stack is empty is judged. As previously described, at the time point when the stack is empty, this repetitive work is completed. In the case where index data remain in the stack, any one of index data is read out at step S33. In the case where a plurality of index data are accumulated, the readout operation may carried out from any index data. In this embodiment, the readout operation is carried out in order of First In, Last Out. Subsequently, at step S34, a retrieval target area indicated by this index data is retrieved to judge whether or not there is a corresponding run. As a result, if the corresponding run is present, that run is extracted at step S35. The processing from the above-mentioned step S32 up to S35 is carried out by the runlength data extraction section 26 in the apparatus shown in FIG. 9. Namely, the runlength data extraction section 26 has a function to read out one index data from the stack section 24 to retrieve the main memory 110 on the basis of the index data and the color value $c_0$ of the starting point run described in the initial color value conversion section 21 to extract a corresponding run. The extracted corresponding run is delivered to the sequential data storage section 25 and the sequential color value conversion section 27. It is to be noted that the runlength data extraction section 26 delivers index data read out from the stack section along with the extracted run to the sequential data storage section 25.

If a corresponding run is extracted, the color value $c_0$ of this corresponding run is changed to a color value $c'$ of an updated color. Namely, the sequential color value conversion section 27 in FIG. 9 carries out a work for changing the extracted corresponding run ($c_0$, a) to ($c'$, a) to write the changed run into the main memory 110.

At the subsequent step S37, new index data is generated on the basis of the corresponding run and the index data used for retrieving this corresponding run. The new index data thus generated is accumulated into the stack. The sequential data storage section 25 carried out this work. The sequential data storage section 25 receives, as described above, the run and the index data from the runlength data extraction section 26 and delivers it to the index data generation section 23 to generate new index data which is accumulated into the stack section 24.

When the processing up to the step S37 is completed, the processing procedure returns to the step S34 for a second time. Namely, whether or not there is a corresponding run based on the same index data is judged. Since a corresponding run which satisfies three conditions that one index data indicates is not generally limited to one, the processing at the steps S35 to S37 will be repeated for all corresponding runs. When the processing for all corresponding runs is completed, the processing procedure returns from the step S34 to the step S32. Namely, new index data is read out from the stack and exactly the same processing will be repeated on the basis of this index data. Such a work is repeated until the stack becomes empty.

The processing for generating new index data at step S37 will now be described in detail. Eventually, this processing can be said to be "a processing for generating new index data on the basis of index data (S, E, Y, F) and a run ($c_0$, a) extracted on the basis of this index data". This processing will be separately described in connection with the case where a flag F indicating the direction is dn and the case where that flag F is up.

Initially, the case of F=dn will be described in accordance with FIG. 15. The concept of this diagram is first referred to. For convenience of explanation, an explanation will be described by taking an example of FIG. 15a. This diagram shows pixel trains positioned on the line (Y−1) and the line Y therebelow where numbers in the pixel trains indicate color values of those pixel trains. Expression of these pixel trains by runlength data is as follows:

(0, a) (1, b) (0, c)

(0, $\alpha$) (1, $\beta$) (0, $\gamma$).

It is now assumed that the processing for allowing the portion of the color value 1 (original color) to be colored into a color value 2 (updated color) is being conducted. Accordingly, the hatched portions in the figure are changed so that they have color value 2. Assuming now that a run of (1, b) of the line (Y−1) is the starting point run, as previously described, index data of (a, b, Y, dn) and index data of (a, b, Y−2, up) are generated on the basis of that run. It is to be noted that the run (1, b) is not necessarily required to be the starting point run.

Attention may be drawn to such a state as described below. Namely, an arbitrary run (1, b) is extracted, and this run is changed to (2, b), that is, the coloring processing has been completed, and index data (a, b, Y, dn) has been generated on the basis of this run. When reading out the index data (a, b, Y, dn) to make a retrieval on the basis of this index data, a run of (1, $\beta$) is found out on the line Y. Thus, this run is to be extracted. The run (1, $\beta$) satisfies the following three conditions:

Condition 1: runs on the line Y

Condition 2: runs overlapping with sections a and b

Condition 3: color value of each run is equal to color value 1 of the starting point run FIG. 15a shows the state where such a run (1, $\beta$) is extracted. The case where a run is extracted on the line Y is not limited to the case of FIG. 15a, but may be cases as shown in FIGS. 15b to 15d. Eventually, as the pattern of a corresponding run of the line Y, there results any one of patterns 1 to 4 shown in FIGS. 15a to 15d. The logic conditions of respective patterns are shown together in the figure. Accordingly, as the retrieval work, a logic work for searching a run which satisfies any one of logic conditions of these patterns is carried out.

In the apparatus of FIG. 9, when a corresponding run (1, $\beta$) is found out on the line Y on the basis of index data (a, b, Y, dn), the runlength data extraction section 26 delivers this corresponding run (1, $\beta$) to the sequential color value conversion section 27. At this section, the corresponding run (1, $\beta$) is changed to (2, $\beta$), and is then written into the main memory 110. On the other hand, index data (a, b, Y, dn) is delivered to the sequential data storage section 25 along with the corresponding run (1, $\beta$). Thus, the index data generation section 23 generates new index date on the basis of these data. Index data generated differ from each other depending upon the above-described four patterns. Index data generated for respective patterns are shown as follows:

Pattern 1: A ($\alpha$, a, Y−1, up) B (b, $\beta$, Y−1, up) C ($\alpha$, $\beta$, Y+1, dn)

Pattern 2: A ($\alpha$, $\beta$, Y+1, dn)

Pattern 3: A ($\alpha$, a, Y−1, up) B ($\alpha$, $\beta$, Y+1, dn)

Pattern 4: A (b, $\beta$, Y−1, up) B ($\alpha$, $\beta$, Y+1, dn).

As described above, the number of index data generated varies depending upon the kinds of patterns. Eventually, when index data is generally expressed as (s, e, y, f), new index data are generated by arranging a start point s and an end point e of a retrieval target area to be detected from now, a line No. y thereof, and a direction flag f indicating the positional relationship between a line of a run which is extracted and is being processed at present and a line (line No. y) to be retrieved from now. For example, in the case of the pattern 1, as described above, three new index data of A, B and C are generated. This corresponds to a retrieval target area as indicated in a model form by symbols encircling respective alphabets. It is to be noted that there are instances where a plurality of runs which satisfies the condition of one index data are obtained. For example, in FIG. 15e, three runs which satisfy the condition of (a, b, y, dn) exist. In this case, any one of patterns 1 to 4 is assigned to each run, respectively, and new index data corresponding to retrieval target areas as indicated by encircled A to E in the figure are generated, respectively.

On the other hand, in the case of F=up, patterns 5 to 8 are as shown in FIGS. 16a to 16d. The example in the case where a plurality of runs exist is as shown in FIG.

16e. Index data generated vary depending upon four patterns, and are expressed as follows:

Pattern 5: A ($\alpha$, $\beta$, Y−1, up)
Pattern 6: A ($\alpha$, $\beta$, Y−1, up) B ($\alpha$, a, y+1, dn) C (b, $\beta$, Y+1, dn)
Pattern 7; A ($\alpha$, $\beta$, Y−1, up) B (b, $\beta$, Y+1, dn)
Pattern 8; A ($\alpha$, $\beta$, Y−1, up) B ($\alpha$, a, Y+1, dn)

It is to be noted that the flag F indicating the direction is required for determining whether the pattern of FIG. 15 is applied, or the pattern of FIG. 16 is applied. This is because where index data of (a, b, Y, F) is given along with the run ($\alpha$, $\beta$), if a > $\alpha$ and b < $\beta$, it is impossible to discriminate whether the pattern 1 is applied or the pattern 6 is applied unless reference is made to the flag F.

Figure 14:
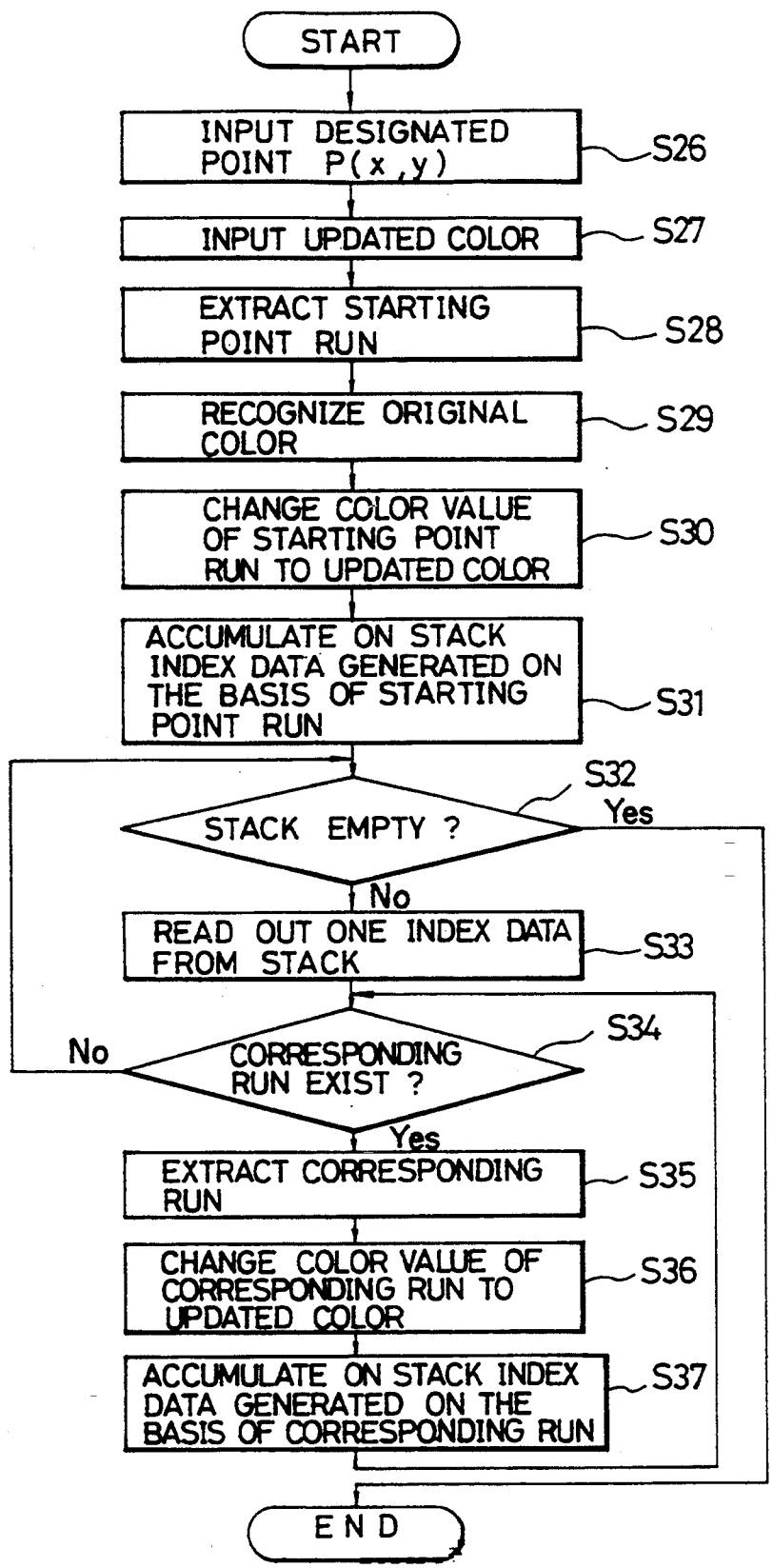
FIG. 14 is a flowchart showing the procedure of a coloring processing by a second method in the coloring processing unit shown in FIG. 9.
Figure 15E:
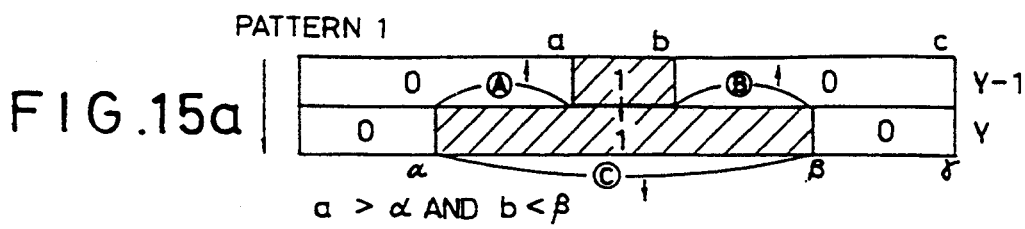
Figure 15E:
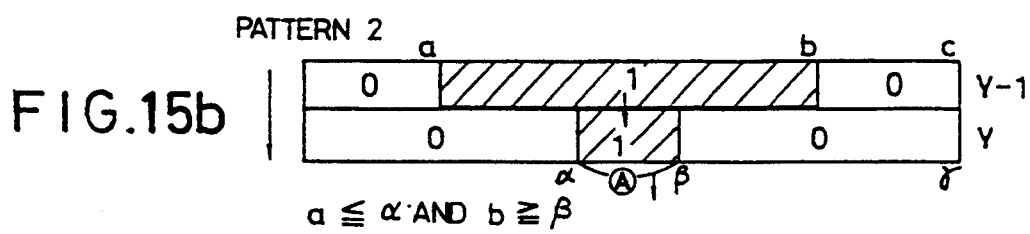
Figure 15E:
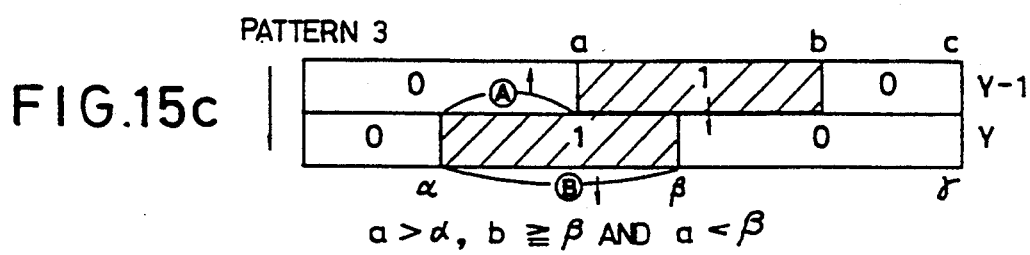
Figure 15E:
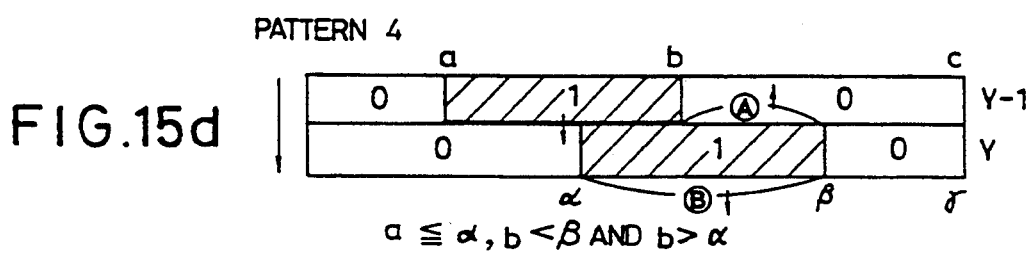
Figure 15E:
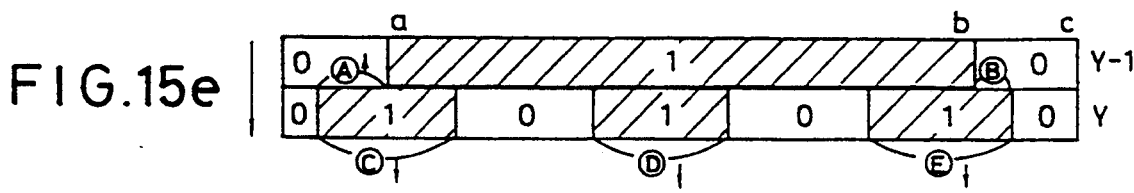
Figure 16A:
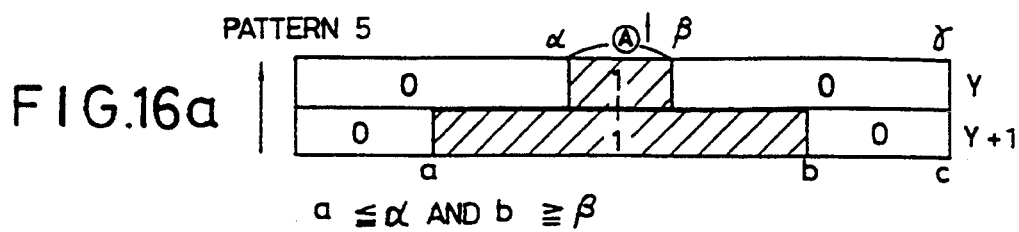
Figure 16B:
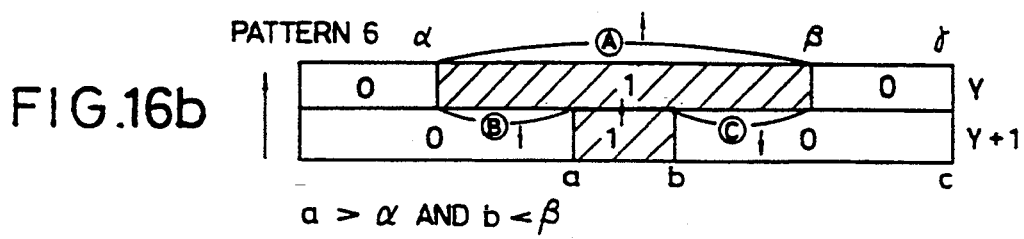
Figure 16C:
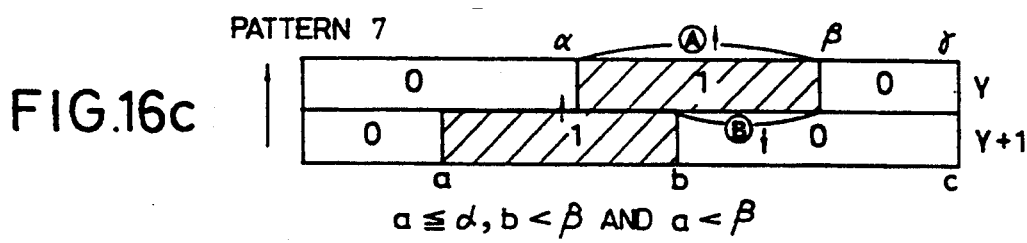
Figure 16D:
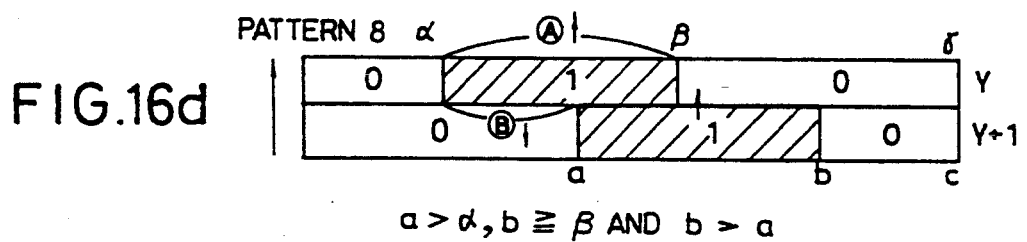
Figure 16E:
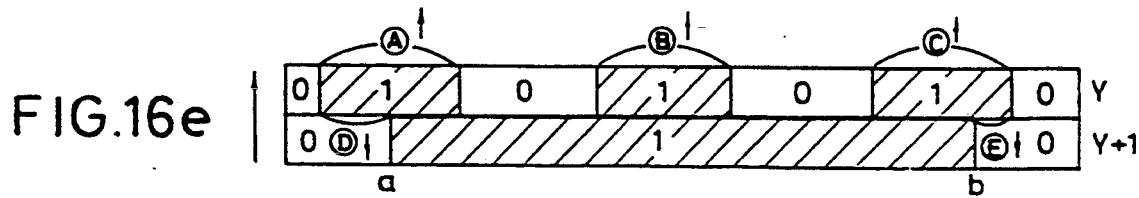

Finally, the flow of the work in the case where the processing shown in the flowchart of FIG. 14 is applied will be briefly described in connection with the examples shown in FIGS. 10 to 12.

Initially, a run (1, m) with respect to the portion R5 is taken out as the starting point run. This run is changed to (2, m), and two index data (l, m, 3, up) and (l, m, 5, dn) are generated. Then, (l, m, 5, dn) is read out, and a run (1, p) with respect to the portion R6 is extracted as a corresponding run on the line 5. The applied pattern at this time is the pattern 1. Thus, after the corresponding run (1, p) is changed to (2, p), the following three index data are generated and are accumulated into the stack.

D1(o, l, 4, up)

D2(m, p, 4, up)

D3(o, p, 6, dn)

Subsequently, the above-described index data D3 is read out, Thus, a run (1, s) with respect to the portion R7 and a run (1, u) with respect to the portion R8 are extracted as corresponding runs on the line. The applied pattern of the former is the pattern 3 and the applied pattern of the latter is the pattern 2. With respect to the former, the following index data are generated:

D4(r, o, 5, up)

D5(r, s, 7, dn).

With respect to the latter, the following index data is generated:

D6(t, u, 7, dn).

These index data are accumulated into the stack. Subsequently, the index data D6 is read out. A corresponding run in the line 7 is retrieved. However, no corresponding run is found out. In this case, no new index data is generated. Thus, the next index data D5 is read out. A run with respect to the portion R9 of the line 7 is extracted. At times subsequent thereto, processing is continued in a manner similar to the above.

3.4 Coloring method II by Inputing of Designated Point

The coloring method of inputting of designated points related to this invention has been described in accordance with the embodiment. In this chapter, a method of another embodiment will be described by referring to the difference between this method and the above-described method. In the above-described method, the index data has a flag F indicating the direction, but the method described below differs from the former method in that this flag F is not used. Namely, the index data takes a form of (S, E, Y). As new index data, even in either cases of the patterns 1 to 8, two index data described below can be generated at all times:

($\alpha$, $\beta$, Y−1)

($\alpha$, $\beta$, Y−1).

Accordingly, in accordance with this method, the logic for generating the new index data becomes very simple. On the other hand, the drawback with this method is that since an already extracted section is retrieved for a second time, a wasteful retrieval work cannot be avoided. This can be easily understood when attention is drawn to respective patterns of FIG. 15. In the pattern 1 shown in FIG. 15a, in the case of the above-described embodiment, search for a corresponding run is carried out in connection with the retrieval target areas A, B and C indicated by symbols encircling alphabets. In accordance with the method described here, however, the section ab of the line (Y−1) is also included into the retrieval target areas. Of course, since the run existing in the section ab is already extracted and its color values have already been changed to 2, there will be no possibility that the run is extracted for a second time as the corresponding run, giving no obstacle to work. However, there is no denying the fact that a wasteful section may be entered into the retrieval target areas. The pattern 2 is an example where such a wastefulness conspicuously appears. In the above-described embodiment, the retrieval target area is only the section A. As new index data generated from this pattern, there is only one index data ($\alpha$, $\beta$, Y+1). However, in accordance with the method described here, wasteful index date of ($\alpha$, $\beta$, Y−1) would be further generated. Thus, a wasteful retrieval work would be conducted on the basis of this wasteful index data.

It is necessary to balance the advantage obtained in this method, that the processing time required for the flag F indicating direction, the pattern judgement processing, and the like, may be saved, with the disadvantage of conducting wasteful retrieval work, to determine which method should be used under various applied conditions.

The coloring processing of the invention of this application has been described in connection with several embodiments, but this invention is not limited to such embodiments and may be therefore modified in various manners. Especially, respective components shown in FIG. 9 are represented in a block form by functionally grasping this invention. In practice, it is considered that these respective functional blocks may be realized in software. Such functions may be incorporated into software in any form.

3.5 Merits with the Coloring Processing According of this Invention

As stated above, the invention of this application employs, in the pictorial image processing system, a scheme to hold pictorial image data in the form of runlength data in the main memory to implement coloring processing to the runlength data. Thus, the capacity of the main memory is lowered, thus permitting the cost to be reduced, and a highly efficient coloring operation can be performed.

§4 Operation of the Draw Processing Unit

4.1 Entire Configuration

Figure 17:
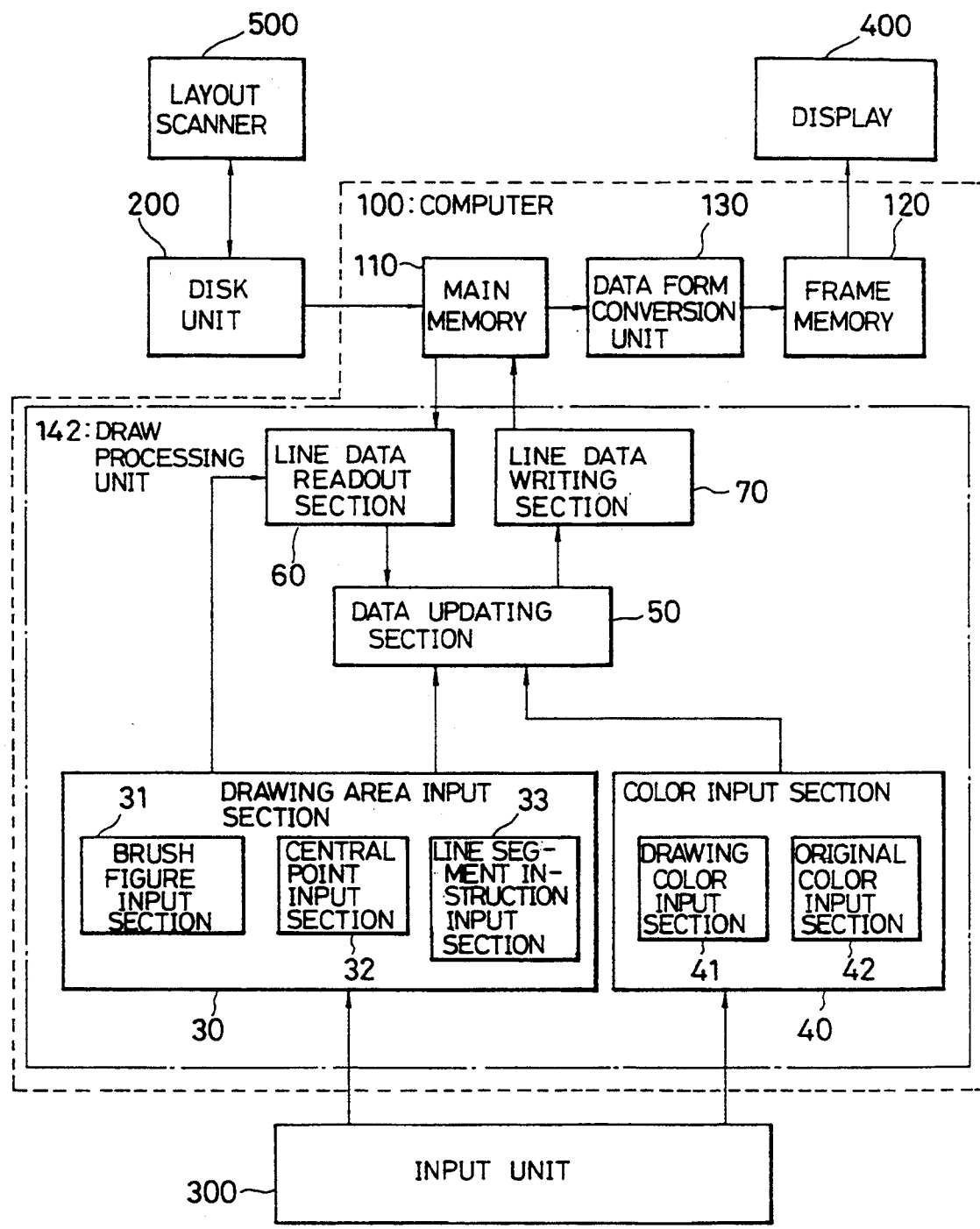
FIG. 17 is a block diagram showing, in more detail, the internal configuration of the draw processing unit 142 in the apparatus shown in FIG. 1.

In this chapter, the operation of the draw processing unit 142 in the apparatus for preparing a screen tint film which has been described in §1 will be described in detail. FIG. 17 is a block diagram showing, in more detail, the internal configuration of the draw processing unit 142 of the apparatus shown in FIG. 1. Initially, the internal configuration of the draw processing unit 142 will be described.

An instruction for draw processing is given from an operator to a drawing area input section 30 and a color input section 40 through the input unit 300. A data updating section 50 has a function to update runlength data on the basis of input data. This updating work is carried out every data of one line in the main memory 110. Namely, data corresponding to one line is read out from the main memory 110 by means of a line data readout section 60. Each of the data corresponding to one line is processed by means of the data updating section 50. Respective processed results are retained or held in the line data writing section 70. When the processing corresponding to one line is completed, the line data writing section 70 writes updated data into the line position where readout operation has been carried out of the main memory 110.

4.2 Outline of the Draw Processing

An operator can apply a fine modification to a pictorial image while looking at a pictorial image displayed on the visual display 400. This is known as draw processing. This draw processing is implemented to pictorial image data in the main memory. In this apparatus, since the main memory 110 retains data in the form of runlength data, it is unable to apply draw processing on the data as is in the prior art. When the main memory 110 retains data in the form of raster data as in the prior art, the principle of the draw processing is very simple. Namely, in principle, it is sufficient to convert color values of raster data corresponding to pixels in a drawing area to desired color values. However, implementation of this processing on each of a large number of pixels cannot be said to be a high efficient operation by any means. As previously described, in the case of a pattern of a screen tint film, when data is retained in the form of runlength data, data volume is considerably reduced. Accordingly, implementation of the draw processing on runlength data results in a lessened load in operation. However, such a draw processing somewhat becomes complicated. An actual method of the draw processing is described below.

As shown in FIG. 18, three color values are defined. For example, consider the case where a pictorial image as shown in FIG. 19a is formed by these three colors. Runlength data for this pictorial image is as shown in FIG. 19b. Such runlength data is retained in the main memory 110. In this state, an operator draws a picture by a color indicated by the color value 1 with respect to an area indicated by broken lines in the figure. The pictorial image after undergoing the draw processing is as shown in FIG. 19c, and runlength data corresponding thereto is as shown in FIG. 19d. Eventually, this draw processing can be said to be a processing for rewriting the data shown in FIG. 19b into the data shown in FIG. 19d.

Figure 20:
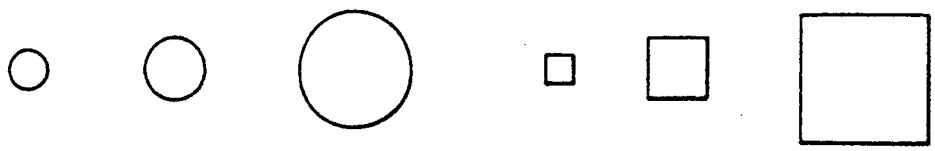
FIG. 20 is an explanatory view of a brush diagram used for processing by the draw processing unit shown in FIG. 17.
Figure 21:
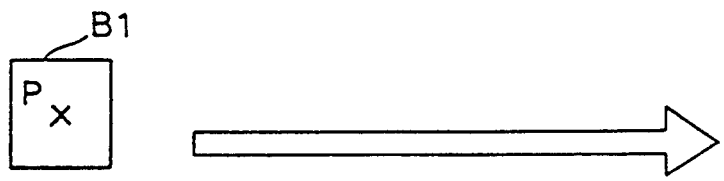
FIG. 21 is an explanatory view of a method of inputting a drawing area by the draw processing unit shown in FIG. 17.
Figure 22:
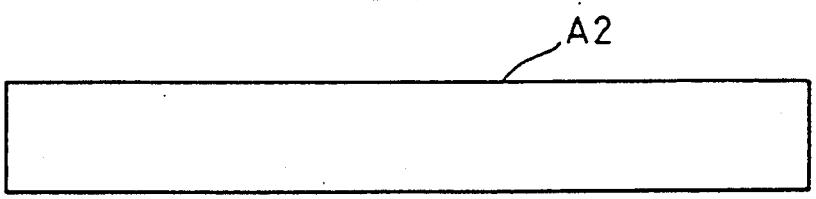
FIG. 22 is a view showing a drawing area inputted by this inputting method.

In this apparatus, two kinds of inputting methods are prepared for drawing a picture. The first method is a drawing of a picture by brush and the second method is a drawing of a picture by instructing a line segment. In the case of the picture describing by brush which is the first method, a brush figure and the position of a central point of the brush are inputted by an operator. For the brush diagram, for example, six kinds of figures, such as a circle and a square, etc., as shown in FIG. 20 are prepared. A desired brush may be selected from this. It is desirable to display these brush shapes in a menu display area of the visual display 400, thus permitting an operator to select an arbitrary one. The position of a central point of the brush may be designated by an input device such as a tablet, etc. An actual drawing operation is carried out by successively moving the central point position. For example, as shown in FIG. 21, when selecting a brush figure B1 to designate a start position of the central point by the tablet pen and moving the central point to the right by moving the tablet pen as indicated by an arrow in the figure, the area A2 becomes a draw area as shown in FIG. 22.

Figure 23:
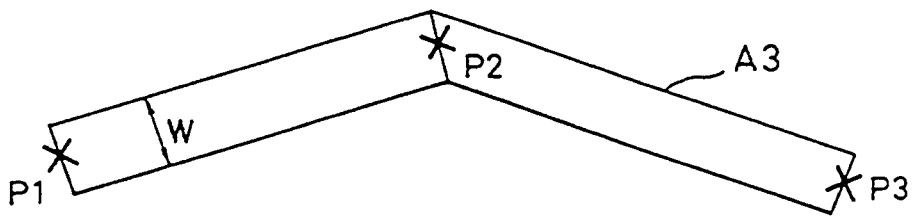
FIG. 23 is an explanatory view showing another method of inputting a drawing area by the draw processing unit.
Figure 24A:
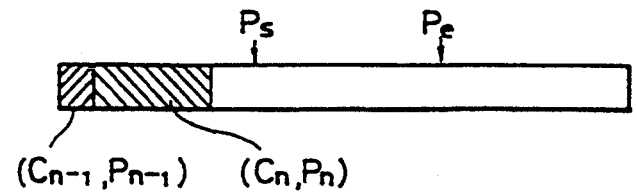
FIGS. 24a to 24f are views showing six judgement patterns used for processing by the draw processing unit shown in FIG. 17, respectively.
Figure 24B:
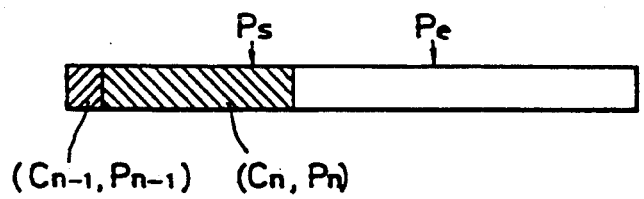
Figure 24C:
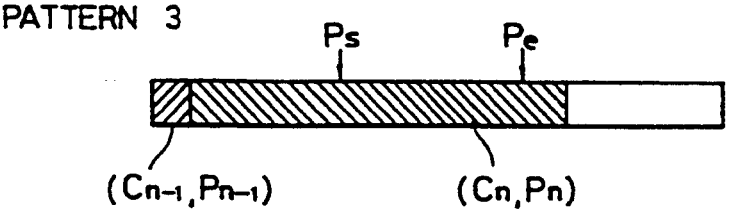
Figure 24D:
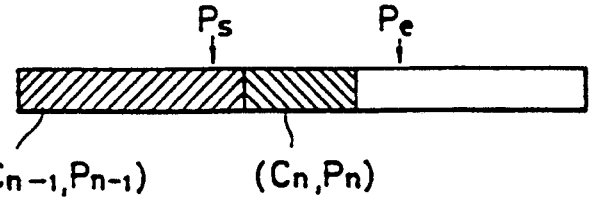
Figure 24E:
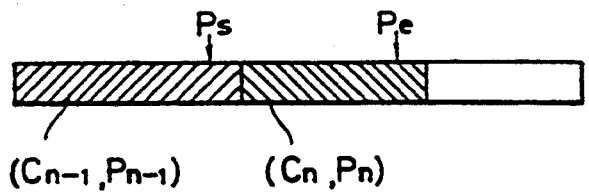
Figure 24F:
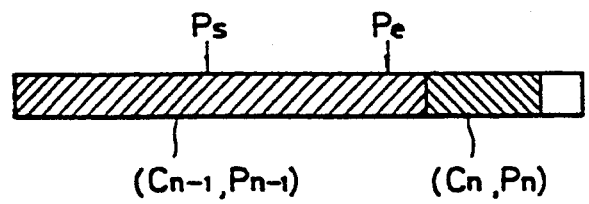
Figure 27A:
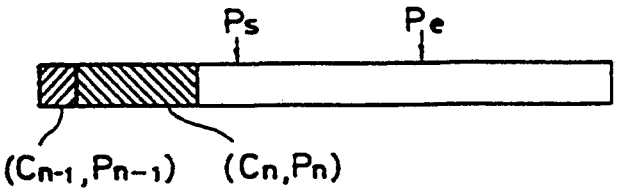
FIGS. 27a to 27f are views showing six judgement processing patterns used for the original color designated draw processing by the draw processing unit shown in FIG. 17, respectively.
Figure 27B:
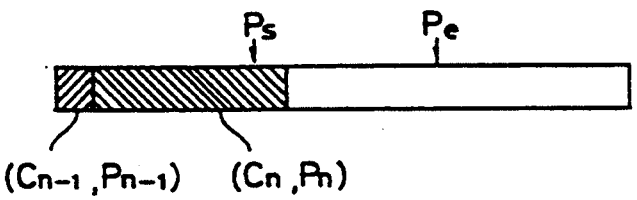
Figure 27C:
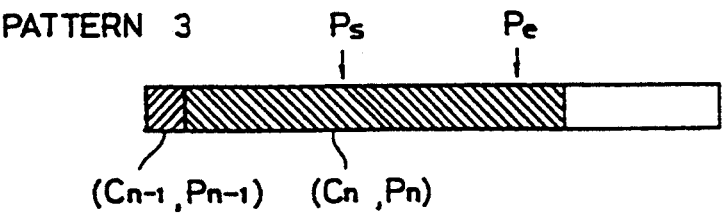
Figure 27D:
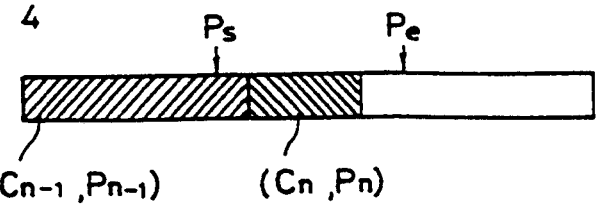
Figure 27E:
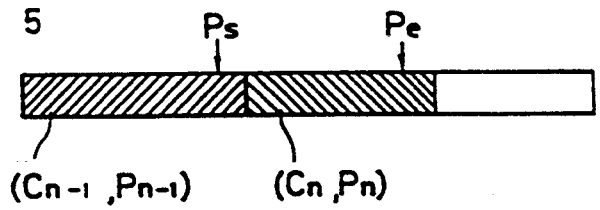
Figure 27F:
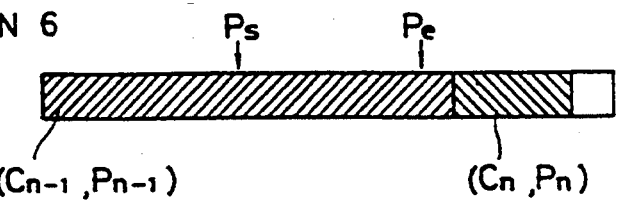

In the case of drawing of a picture by instructing a line segment according to the second method, the width of a line segment and end points of that line segment are inputted by an operator. For example, when designating the width of the line segment at W and inputting positions of end points P1, P2 and P3 by a tablet pen, etc., an area A3 as shown in FIG. 23 becomes a drawing area.

In the apparatus of FIG. 17, in the case of drawing of a picture by the brush, a brush figure and an central point position are inputted from the input unit 300 to the brush figure input section 31 and the central point input section 32, respectively. Thus, a drawing area is determined. Further, in the case of drawing of a picture by instructing a line segment, the width of a line segment and end points of the line segment are inputted to the line segment instruction input section 33. Thus, a drawing area is determined. Either way, data relating to the determined drawing area is delivered to the data updating section 50 and the line data readout section 60.

In the case of carrying out a drawing operation, an operator must provide an input for specifying drawing area as mentioned above and an input for specifying a color for drawing a picture. Such inputs are implemented from the input unit 300 to the color input section 40. In the case of an ordinary drawing of a picture, a color for drawing a picture is inputted to the drawing color input section 41 as a drawing color. The draw processing is nothing but the processing for coloring a drawing area by a drawing color therefor. It is to be noted that this apparatus has a drawing function by designation of an original color as described later in detail wherein when this function is used, an original color is inputted to the original color input section 42 in addition to a drawing color.

4.3 Ordinary Draw Processing

In the case where a drawing area A1 is designated as shown in FIG. 19a and a color indicated by color value 1 is designated as a drawing color, a pictorial image as shown in FIG. 19c is provided by the draw processing. Such processing can be eventually said to be a processing for changing runlength data as shown in FIG. 19b to runlength data as shown in FIG. 19d. In this apparatus, this processing is carried out per each line. Namely, the line data readout section 60 has a function to read out runlength data in the main memory 110 per each line. It is to be noted that lines to be read out are limited to lines related to the drawing area. Speaking of the pictorial image of FIG. 19a, since the drawing area A1 involves lines 2 to 7, data from the line 2 up to the line 7 will be read out in order. When data of the line 2, i.e., (1, 3) (3, 11) (2, 14) are read into the line data readout section 60, the data updating section 50 examines these data one by one from the leading data. When the data concerned is data which is not related to the drawing area, the data updating section 50 outputs it as it is to the line data writing section 70, while when the data concerned is data related to the drawing area, the data updating section 50 modifies data with reference to a drawing color to output modified data to the line data writing section 70. There are instances where the number of data may increase or decrease as the result of this data modification. The line data writing section 70 arranges data outputted from the data updating section 50 in order and holds them. When the processing corresponding to one line is completed, this updated data corresponding to one line are written into original positions of the main memory 110.

The above-mentioned processing will be described in a concrete manner in connection with the pictorial image shown in FIG. 19a. Initially, data of the line 2, i.e., (1, 3), (3, 11) (2, 14) are read into the line data readout section 60. The data updating section 50 examines the first data (1, 3), judges it to be data which is not related to the drawing area, and outputs it as it is to the line data writing section 70. Subsequently, the data updating section 50 examines the next data (3, 11), judges it to be data related to the drawing area to modify that data into three data of (3, 4) (1, 10) (3, 11), and outputs them to the line data writing section 70. Finally, the data updating section 50 examines data (2, 14), judges it to be data which is not related to the drawing area, and outputs that data as it is to the line data writing section 70. Eventually, five data of (1, 3) (3, 4) (1, 10) (3, 11) (2, 14) are retained into the line data writing section 70. When they are written into the line 2, data of the line 2 of FIG. 19d is provided. Since the processing of the line 2 is completed, data of the line 3 is then read into the line data readout section 60. Thus, similar processing is carried out.

The logic of the judgment and the modification processing of the data updating section 50 will be described. The data updating section 50 can recognize, as a column value, a start point Ps (for convenience, this start position is defined as a position on the left side by one column relative to an actual start position) and an end position Pe of a drawing area with respect to a line being examined on the basis of information indicating a drawing area given from the drawing area input section 30. For example, in the case of the pictorial image of FIG. 19a, with respect to any lines 2 to 7, the start point position Ps of the drawing area is column 4 (the actual start point position is column 5), and the end point position Pe thereof is column 10. Further, a color value C of the drawing color is given from the color input section 40. The data updating section 50 carries out judgment processing and modification processing using these values Ps, Pe and C. When data being examined and data preceding by one are expressed as (Cn, Pn) and (Cn-1, Pn-1), respectively, any one of the following six patterns as illustrated in FIGS. 24a to 24f applies to data being examined. It is to be noted that when there is no data preceding by one, the conditions relating to Cn-1, Pn-1, may be neglected.

(1) Pattern 1

Case of Pn-1 < Ps and Pn ≦ Ps

In this case, it is judged that data (Cn, Pn) being examined is data which is not related to the drawing area. Accordingly, (Cn, Pn) is outputted as it is.

(2) Pattern 2

Case of Pn-1 ≦ Ps, Pn > Ps, and Pn ≦ Pe

In this case, since data being examined is related to the drawing area, if Cn ≠ C, (Cn, Ps) is outputted. Namely, modification of data is made. In the case of Cn = C, since the color value of the next data is also equal to C, no data is outputted.

(3) Pattern 3

Case of Pn-1 ≦ Ps and Pn > Pe

In this case, since data being examined is related to the drawing area, the following two processing will be conducted in order.
i) If Cn ≠ C, (Cn, Ps) and (C, Pe) are outputted.
ii) (Cn, Pn) is unconditionally outputted.
Accordingly, in the case of Cn ≠ C, three data will be outputted.

(4) Pattern 4

Case of Pn-1 < Ps and Pn ≦ Pe

In this case, data being examined is related to the drawing area. However, since this section can be expressed by the next data, no data is outputted.

(5) Pattern 5

Case of Pn-1 > Ps, Pn-1 ≦ Pe, and Pn > Pe

In this case, since data being examined is related to the drawing area, the following two processing will be conducted in order.
i) If Cn ≠ C, (C, Pe) is outputted.
ii) (Cn, Pn) is unconditionally outputted.

(6) Pattern 6

Case of Pn-1 > Pe and Pn > Pe

In this case, it is judged that data (Cn, Pn) being examined is data which is not related to the drawing area. Accordingly, (Cn, Pn) is outputted as it is.

The six patterns have been described as above. The data updating section 50 examines data in the line data readout section 60 one by one to judge that the data being examined corresponds to any one of the above-mentioned six patterns and outputs data determined by respective patterns on the line data writing section 70. By this processing, a correct draw processing for run-length data is carried out. It will be indicated that when the above-described processing is implemented to, e.g., data of (1, 3) (3, 11) (2, 14) existing on the line 2 of FIG. 19b, data of (1, 3) (3, 4) (1, 10) (3, 11) (2, 14) existing on the line 2 of FIG. 19d are provided. In this case, as previously described, Ps = 4, Pe = 10 and C = 1. The first data (1, 3) is initially examined. Since this data corresponds to the pattern 1, (1, 3) is outputted as it is. When the second data (3, 11) succeeding thereto examined, it is seen that this data corresponds to the pattern 3. In addition, since Cn = 3, (3, 4) (1, 10) (3, 11) are outputted. Finally, when the third data (2, 14) is examined, since this data corresponds to the pattern 6, (2, 14) is outputted as it is. It will be understood that when a procedure is taken to apply respective patterns to lines 3 to 7 in a manner similar to the above, correct data updating processing is conducted.

4.4 Draw Processing by Designation of Original Color

This apparatus has a draw processing function by designation of an original color. By using this function, only a portion of a color designated as an original color of a designated drawing area can be drawn. This function will be described in a concrete manner in conjunction with FIGS. 25. It is now assumed that the color value in FIGS. 25 is the same as that shown in FIG. 18. For example, suppose that, as shown in FIG. 25a, a rectangle comprised of color value 2 is depicted on a portion of so called a "ground" comprised of color value 3 and a picture is going to be drawn by making a designation of a drawing area A4 and color value 1 of the drawing color using a brush, etc. In an ordinary draw processing, the inside portion of the drawing area A4 will be all fully painted by color value 1. However, when color value 2 is designated as the original color, only the portion which has been originally color value 2 of the drawing area A4 is colored into color value 1 as shown in FIG. 25b. The ground portion which was not designated as the original color is not changed by any means before and after draw processing. On the other hand, when color value 3 is designated as the original color, only the portion which has been originally color value 3 of the drawing area A4 is colored into color value 1 as shown in FIG. 15c. Such a function is very convenient in the case of making a fine modification of a picture, or in the case where a pattern should not be erroneously drawn in the vicinity of the drawing area.

For example, when a draw processing is implemented to a pictorial image as shown in FIG. 26a by making a designation such that the original color has color value 3 and the drawing color has color value 1, a pictorial image as shown in FIG. 26c is provided. For performing such a pictorial image processing, runlength data shown in FIG. 26b must be converted to runlength data shown in FIG. 26d. This conversion is carried out by substantially the same procedure as that of the previously described ordinary draw processing. It is to be noted that an original color Co is further added in addition to start point position Ps, end point position Pe and drawing color C of a drawing area as reference values required when the data updating section 50 conducts judgment processing and modification processing. Accordingly, the processing with respect to the six patterns are as shown in FIGS. 27a to 27f, respectively. Namely, judgement as to whether or not Cn and the original color Co are equal is further added. By carrying out respective processing of these six patterns, data of FIG. 26b can be converted to data of FIG. 26d.

While the draw processing of this invention has been described in detail in accordance with the embodiments shown, this invention is not limited to only the above-described embodiments, but may be modified in various manners. The basic idea of this invention resides in retaining pictorial image data in the form of runlength data into the main memory to implement draw processing to the runlength data. To realize this, the line data readout section, the data updating section, end the line data writing section are provided to carry out data updating processing using data corresponding to one line as a unit. It is to be noted that the length of a pixel train may be used as the value of a in the form of runlength data (c, a) in place of employing a column value of the termination of a pixel train having color value c. As long as this basic idea can be realized, system configurations in any form may be adopted.

4.5 Merits of the Draw Processing According to this Invention

As stated above, the invention of this application employs, in the pictorial image processing system, a scheme to retain pictorial image data in the form of runlength data in the main memory to implement draw processing to the runlength data. Accordingly, the capacity requirements for the main memory are lowered, thus permitting the cost to be reduced, and a highly efficient draw operation can be performed.

§5 Operation of Polygon Input Unit

5.1 Operation for Inputting a Polygon

Figure 28:
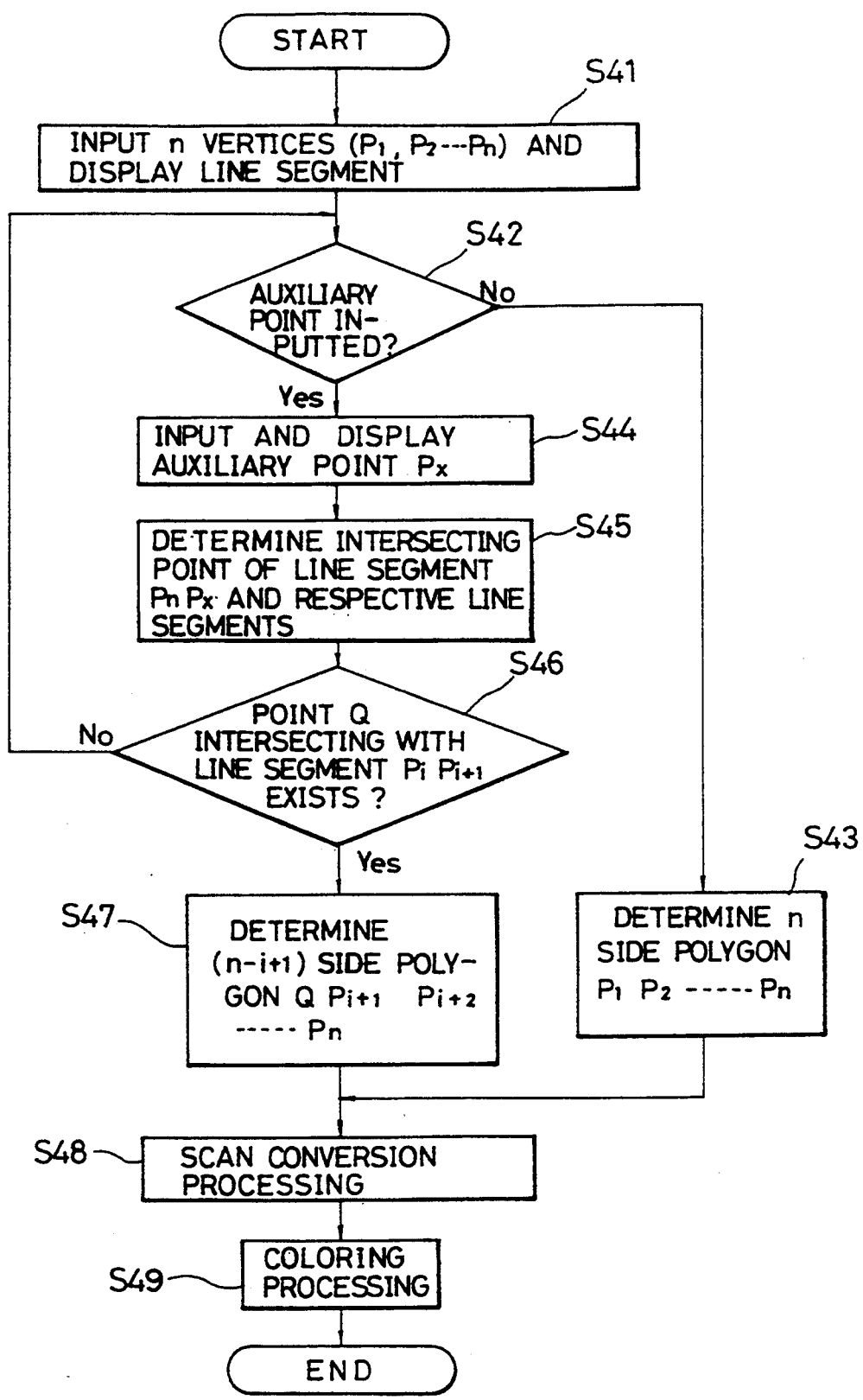
FIG. 28 is a flowchart showing the procedure in which a method of inputting a polygon according to this invention is applied to an apparatus for preparing a screen tint film.

The operation of the polygon input unit 143 in the apparatus for preparing a screen tint film which has been described in §1 will be described in detail. FIG. 28 is a flowchart showing the procedure in the case where a method of inputting a polygon according to this invention is applied to the apparatus for preparing a screen tint film. To carry out this method, a coordinate input device is prepared as the input unit in the apparatus shown in FIG. 1. It is preferable to use, as the coordinate input device, a mouse capable of designating an arbitrary position on the visual display 400.

Figure 29:
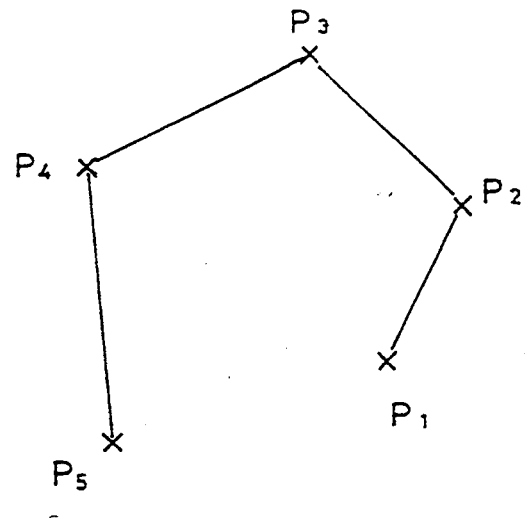
FIG. 29 is a view showing a picture display at the time when five vertices (P1, P2, ..., P5) are inputted in the method shown in FIG. 28.

Initially, at step S41, n number of vertices (P1, P2 . . . , Pn) are inputted in order. This is a step for designating an arbitrary point using a mouse while looking at the display screen. After respective vertices are inputted, they are sequentially displayed on the screen, and line segments connecting points sequentially inputted are displayed at the same time. FIG. 29 shows a picture display when five vertices (P1, P2 . . . , P5) are inputted. Line segments connecting respective vertices in order are displayed together with these vertices (reference numerals indicating respective vertices are not displayed on the screen). Coordinate values of respective vertices are taken into the computer 100.

Figure 30:
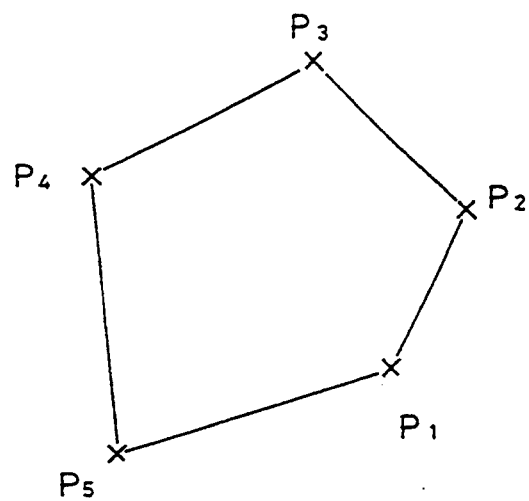
FIG. 30 is a view showing the state where a pentagon is determined by connecting a start point and an end point from the state of FIG. 29.

Subsequently, at step S42, whether or not an auxiliary point is inputted is judged. In the case where no auxiliary point is inputted, an n side polygon p1 P2 . . . Pn is determined at step S43. Namely, the start point P1 and the end point Pn are connected by a line segment. In the case of the example where five vertices shown in FIG. 29 are inputted, a pentagon is determined as shown in FIG. 30. As seen from the above description, the method of connecting the start point and the end point is a method ordinarily carried out from the past, but is not a method according to this invention. The method according to this invention resides in a method of inputting an auxiliary point at step S42. Accordingly, the procedure shown in FIG. 28 is adapted so as to make it possible to select two kinds of methods branched at the step S42. In an actual apparatus, by inputting an end point instruction displayed on the screen, a judgment that "no auxiliary point is inputted" is made. Thus, the next step S43 is executed.

Figure 31:
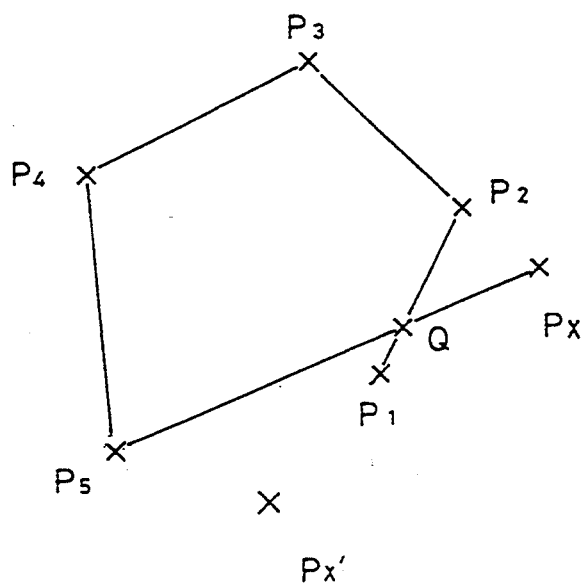
FIG. 31 is a view showing the state where auxiliary points are inputted from the state of FIG. 29.

The method of inputting an auxiliary point which constitutes the gist of this invention will now be described. Initially, at step S44, an auxiliary point Px is inputted. This auxiliary point Px is the (n+1)-th point in an actual sense. For example, suppose that an operator designates an auxiliary point Px at a position as shown in FIG. 31 by means of a mouse. When the mouse is moved in order to designate the auxiliary point Px, a line segment connecting a point designated at present by the mouse and a vertex Pn designated last is also displayed. For example, in the case of the example of FIG. 31, a line segment connecting the point P5 and the point Px is displayed. An operator looks at the screen while moving the mouse, thus making it possible to determine a final position of the auxiliary point Px.

When the auxiliary point Px is inputted, intersecting points of the line segment PnPx and respective line segments displayed on the visual display are determined (step S45). In the case of the example of FIG. 31, whether or not the line segment P5Px intersects with the line segment P1P2, the line segment P2P3, the line segment P3P4 and the line segment P4P5 is examined. Eventually, it is recognized that the line segment P5Px has a point intersecting with the line segment P1P2. Recognition of this intersecting point can be made by a geometrical operation using coordinate values of respective points. Further, coordinate values of the intersecting point Q can be calculated by an operation.

At step S46, a branch is made depending on whether or not there is an intersecting point. As a result, when there is no intersecting point, the processing procedure returns to the step S42. For example, in FIG. 31, when Px' is designated as an auxiliary point, no point intersecting with any other line segments is produced.

Figure 32:
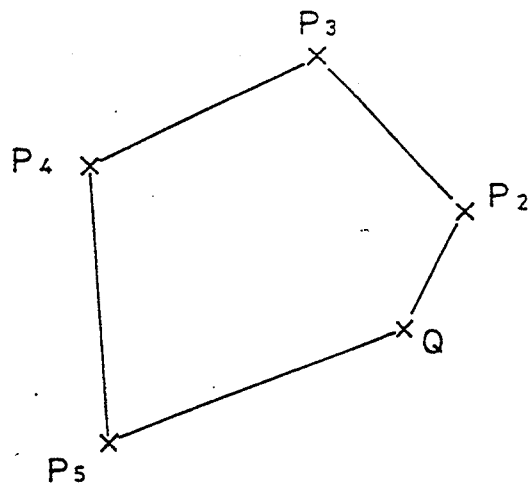
FIG. 32 is a view showing a pentagon determined by inputing of auxiliary points shown in FIG. 31.
Figure 33:
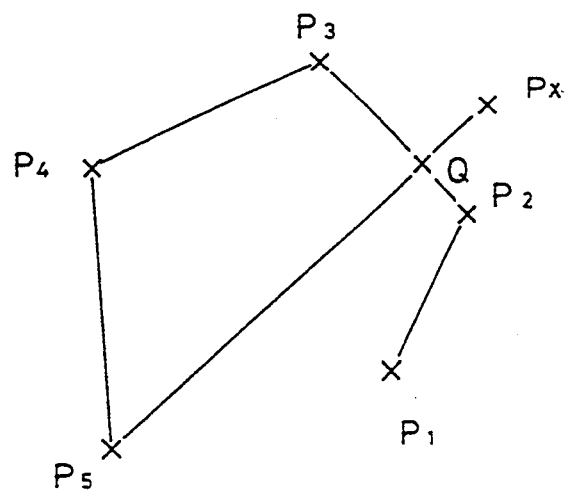
FIG. 33 is a view showing the state where different auxiliary points are inputted from the state of FIG. 29.
Figure 34:
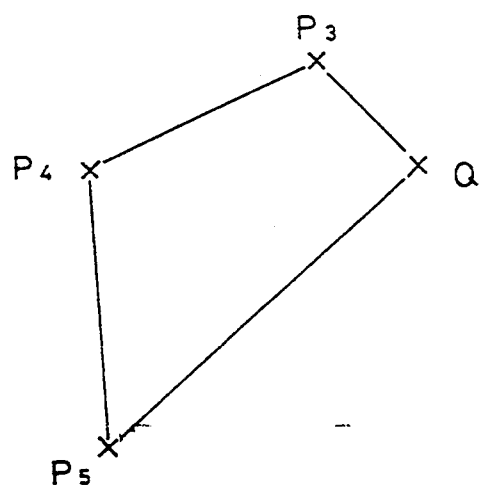
FIG. 34 is a view showing a square determined by inputting of auxiliary points shown in FIG. 33.

When it is assumed that the line segment PnPx makes up a point intersecting with the segment PiPi+1, (n-i+1) side polygon having the points Q, Pi+1, pi+2, . . ., Pn as respective vertices is determined at step S47. In the example of FIG. 31, since n=5 and i=1, a pentagon having the points Q, P2, P3, P4, and P5 as respective vertices is determined as shown in FIG. 32. In the case where the auxiliary point Px is designated at a position as shown in FIG. 33, the line segment P5Px makes up a point intersecting with the line segment P2P3. Namely, n=5 and i=2. Accordingly, in this case, as shown in FIG. 34, a square having the points Q, P3, P4 and P5 as respective vertices is determined. In this way, an operator can freely define a final polygon by the manner of determining the position of the auxiliary point Px from the state shown in FIG. 29. As stated above, the method of designating auxiliary points at the steps S44 to S47 has an extremely high degree of freedom and satisfactory operability as compared to the method of mechanically connecting the start point and the end point as at the step S43. In the case of the method of mechanically connecting the start point and the end point, a final polygon is restricted by vertices once determined. On the contrary, in the case of the method of designating an auxiliary point, it is possible to completely freely determined a final polygon while using vertices once determined as a criterion.

5.2 Coordinate Operation Processing

The operational processing for carrying out the method of designating this auxiliary point Px will be described in more detail using actual coordinate values. FIG. 35a shows the state where five vertices P1, P2, . . ., P5 are inputted. At this time, as shown in FIG. 35b, five vertices and their coordinate values are recorded into the memory of the computer. Subsequently, when an auxiliary point Px is designated as shown FIG. 36a, coordinate values of the auxiliary point Px are recorded into the memory in addition to five vertices as shown in FIG. 36b. At this stage, the computer can determine coordinate values (10, 10) of the intersecting point Q by computation. Eventually, a pentagon as shown in FIG. 37a is defined and coordinate values of respective vertices are recorded into the memory as shown in FIG. 37b.

5.3 Application to the Coloring Processing

Figures 38, 39:
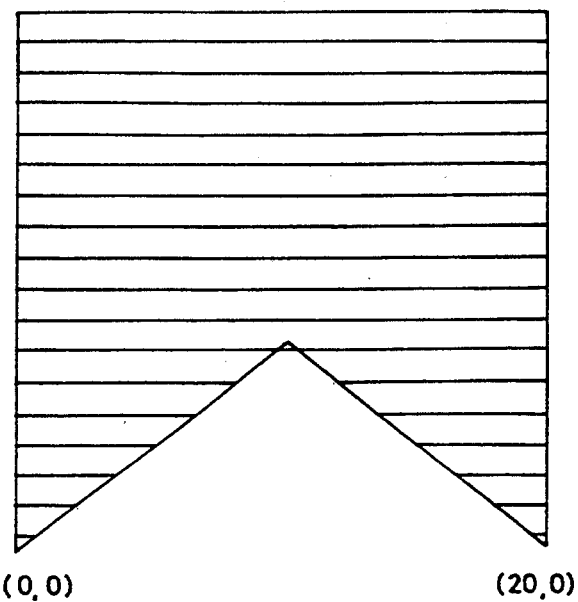
FIG. 38 is an explanatory view of a scan conversion processing.
FIG. 39 is a view showing a table obtained as the result of the scan conversion processing.

When a polygon is determined in a manner stated above, coloring processing by the coloring processing unit 141 can be implemented on the area inside the polygon. Initially, at step S48, scan conversion processing is carried out. This is a processing to scan the inside of the polygon determined line by line to thereby determine start point coordinates and end point coordinates in the area on scanning lines. Assuming that, e.g., a polygon as shown in FIG. 37a is determined, scanning in a horizontal direction is implemented to the pentagon along the lines 1 to 20 as shown in FIG. 38. As a result, a table as shown in FIG. 39 is provided. In this table, pairs of areas are provided for respective lines. For example, pairs (0, 1) (19, 20) of the area obtained with respect to the line 1 show that the areas up to the lateral coordinates 0 to 1 and those up to the lateral coordinates 19 to 20 are areas inside this pentagon along the line 1 in FIG. 38. After such a table is provided, coloring processing is in turn carried out at step S49. Namely, a predetermined dot density of a predetermined color is given to pixels within the area indicated by pairs of this area.

Figure 40:
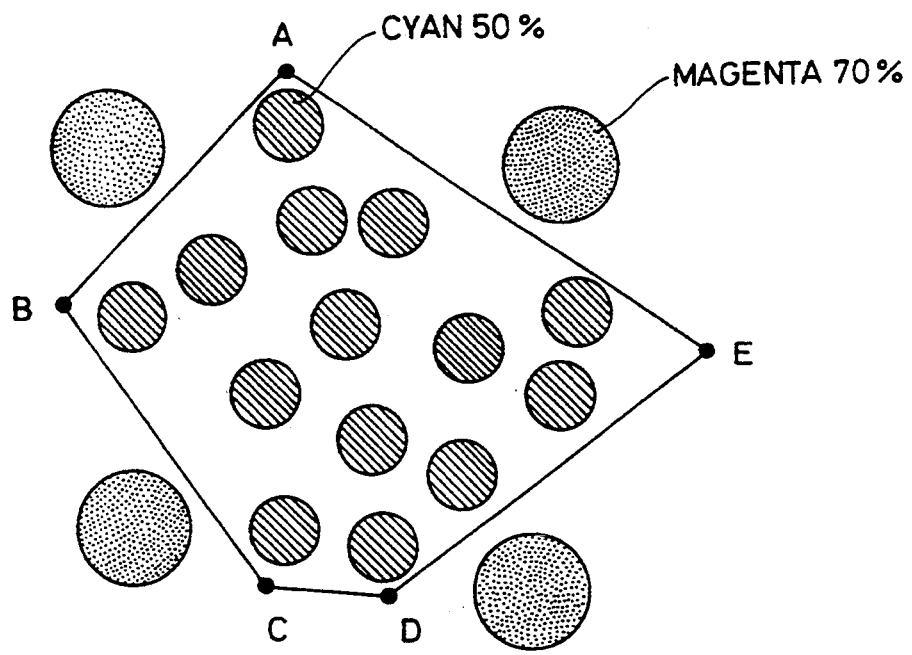
FIG. 40 is a view showing the state where designation of a screen tin area is made by inputting of a polygon.
Figure 41:
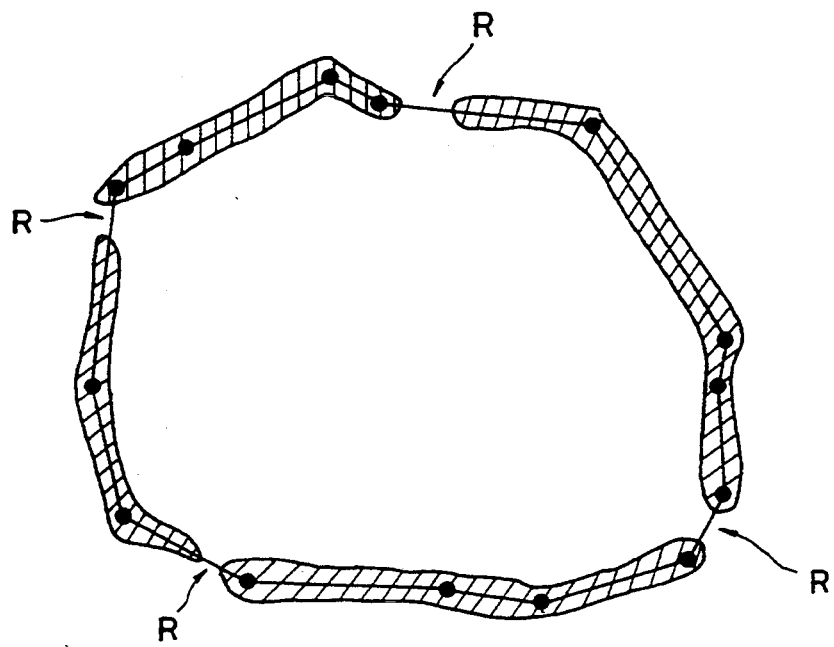
FIG. 41 is a view showing the state where designation of an area encompassed by a contour line having line break portions is made by inputing of a polygon.

The gist of the invention of this application resides in the method of designating an auxiliary point to determine a polygon as described above. When such an area designation method of polygon is applied to an area designation in the apparatus for preparing a screen tint film, unexpected merits are obtained. For example, as shown in FIG. 40, in the case where there are mixed closed areas (indicated by hatching of slanting lines) in which 50% of cyan should be designated and closed areas (indicated by hatching of dots) in which 70% of magenta, with the method of designating an area by a rectangle as in the prior art, respective areas must be designated one by one. However, when the area designation method by polygon is used, area designation of 50% of cyan is completed only by designating a pentagon ABCDE as shown. Further, in the case of desiring to designate an area encompassed by contour lines (indicated by hatching) where line break portions partially exist as shown in FIG. 41, with the conventional method, an approach must be employed to repair such line break portions R to take a form such that the contour line encompasses a complete closed area. On the contrary, when the area designation method by polygon is used, it is possible to designate a closed area only by designating a polygon as shown without repairing the line break portions R.

The method of inputting a polygon according to this invention has been described in connection with the example where this method is applied to an apparatus for preparing a screen tint film. However, this invention may be applied to various fields in addition to the above.

5.4 Merits with the Method of Inputting a Polygon According to this Invention In accordance with the method of inputting a polygon according to this invention, for the purpose of determining a polygon, after several vertex positions are inputted, an auxiliary point is finally inputted. Then, an intersecting point of a line segment connecting this auxiliary point and the final vertex and other line segments is determined. Thus, a polygon is determined using this intersecting point as one vertex. Accordingly, an area designation having an extremely good operability can be made.

§6 Display Control of Display Device

6.1 Entire Configuration

The operation of the embodiment of an apparatus for preparing a screen tint film has been described in preceding chapters. In this chapter, an embodiment suitable for display control of the display device in this apparatus will be described.

Figure 42:
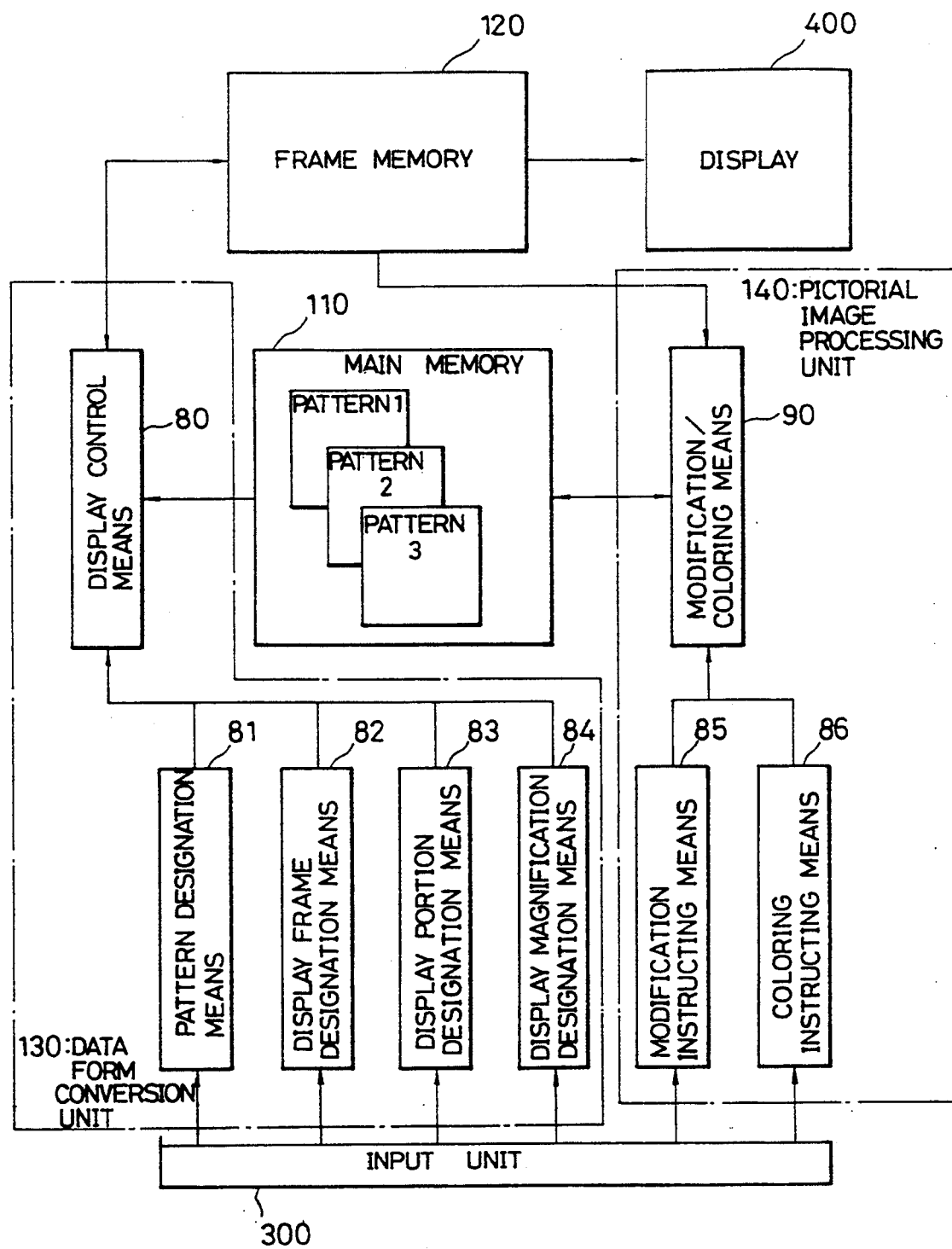
FIG. 42 is a block diagram showing a basic configuration of an apparatus for preparing a screen tint film according to an embodiment of this invention.

FIG. 42 is a block diagram showing the basic configuration of an apparatus for preparing a screen tint film accordingly this embodiment, which corresponds to the apparatus shown in FIG. 1 in another block form. As previously described, this apparatus includes two kinds of memories of the main memory 110 and the frame memory 120. Respective pictorial image data with respect to a plurality of patterns are stored into the main memory 110. The frame memory 120 is a memory for carrying out display on the visual display 400. Data in the frame memory 120 are prepared by display control means 80 on the basis of data in the main memory 110. The input unit 300 is a device for directly receiving an instruction from an operator. Respective means 81 to 86 are connected to the input unit 300. The pattern designation means 81 is means for designating which pattern in the main memory 110 is subject to displaying on the basis of an instruction of an operator given form the input unit 300. The display frame designation means 82 is means for designating at which position and at what size a display frame should be defined in the display screen of the visual display 400 on the basis of an instruction of an operator similarly given from the input unit 300. Further, the display portion designation means 83 is means for designating which portion of a pattern subject to displaying should be displayed on the basis of an instruction of an operator similarly given from the input unit 300. In addition, the display magnification designation means 84 is means for designating a magnification for displaying a pattern subject to displaying on the basis of an instruction of an operator given from the input unit 300.

The display control means 80 carries out a processing to read out data from the main memory 110 on the basis of instruction from respective means 81 to 84 and to write data prepared on the basis of the data thus read out into the frame memory 120. Namely, the display control means 80 recognizes a pattern designated by the pattern designation means 81 and reads out a portion of pictorial image data designated by the display portion designation means 83 from the main memory 110. Subsequently, the display control means 80 carries out a contracting processing for thinning out pixels of read out data or an expanding processing for interpolating pixels of read out data on the basis of a magnification designated by the display magnification designation means 84 to generate new data. In the embodiment disclosed in this specification, data in the main memory 110 is runlength data, and data in the frame memory 120 is raster data. Accordingly, as previously described, conversion of data form is carried out in the display control means 80. Finally, the display control means 80 carries out a processing to recognize, from data in the frame memory 120, data corresponding to a pictorial image in a display frame designated by the display frame designation means 82 and to rewrite the corresponding data into generated new data. The visual display 400 carries out a picture display corresponding to data in the frame memory 120. Accordingly, when data in the frame memory 120 is rewritten, a picture display on the visual display 400 is changed to a new picture display. As seen from the above-description, the display control means 80 and respective means 81 to 84 correspond to the data form conversion unit 130 in the block diagram of FIG. 1.

On the other hand, modification/coloring means 90 receives an instruction of modification from the means 85 or an instruction of coloring from the means 86. These instructions include an instruction of position on the display screen of the display 400. This implies that a procedure is taken to pointout, e.g., a specific portion displayed on the visual display 400 to give an instruction of "Modify or color this specific portion". The modification/coloring means 90 recognizes a portion, which corresponds to a designated position on the display screen of the visual display 400, in pictorial image data of a pattern in the main memory 110 by making reference to the frame memory 120 and implements modification or coloring processing to the recognized data. As seen from the above description, the modification/coloring means 90 and respective means 85 and 86 correspond to the pictorial image processing unit 140 in the block diagram of FIG. 1. When data is altered as the result of the fact that such a correction or coloring processing is implemented to pictorial image data in the main memory 110, the display control means 80 generates new data on the basis of the altered new data and write them into the frame memory 120. Accordingly, data in the frame memory 120 is updated. As a result, a pictorial image which has undergone correction or coloring processing is displayed on the visual display 400. Thus, an operator can give an instruction of modification or coloring while looking at the visual display 400 and confirm the result therefore on the visual display 400.

The outline of the operation of this apparatus has been described as above. It is to be noted that these respective blocks are in practice realized by hardware and software using a computer. Namely, the main memory 110 and the frame memory 120 may use a common memory of the computer. Further, the visual display 400 is a display unit connected to this computer, and the input unit 300 is a device such as a key board or a mouse, etc., connected to this computer. The remaining respective means 80, 81 to 86, and 90 may be all realized by software for operating this computer.

6.2 Actual Operation of the Apparatus

Figure 43:
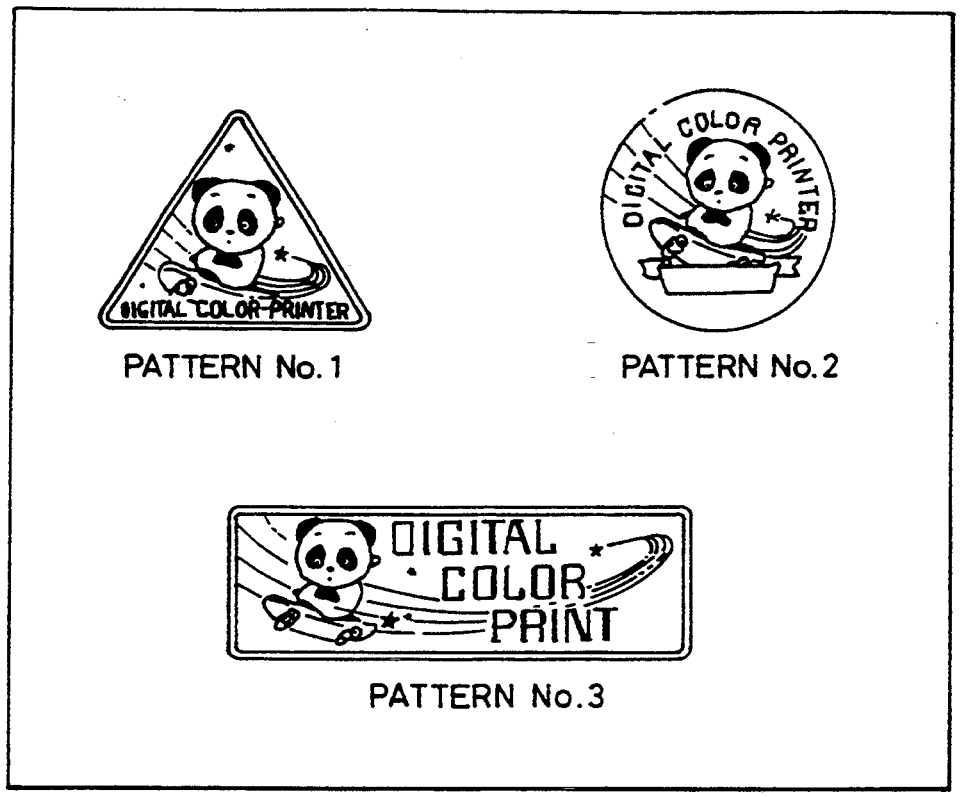
FIG. 43 is a view showing a pattern stored in the main memory of the apparatus shown in FIG. 42.
Figure 44:
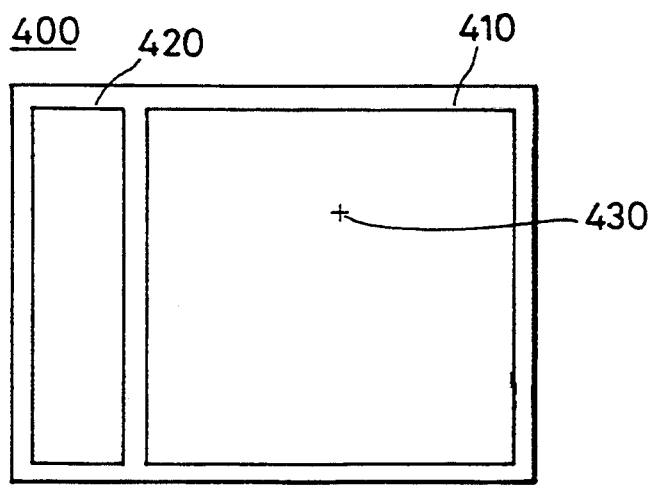
FIG. 44 is a view showing a picture on the display unit in the apparatus shown in FIG.42.

The operation of this apparatus will now be described in accordance with an actual example. It is now assumed that pictorial image data for three patterns as shown in FIG. 43 are stored in the main memory 110. These pictorial image data taken into the main memory 110 by the layout scanner 500 or a video camera (not shown). At the stage where these patterns are taken into the main memory 110, they are binary pictorial images comprised of line drawings which have no color tone and are not colored. In accordance with the coloring work by this apparatus, these patterns become colored pictorial images. The pictorial images in which coloring has been completed are outputted from the main memory 110 to a film by the lay out scanner 500 for the second time. In this example, a color visual display is used as the display 400. The display picture of this color visual display is divided into two areas of a picture display area 410 and a command display area 420 as shown in FIG. 44. In this instance, a cursor 430 moving interlocking with the movement of a mouse as the input unit 300 is displayed in these display area. By this cursor 430, it is possible to designate an arbitrary point in the picture display area 410, or to designate an arbitrary command in the command display area 420.

The operation of this apparatus will now be described in connection with the following three actual examples.

Actual Example 1

Figure 45A:
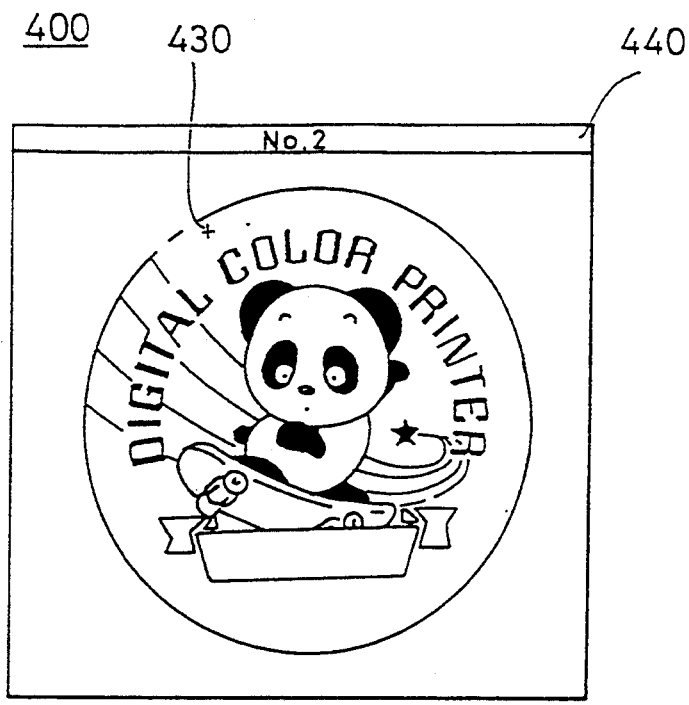
FIGS. 45a and 45b are views showing a partial expanding display function of a pattern by the apparatus shown in FIG. 42.

It is assumed that an operator initially gives an instruction to display the entirety of the pattern No. 2 of full size over the whole of the screen. In practice, an operator carries out an operation for designating a predetermined command in the command display area 420 by the cursor 430. Thus, the pattern No. 2 is designated at the pattern designation means 81, a display frame 410 of full size of the picture display is designated at the display frame designation means 82, the entirety of the pattern is designated at the display portion designation means 83, and a full size is designated at the display magnification designation means 84. Thus, the display control means 80 performs an operation to entirely read out pictorial image relating to the pattern 2 in the main memory 110 to thereby rewrite data in the frame memory 120. As a result, pictorial image data as shown in FIG. 45a is provided in the frame memory 120, and is displayed on the visual display as it is. It is to be noted that, in the apparatus of this embodiment, a pattern No. display area 440 is provided at the upper part of each display frame to display a pattern No. displayed in that display frame.

Figure 45B:
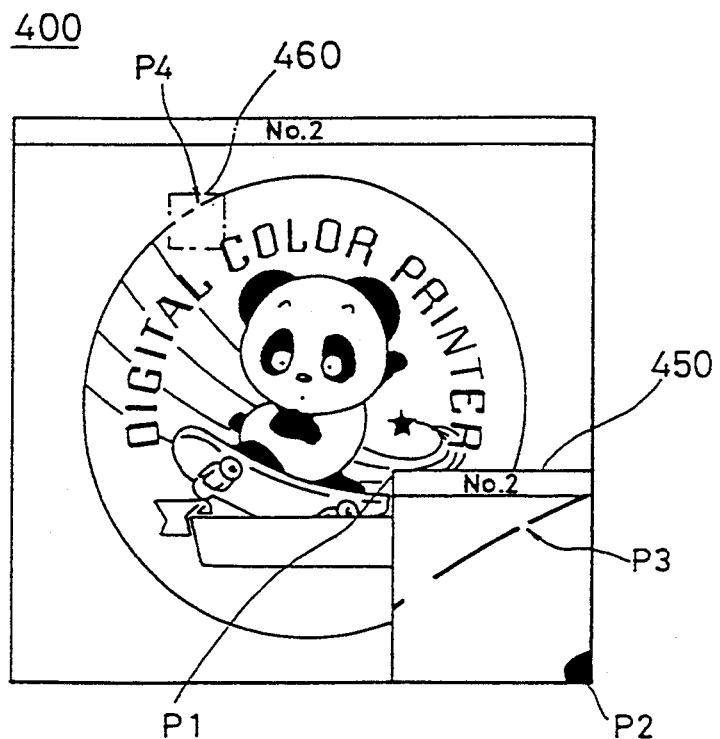

It is now assumed that an operator finds a break portion of the line drawings in a portion of the pattern No. 2 and gives an instruction to magnify that break portion and display it with magnification. The operator first designates a display portion by the cursor 430 as shown in FIG. 45a. Since the designate portion is the point within the pattern No. 2, the above-mentioned designation of the display portion results in the fact that designation of a pattern has been also carried out at the same time. Subsequently, the operator carries out designation of a display frame. For example, a display frame 450 as shown in FIG. 45b is assumed to be designated. Such a designation of the display frame 450 may be made, e.g., by designating two points $P_1$ and $P_2$ by the cursor 430. Further, the operator carries out a designation of display magnification. This may be accomplished, e.g., by displaying a magnification command such as double, threefold, one half, or one third, etc., in the command area 420 to designate a desired magnification command by the cursor 430. Thus, the display control means 80 receives, from respective means 81 to 84, an instruction to display a predetermined portion (the periphery of the cursor 430 of FIG. 45a) of the pattern No. 2 at a predetermined magnification within the display frame 450. Responding to this instruction, the display control means 80 carries out work for extracting data around a predetermined portion (an area to be extracted is determined from the size of the display frame 450 and the designated magnification) of pictorial image data relating to the pattern No. 2 in the main memory 110. Thus the means 80 implements an expanding processing for interpolating pixels to the extracted data to generate new data. A portion of data corresponding to the pictorial image within the display frame 450 in the frame memory 120 is replaced by the newly generated data.

As a result, a display picture on the visual display 400 is as shown in FIG. 45b. An expanded pictorial image is displayed within the display frame 450 overlapping with the pattern of full size. It is to be noted that a contour line 460 (indicated by single dotted lines in FIG. 45b) is displayed in this embodiment. The contour line 460 indicates a location of the expanded pictorial image displayed in the frame 450. Thus, an operator can easily recognize which portion of the entirety of the pattern is caused to correspond to an expanded pictorial image displayed at present. Such a display of contour line 460 may be carried out by recognizing an extracted portion of pictorial image data when it is extracted from the main memory 110 by the display control means 80 to update data in the frame memory 120 so that a contour line is depicted at a position corresponding to an extracted portion of a pictorial image of full size.

An operator can give an instruction of modification for a break portion or an instruction of coloring the inside of a predetermined closed area while looking at such a display. At this time, designation of a portion to be modified and/or designation of a colored area may be carried out by moving the cursor on the display screen. In this case, either designation in a pictorial image of full size or designation in an enlarged pictorial image may be adopted. The modification/coloring means 90 recognizes, on pictorial image data in the main memory 110, a portion corresponding to a position that an operator has designated on the display screen by making reference to data in the frame memory 120 to implement modification or coloring processing to the pictorial image of the recognized portion. Accordingly, for example, when an operator gives an instruction to modify a break portion P3 on an enlarged picture in FIG. 45b, a break portion of pictorial image data of the pattern No. 2 in the main memory 110 shown in FIG. 43 is modified by the above-mentioned instruction. As a result, break portions (P3, P4) are displayed in a modified form in both the pictorial image of full size and the expanded pictorial image. This is the same in regard to the coloring processing. For example, in the case where an instruction of coloring is given on a picture of full size, a colored result can be obtained not only on the picture of full size but also on the expanded picture. As stated above, the feature of this invention resides in that separate pictures displayed in the form of a multi-window are related to each other, and that pictorial image data which provides the basis of display is unified in the main memory 110.

Actual Example 2

Figure 46A:
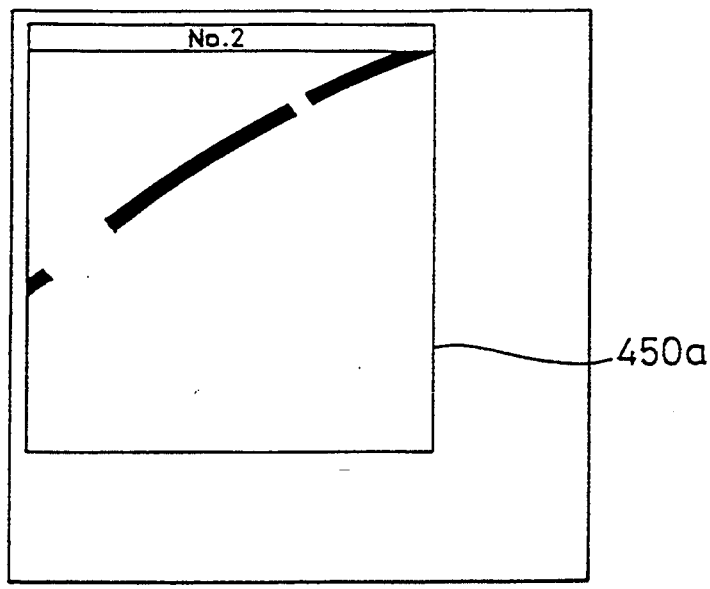
FIGS. 46a and 46b are views showing a whole contracting display function of a pattern by the apparatus shown in FIG. 42.

It is now assumed that an operator displays a portion of the pattern No. 2 in an expanded manner within a display frame 450a as shown in FIG. 46a. Such an expanded picture is convenient for carrying out fine processing, but it is impossible to grasp which portion of the entirety of the pattern is caused to correspond to a portion being processed.

Figure 46B:
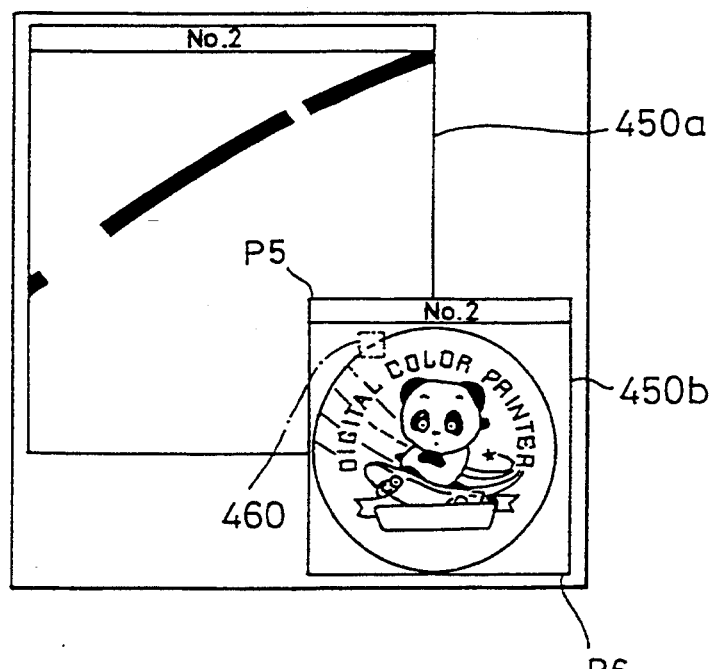

In accordance with this apparatus, as shown in FIG. 46b, it is possible to designate another display frame 450b to display the entire image of a pattern within this display frame in a contracted manner. It is sufficient that an operator gives an instruction to display the entire image of the pattern No. 2 with a predetermined magnification by designating the display frame defined by, e.g., two points P5 and P6. The display control means 80 receives, from respective means 81 to 84, an instruction to display the entirety of the pattern No. 2 within the display frame 450b with a predetermined contraction factor. Responding to this instruction, the display control means 80 carries out a work to extract the entirety of pictorial image data relating to the pattern No. 2 in the main memory 110 to implement contracting processing for thinning out pixels to generate new data. A portion of data corresponding to the pictorial image within the display frame 450b in the frame memory 120 are replaced by the newly generated data. As a result, a display picture on the visual display 400 is as shown in FIG. 46b. The whole pictorial image of the pattern is displayed in a contracted manner within the display frame 450b overlapping with an expanded pictorial image. It is to be noted that, in the same manner as in the above-described example, a contour line 460 (indicated by single dotted lines) indicating an expanded portion is displayed in the display frame 450b.

Actual Example 3

Figure 47A:
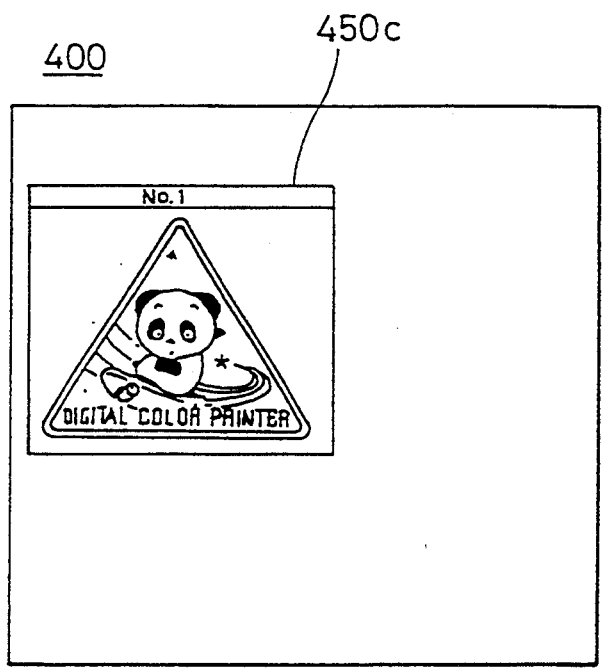
FIGS. 47a and 47b are views showing a same picture display function of a plurality of patterns of the apparatus shown in FIG. 42.
Figure 47B:
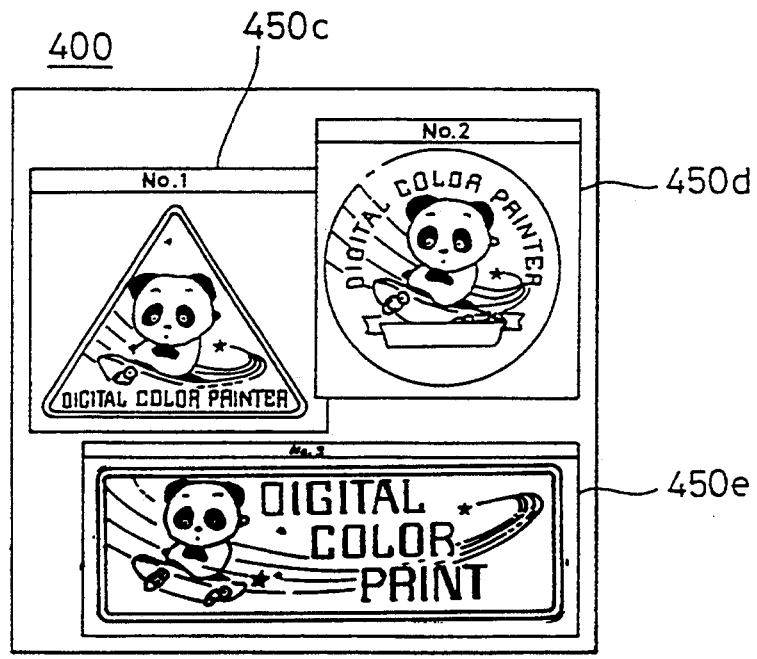

It is assumed that an operator first displays the entire pictorial image of the pattern No. 1 within a display frame 450c in a contracted manner as shown in FIG. 47a. In accordance with this apparatus, it is possible to compare the pattern No. 1 with other patterns No. 2 and No. 3 on the same screen. FIG. 47b shows the state where three patterns are displayed within the same screen as stated above. It is sufficient for an operator to give an instruction to display the entireties of the patterns No. 2 and No. 3 within display frames 450d and 450e with a predetermined contraction factor, respectively. Responding to this instruction, the display control means 80 carries out a work to extract the entirety of pictorial image data relating to the patterns No. 2 and No. 3 in the main memory 110 to implement a contracting processing for thinning out pixels to the extracted data to generate new data. A portion of data corresponding to the pictorial image within the display frames 450d and 450e in the frame memory 120 are replaced by the newly generated data. As a result, a display picture on the visual display is as shown in FIG. 47b.

6.3 Merits with the Display Control According to this Invention

As stated above, in accordance with the display control for the display device, by updating data within a predetermined display frame in the frame memory by the display control means, a multi-window display such that a succeeding display picture overlaps with a preceding display picture can be conducted. Further, when an operator designates a specific position of a pattern on a display screen, the modification/coloring means recognizes which data in the main memory is caused to correspond to the position designated by the operator by making a reference to the frame memory. Modification or coloring processing is implemented on data in the main memory. Thus, it is possible to designate, on the visual display, an arbitrary position of an arbitrary picture subject to multi-window display to give an instruction of modification or coloring.

INDUSTRIAL APPLICABILITY

The above-described pictorial image processing system according to this invention is very effective when that system is applied to an apparatus for preparing a screen tint film using a computer. In addition, this invention can be applied to all pictorial image processing such as CAD equipment, and video systems.

We claim:
1. A pictorial image processing system comprising:
a main memory (110) for storing a basic pictorial image constituted by pixels arranged on an XY plane, wherein a train of pixels arranged in a line along an X-direction is defined by a runlength data (c, a) expressed by a color value c that a pixel has and a value $\alpha$ which can indicate the termination of an arrangement of pixels having the same color value;
a display object information input unit (134) for inputting display object information for specifying a display object area to be actually displayed within said basic pictorial image;
a magnification input unit (135) for inputting a magnification k for displaying said display object area;
a runlength data extraction unit (131) for extracting, from said main memory, runlength data (c, a) taking part in said display object area;
a magnification conversion unit for converting a co-ordinate value a of said extracted runlength data (c, a) to a coordinate value A on the basis of said magnification k and a value $\alpha$ to provide runlength data (c, A), said value $\alpha$ being a minimum X-coordinate value of pixels which are located along a line with respect to said extracted runlength data and within said display object area;
a raster data generation unit (133) for generating raster data comprised of pixels having the color value c successive up to the X-coordinate value A on the basis of said runlength data (c, A), said raster data generation unit generating each line of raster data (k−1) times to generate k sets of line of raster data in total when said magnification k is greater than 1;
a frame memory (120) for storing said generated raster data; and
a visual display (400) for displaying a pictorial image on the basis of raster data stored in said frame memory.
2. A pictorial image processing system comprising:
a main memory (110) for storing a pictorial image constituted by pixels arranged on an XY plane, wherein a train of pixels arranged in an X-direction is defined by a runlength data (c, a) expressed by a color value c that a pixel has and a value a which can indicate the termination of an arrangment of pixels having the same color value;
a data form conversion unit (130) for converting runlength data in said main memory to raster data;
a frame memory (120) for retaining raster data converted at said data form conversion unit in order to display a pictorial image on a visual display (400);
an input unit (13, 12) for designating a point P within a pictorial image in said main memory and a new color value c′;
an initial color value conversion unit (21) for extracting runlength data ($c_o$, $a_o$) including a position of said point P, changing color value $c_o$ of said runlength data to said color value c′, and replacing original data in said main memory by the changed data (c′, $a_o$);
a stack unit (24) for accumulating or storing index data constituted by three data (S, E, Y) of a first X-coordinate value S, a second X-coordinate value E, and a data Y indicating a position in a Y-direction;

an index data generation unit (23) for determining data s regarding an initial point of a pixel train defined by a given runlength data (c, a), data e regarding a terminating point thereof, and data Y indicating a position in the Y-direction thereof to generate index data (s, e, y+1) for pixel trains adjacent in a lower direction indicated by a position in the Y-direction (y+1) and pixel trains adjacent in an upper direction indicated by a position in the Y-direction (y−1), respectively;

an initial data storage unit (22) for giving runlength data ($c_o$, $a_o$) to said index data generation unit, thus to accumulate or store the generated index data into said stack unit;

a runlength data extraction unit (26) for reading out one index data (S, E, Y) from said stack unit to extract runlength data which satisfies three conditions indicated by said index data, i.e., those data are located at the position Y in the Y-direction, those data have said color value $c_o$, and pixel trains defined by those data overlap with a section SE;

a sequential color value conversion unit (27) for changing a color value $c_o$ of data extracted by said runlength data extraction unit to said color value c' to replace original data in said main memory by the changed data; and a sequential data storage unit (25) for giving data extracted by said runlength data extraction unit to said index data generation unit and for accumulating or storing generated index data into said stack unit.

3. A pictorial image processing system comprising:

a main memory (110) for storing a pictorial image constituted by pixels arranged on an XY plane, wherein a train of pixels arranged in an X-direction is defined by a runlength data (c, a) expressed by a color value c that a pixel has and a value a which can indicate the termination of an arrangement of pixels having the same color value;

a data form conversion unit (130) for converting runlength data in said main memory to raster data;

a frame memory (120) for retaining raster data converted at said data form conversion unit in order to display a pictorial image on a visual display (400);

an input unit (13, 12) for designating a point P within a pictorial image in said memory and a new color value c';

an initial color value conversion unit (21) for extracting runlength data ($c_o$, $a_o$) including a position of said point P, changing color value $c_o$ of said runlength data to said color value c', and replacing original data in said main memory by the changed data (c', $a_o$);

a stack unit (24) for accumulating or storing index data consituted by four data (S, E, Y, F) of a first X-coordinate value S, a second X-coordinate value E, a data Y indicating a position in a Y-direction, and a flag F indicating a direction;

an index data generation unit (23) for determining a start point s and an end point e of a retrieval target area to be next retrieved and a position y and a direction f in the Y-direction of said retrieval target area, thus to generate index data (s, e, y, f);

an initial data storage unit (22) for giving runlength data ($c_o$, $a_o$) to said index data generation unit, thus to accumulate or store the generated index data into said stack unit;

a runlength data extraction unit (26) for reading out one index data (S, E, Y, F) from said stack unit to extract runlength data which satisfies three conditions indicated by said index data, i.e., those data are located at the position Y in the Y-direction, those data have said color value $c_o$, and pixel trains defined by those data overlap with a section SE;

a sequential color value conversion unit (27) for changing a color value $c_o$ of data extracted by said runlength data extraction unit to said color value c' to replace original data in said main memory by the changed data; and a sequential data storage unit (25) for giving a runlength data (c, a) extracted by said runlength data extraction unit and an index data (S, E, Y, F) used in extracting said runlength data (c, a) to said index data generation unit and for accumulating or storing the generated index data into said stack unit.

4. A pictorial image processing system for implementing modification of a line drawing and a coloring processing in a closed area encompassed by a line drawing to pictorial image data of a pattern constituted by line drawings in order to provide pictorial image data for preparing a screen tint film comprising:

a main memory (110) for storing respective pictorial image data of a plurality of patterns;

a display unit (400) for displaying a pattern;

a frame memory (120) for retaining pictorial image data corresponding to a display picture of said display unit;

display control means (80) for preparing pictorial image data in said frame memory on the basis of pictorial image data stored in said main memory;

modification instructing means (85) for inputting an instruction of modification of a line drawing from an operator by a method of designating a position on a displayed picture on said display unit;

modifying means (90) for recognizing pictorial image data subject to modification in said main memory by making reference to said frame memory on the basis of said instruction of modification inputted from said modification instructing means, thus to implement modification processing to said pictorial image data;

pattern designation means (81) for designating a pattern to be displayed on said display unit on the basis of an instruction from the operator;

display frame designation means (82) for designating a display frame on a display screen of said display unit on the basis of an instruction from the operator;

display portion designation means (83) for designating a display portion within a pattern designated by said pattern designation means (81) on the basis of an instruction from the operator; and display magnification designation means (84) for designating a display magnification of a pattern to be displayed on said display unit on the basis of an instruction from the operator;

wherein said display control means has a function to updata data in an area corresponding to a designated display frame in said frame memory so that a display portion designated by said display portion designation means of a pattern designated by said pattern designation means is displayed within a display frame designated by said display frame designation means with a magnification designated by said display magnification designation means.

5. A pictorial image processing system for implementing modification of a line drawing and a coloring processing in a closed area encompassed by a line drawing to pictorial image data of a pattern consituted by line drawings in order to provide pictorial image data for preparing a screen tint film, comprising:

a main memory (110) for storing respective pictorial image data of a plurality of patterns;

a display unit (400) for displaying a pattern;

a frame memory (120) for retaining pictorial image data corresponding to a display picture Of said display unit;

display control means (80) for preparing pictorial image data in said frame memory on the basis of pictorial image data stored in said main memory;

coloring instructing means (86) for inputting an instruction of coloring of a closed area encompassed by line drawings from an operator by a method of designating a position on a displayed picture on said display unit;

coloring means (90) for recognizing pictorial image data subject to coloring in said main memory by making reference to said frame memory on the basis of said instruction of coloring inputted from said coloring instructing means, thus to implement coloring processing to said pictorial image data;

pattern designation means (81) for designating a pattern to be displayed on said display unit on the basis of an instruction from the operator;

display frame designation means (82) for designating a display frame on a display screen of said display unit on the basis of an instruction from the operator;

display portion designation means (83) for designating a display portion within a pattern designated by said pattern designation means (81) on the basis of an instruction from the operator; and display magnification designation means (84) for designating a display magnification of a pattern to be displayed on said display unit on the basis of an instruction from the operator;

wherein said display control means has a function to updata data in an area corresponding to a designated display frame in said frame memory so that a display portion designated by said display portion designation means of a pattern designated by said pattern designation means is displayed within a display frame designated by said display frame designation means with a magnification designated by said display magnification designation means.

6. A pictorial image processing system comprising:

a main memory (110) for storing a basic pictorial image constituted by pixels arranged on an XY plane, wherein a train of pixels arranged in a line along an X-direction is defined by a runlength data (c, a) expressed by a color value c that a pixel has and a value a which can indicate the termination of an arrangement of pixels having the same color value;

a display object information input unit (134) for inputting display object information for specifying a display object area to be actually displayed within said basic pictorial image;

a magnification input unit (135) for inputting a magnification k for displaying said display object area;

a runlength data extraction unit (131) for extracting, from said main memory, runlength data (c, a) taking part in said display object area by every line when said magnification k is greater than 1 and by every (1/k)-th line when said magnification k is not greater than 1;

a magnification conversion unit for converting a coordinate value a of said extracted runlength data (c, a) to a coordinate value A on the basis of said magnification k to provide runlength data (c, A), wherein the coordinate value A is calculated by the equation $A=(a-(\alpha-1))k$, value $\alpha$ being a minimum X-coordinate value of pixels which locate along a line with respect to said extracted runlength data and within said display object area;

a raster data generation unit (133) for generating raster data comprised of pixels having the color value c successive up to the X-coordinate value A on the basis of said runlength data (c, A), said raster data generation unit copying each line of raster data (k-1) times to generate k sets of line of raster data in total when said magnification k is greater than 1;

a frame memory (120) for storing said generated raster data; and a visual display (400) for displaying a pictorial image on the basis of raster data stored in said frame memory.

7. A pictorial image processing system comprising:

a main memory (110) for storing a pictorial image constituted by pixels arranged on an XY plane, wherein a train of pixels arranged in a line along an X-direction is defined by a runlength data (c, a) expressed by a color value c that a pixel has and a value a which can indicate the termination of an arrangement of pixels having the same color value;

a data form conversion unit (130) for converting runlength data in said main memory to raster data;

a frame memory (120) for retaining raster data converted at said data from conversion unit in order to display a pictorial image on a visual display (400);

a drawing area input unit (30) for designating a drawing area with respect to a pictorial image in said main memory;

a color input unit (40) for designating a drawing color with respect to said drawing area;

a line data readout unit (60) for reading out runlength data of a line related to said drawing area among whole runlength data (c, a) and said main memory;

a data updating unit (50) having a function to sequentially examine, one by one, runlength data of a line read out at said line data readout unit, whereby when that data is data which is not related to said drawing area, said data updating unit outputs it as it is, while when that data is data related to said drawing area, said data updating unit applies a modification to data by making reference to said drawing color and outputs data thus modified; and a line data writing unit (70) for rewriting said main memory by data given from said data updating unit;

wherein a plurality of modifying patterns are defined and said data updating unit carries out a modification according to one of said modifying patterns, said one pattern being selected based on a relationship between a first value Pn of a runlength data $(C_n, P_n)$ to be modified, a second value $P_{n-1}$ of a runlength data $(C_{n-1}, P_{n-1})$ which precedes said runlength data $(C_n, P_n)$, a third value $P_s$ indicating an X-coordinate of a leftmost pixel among pixels within said drawing area on a line with respect to said runlength data $(C_n, P_n)$ and a fourth value $P_e$ indicating an X-coordinate of a rightmost pixel among pixels within said drawing area on a line with respect to said runlength data $(C_n, P_n)$.

* * * * *